US010509565B2

(12) United States Patent
Kishida et al.

(10) Patent No.: US 10,509,565 B2
(45) Date of Patent: Dec. 17, 2019

(54) APPARATUSES, METHODS, AND COMPUTER-READABLE NON-TRANSITORY RECORDING MEDIUMS FOR ERASURE IN DATA PROCESSING

(71) Applicant: MegaChips Corporation, Osaka-shi (JP)

(72) Inventors: Harunobu Kishida, Osaka (JP); Masayuki Imagawa, Osaka (JP)

(73) Assignee: MEGACHIPS CORPORATION, Osaka (JP)

( * ) Notice: Subject to any disclaimer, the term of this patent is extended or adjusted under 35 U.S.C. 154(b) by 0 days.

(21) Appl. No.: 15/834,205

(22) Filed: Dec. 7, 2017

(65) Prior Publication Data

US 2018/0165012 A1   Jun. 14, 2018

(30) Foreign Application Priority Data

Dec. 12, 2016 (JP) .................................. 2016-240341

(51) Int. Cl.
*G06F 3/06* (2006.01)
*G06F 12/1009* (2016.01)
*G06F 12/02* (2006.01)

(52) U.S. Cl.
CPC .............. *G06F 3/0607* (2013.01); *G06F 3/06* (2013.01); *G06F 3/064* (2013.01); *G06F 3/0619* (2013.01); *G06F 3/0634* (2013.01); *G06F 3/0652* (2013.01); *G06F 3/0659* (2013.01); *G06F 3/0679* (2013.01); *G06F 3/0685* (2013.01); *G06F 12/0246* (2013.01);

(Continued)

(58) Field of Classification Search
CPC .... G06F 12/0246; G06F 12/02; G06F 3/0652; G06F 3/0688
See application file for complete search history.

(56) References Cited

U.S. PATENT DOCUMENTS 8,335,893 B2 * 12/2012 Tagawa ............... G06F 12/0246
711/1
9,183,132 B2   11/2015 Nishihara
(Continued)

FOREIGN PATENT DOCUMENTS

JP        3450071        9/2003
JP        5162846        3/2013

OTHER PUBLICATIONS

Dae Man Han, Fast erase algorithm using flash translation layer in NAND-type flash memory. (Year: 2011).*

*Primary Examiner* — Jared I Rutz
(74) *Attorney, Agent, or Firm* — Xsensus LLP

(57) ABSTRACT

Upon receiving an erase command and a first logical address, a controller in a first mode sets, as an erasure waiting area, an erasure unit area assigned with a first physical address associated with the first logical address in a first table. The controller in the first mode replaces, in the first table, the first physical address with a physical address assigned to an erasure completion area. The controller in a second mode sets the erasure waiting area as the erasure completion area. Upon receiving a release command to release the second mode at some point in time of data erasure from the erasure waiting area, the controller changes the operation mode to a third mode. The controller operating in the third mode erases un-erased data from the erasure waiting area and changes the operation mode from the third mode to the first mode.

44 Claims, 48 Drawing Sheets

(52) U.S. Cl.
CPC ...... G06F 12/1009 (2013.01); *G06F 2212/65* (2013.01); *G06F 2212/7201* (2013.01)

(56) References Cited

U.S. PATENT DOCUMENTS

| | | | |
|---|---|---|---|
| 2008/0198651 A1* | 8/2008 | Kim | G06F 12/0246 365/185.03 |
| 2011/0078363 A1* | 3/2011 | Yeh | G06F 12/0246 711/103 |
| 2017/0160940 A1* | 6/2017 | Yang | G06F 3/0604 |

* cited by examiner

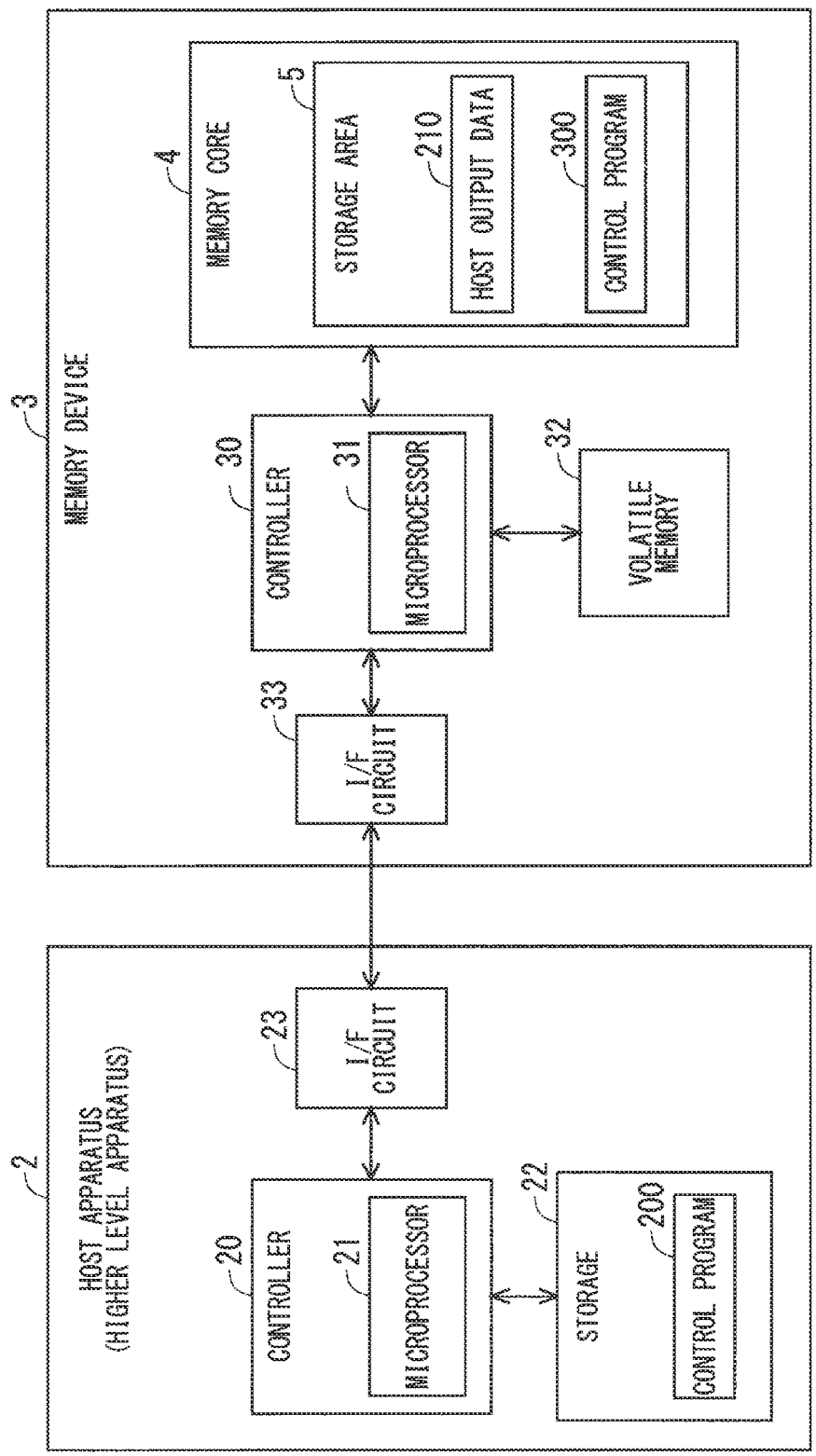
F I G . 1

FIG. 5

```
                    ┌──────────────────────┐ 60
                    │      L2P TABLE       │
                    │                      │
                    │  LOGICAL   PHYSICAL  │
                    │  ADDRESS   ADDRESS   │
                    │   00h   ┌─ 100h ─┐   │
                    │         │        │   │
                    │   01h   │  001h  │   │
                    │    ⋮    │   ⋮    │   │
                    │   FEh   │  110h  │   │
                    │         │        │   │
                    │   FFh   └─ 0FFh ─┘   │
                    └──────────────────────┘
```

FIG. 6

| Assignment Number | Physical Address | |
|---|---|---|
| 00h | 000h | ← ERASURE WAITING POINTER EP |
| 01h | 101h | |
| ⋮ | ⋮ | |
| EEh | 1EEh | ← ERASURE COMPLETION POINTER SP |
| EFh | 1EFh | |

(MANAGEMENT TABLE, 70)

<AT TIME OF ISSUANCE OF ERASE COMMAND · WITH ERASURE COMPLETION SECTOR>

<AT TIME OF ISSUANCE OF ERASE COMMAND · WITH ERASURE COMPLETION SECTOR>

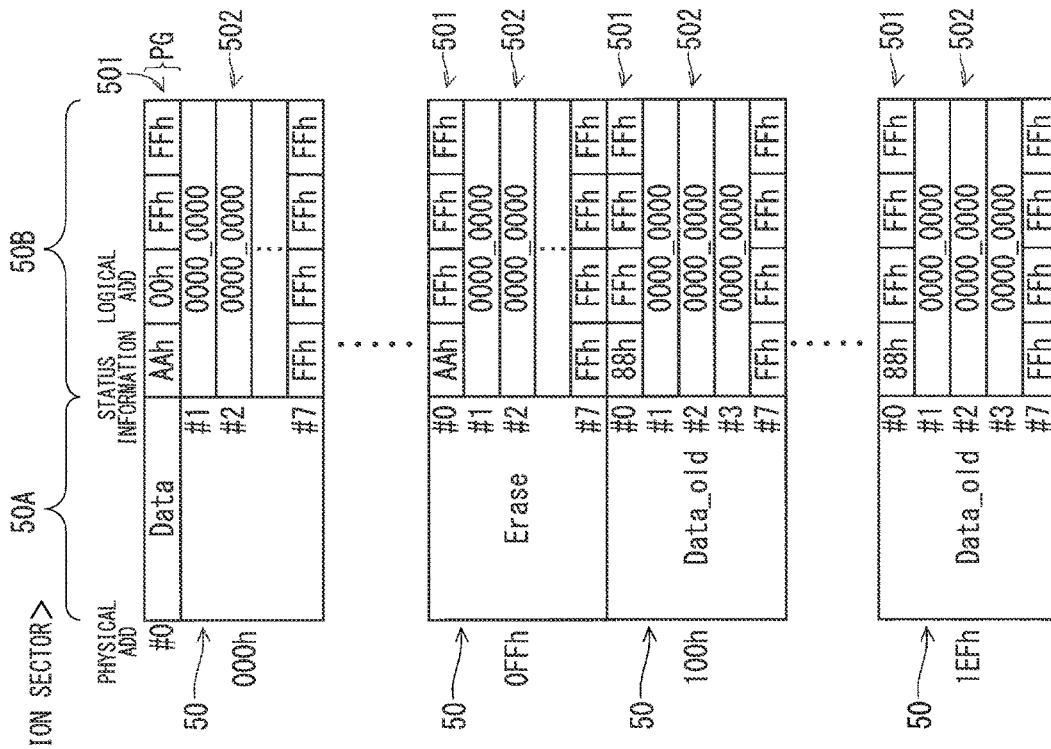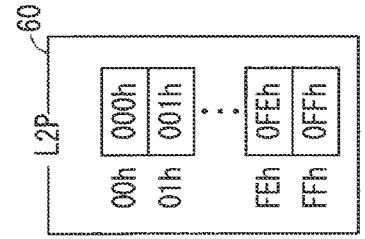

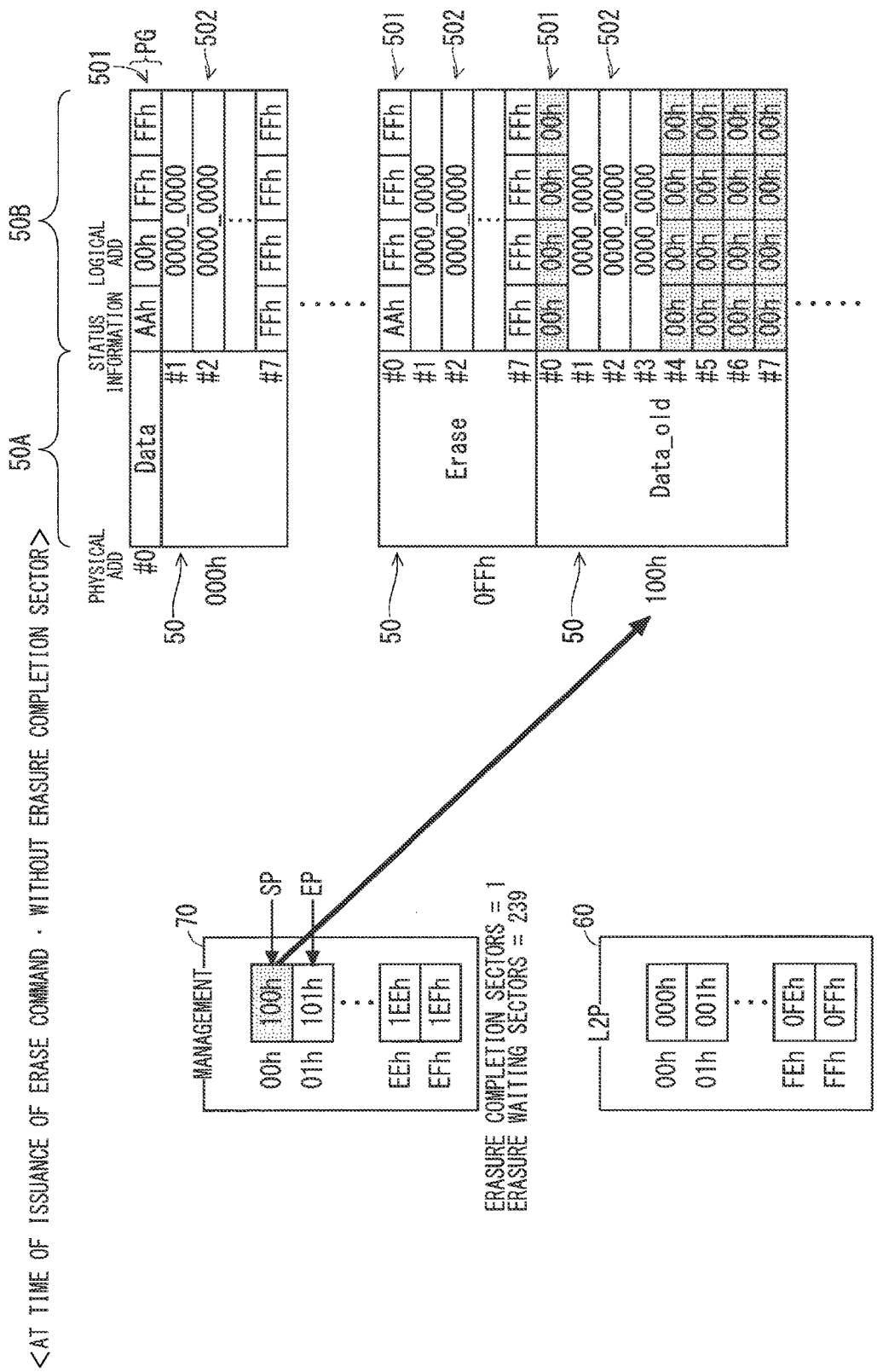

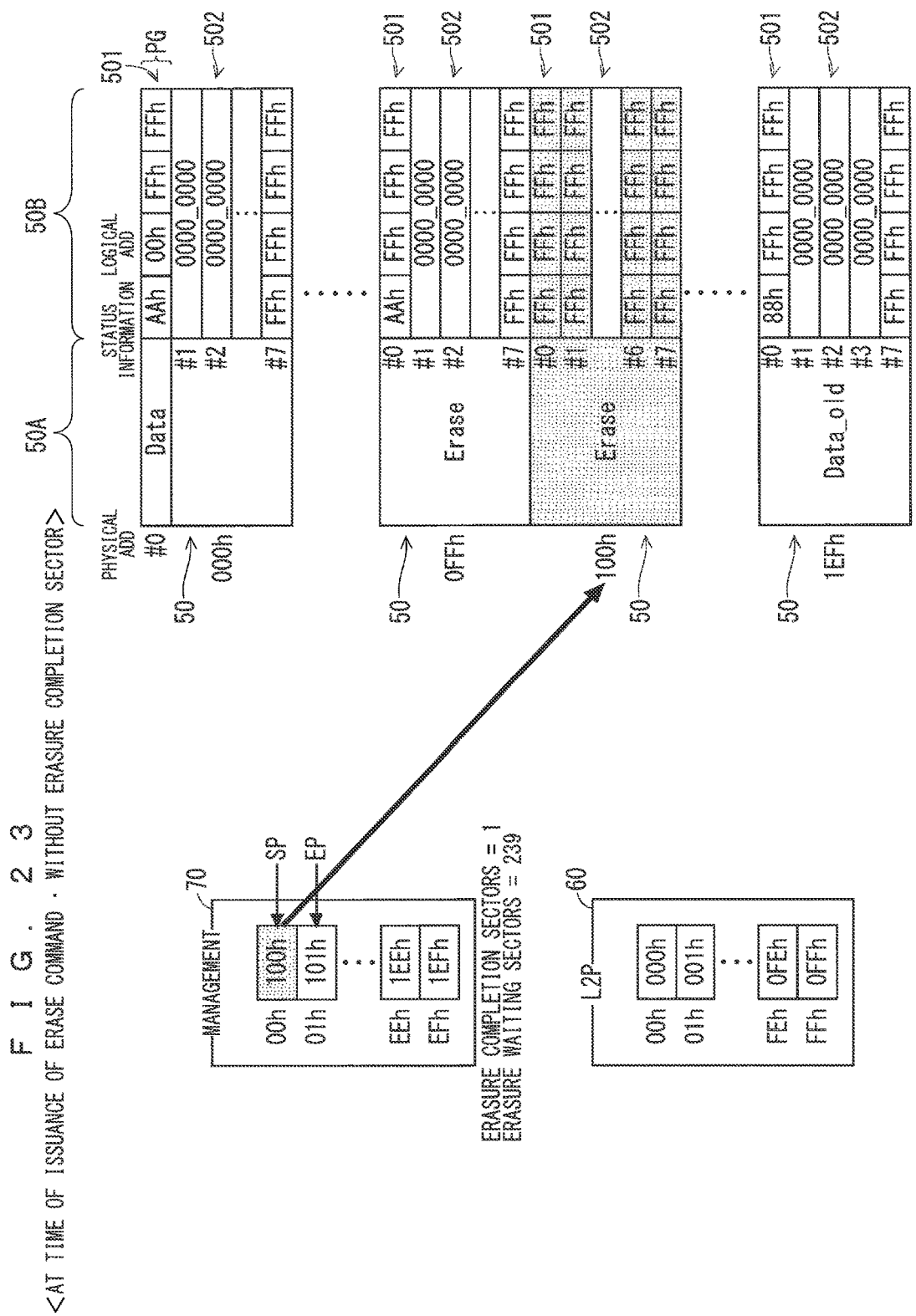

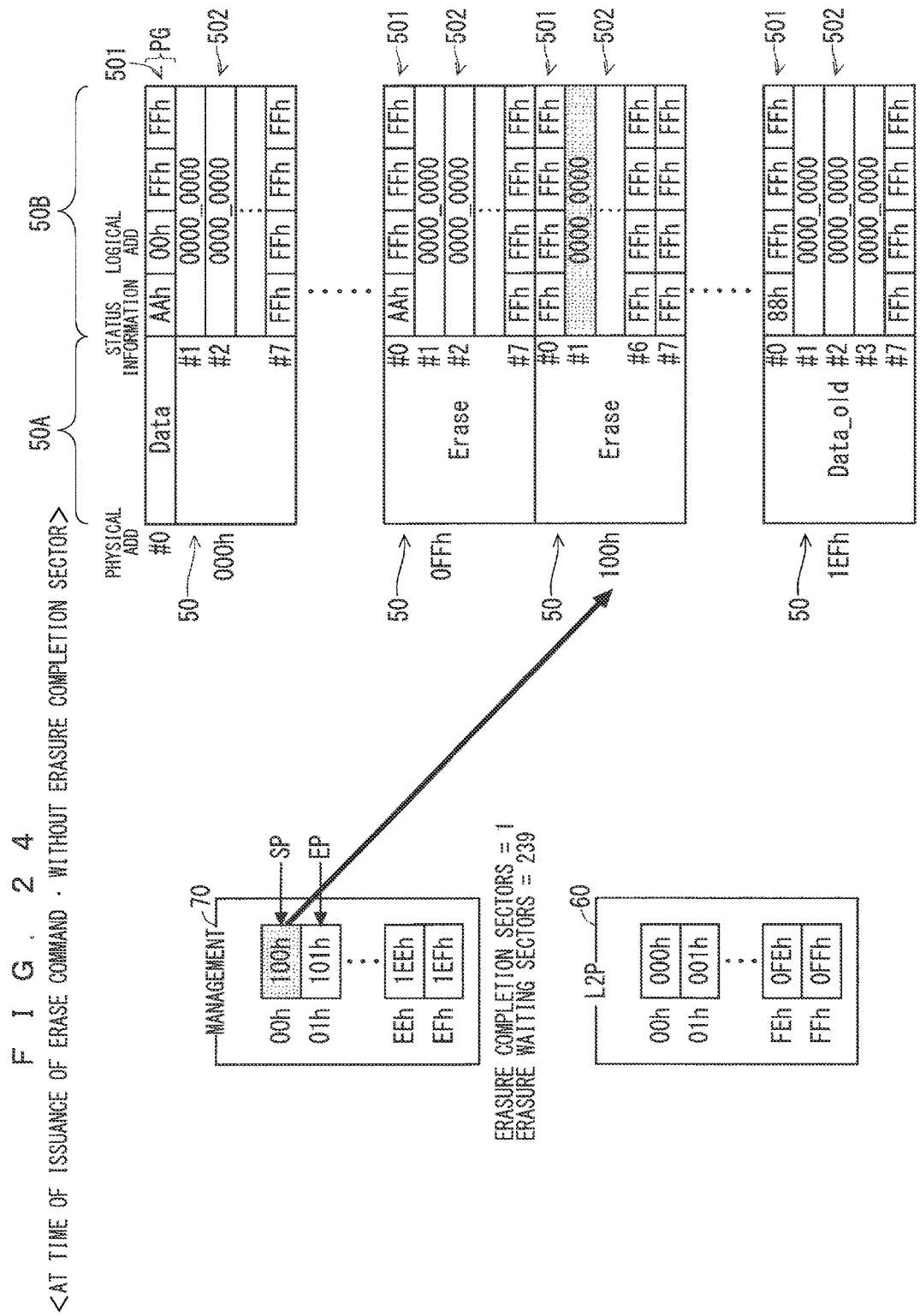

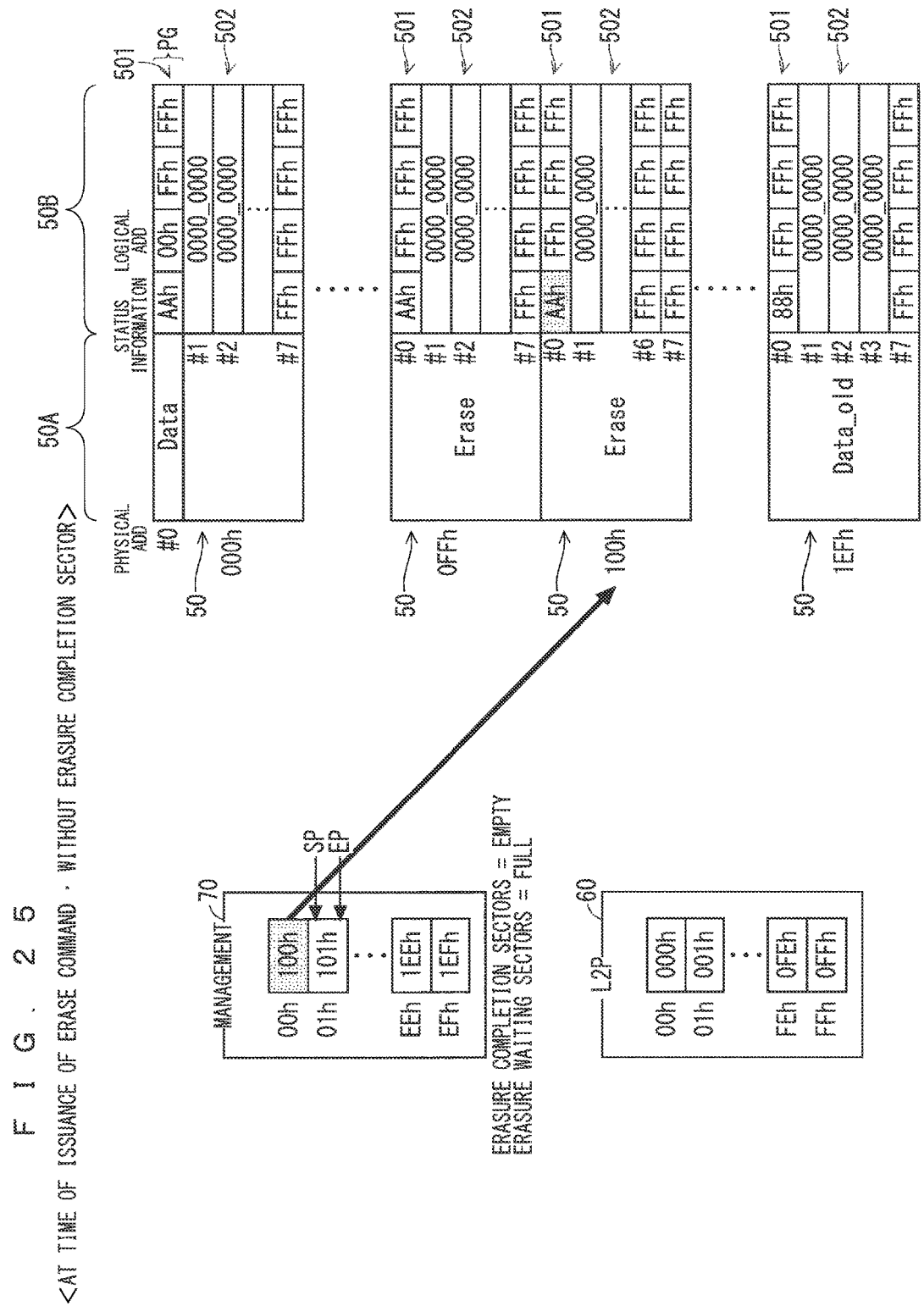

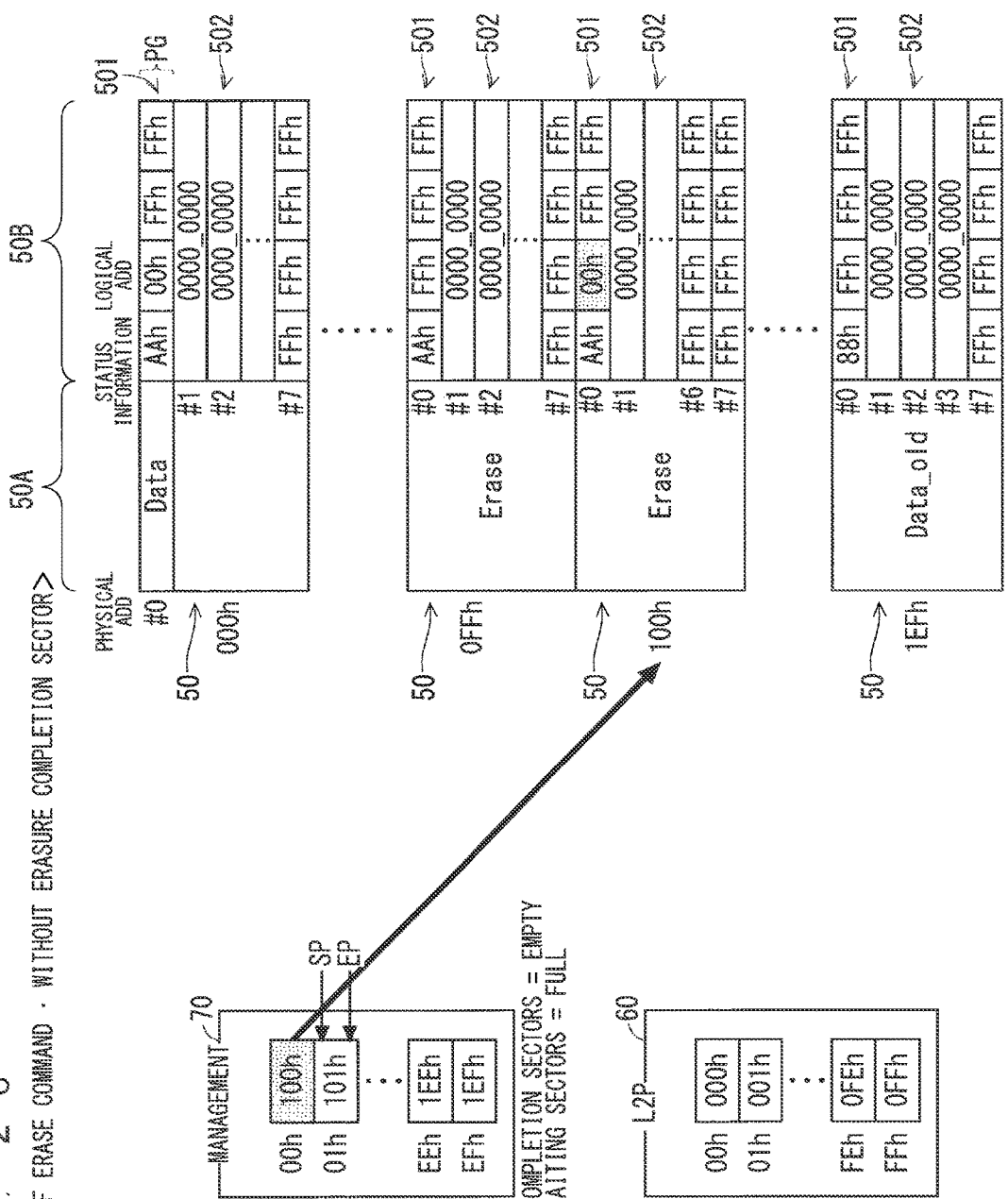

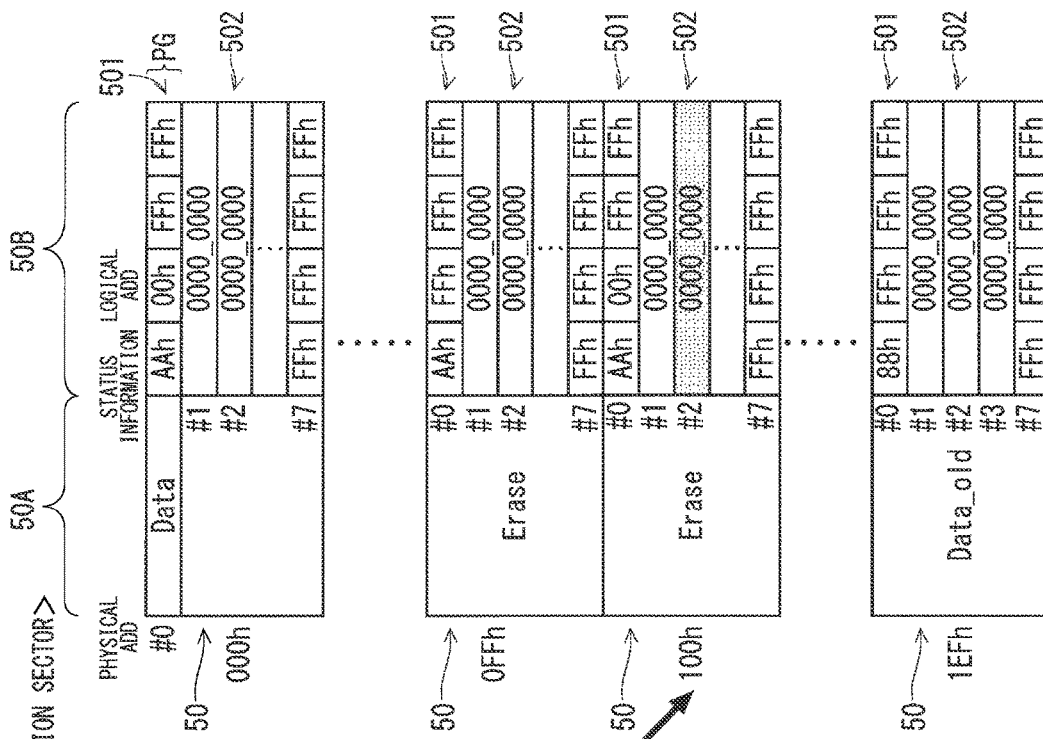
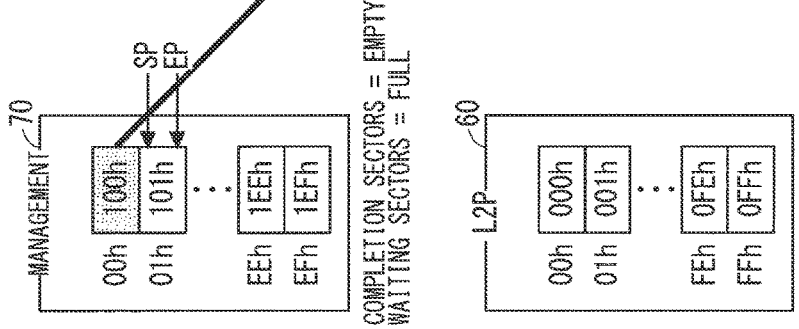
FIG. 27
<AT TIME OF ISSUANCE OF ERASE COMMAND · WITHOUT ERASURE COMPLETION SECTOR>

<AT TIME OF ISSUANCE OF ERASE COMMAND : WITHOUT ERASURE COMPLETION SECTOR>

F I G . 4 1
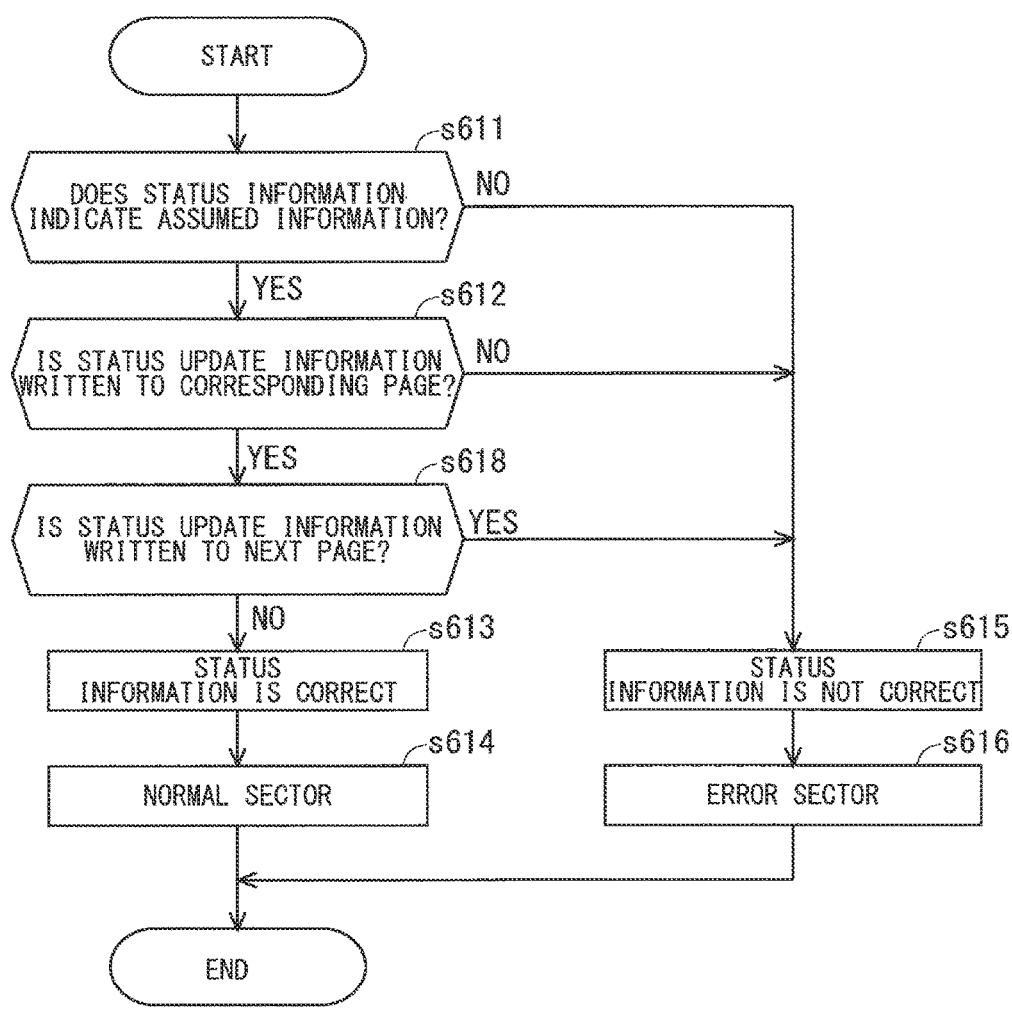

F I G . 4 6
F I G . 4 7
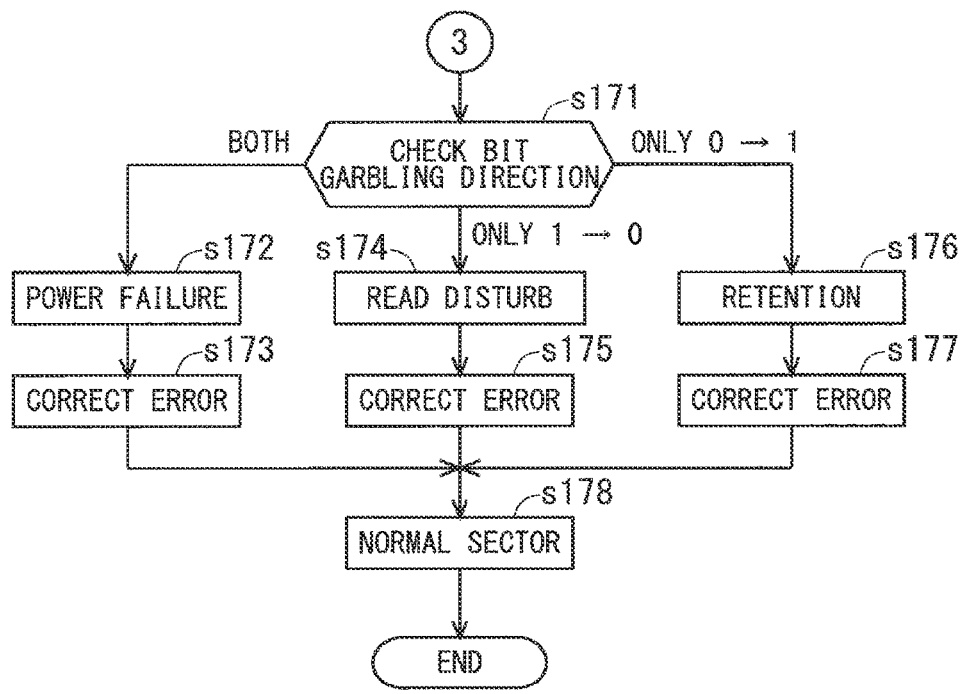

FIG. 48

```
(CORRECT DATA)          (READ DISTURB)
AA 03 FF FF             A8 03 FF FF
XX XX XX XX             XX XX XX XX
XX XX XX XX             XX XX XX XX
FF FF FF FF    ──▶      FF FF FF FF
FF FF FF FF             FF FF FF FF
FF FF FF FF             FF FF FF FF
FF FF FF FF             FF FF FF FF
FF FF FF FF             FF FF FF FF
```

FIG. 49

```
(CORRECT DATA)          (RETENTION)
AA 03 FF FF             AF 03 FF FF
XX XX XX XX             XX XX XX XX
XX XX XX XX             XX XX XX XX
FF FF FF FF    ──▶      FF FF FF FF
FF FF FF FF             FF FF FF FF
FF FF FF FF             FF FF FF FF
FF FF FF FF             FF FF FF FF
FF FF FF FF             FF FF FF FF
```

FIG. 50

```
(CORRECT DATA)          (POWER FAILURE)
AA 03 FF FF             FF 13 F0 0F
XX XX XX XX             XX XX XX XX
XX XX XX XX             XX XX XX XX
FF FF FF FF    ──▶      FF FF FF FF
FF FF FF FF             FF FF FF FF
FF FF FF FF             FF FF FF FF
FF FF FF FF             FF FF FF FF
FF FF FF FF             FF FF FF FF
```

F I G . 5 1

```
(CORRECT DATA)        (RETENTION)
 AA 03 FF FF           FF 03 FF FF
 XX XX XX XX           XX XX XX XX
 XX XX XX XX           XX XX XX XX
 FF FF FF FF    →      FF FF FF FF
 FF FF FF FF           FF FF FF FF
 FF FF FF FF           FF FF FF FF
 FF FF FF FF           FF FF FF FF
 FF FF FF FF           FF FF FF FF
```

F I G . 5 2

```
(CORRECT DATA)        (CURRENT DATA)
 AA 03 FF FF           AA 03 FF FF
 XX XX XX XX           XX XX XX XX
 XX XX XX XX           XX XX XX XX
 FF FF FF FF    →      YY YY YY YY
 FF FF FF FF           FF FF FF FF
 FF FF FF FF           FF FF FF FF
 FF FF FF FF           FF FF FF FF
 FF FF FF FF           FF FF FF FF
```

F I G . 5 3

```
(CORRECT DATA)        (RETENTION)
 AA 03 FF FF           FF FF FF FF
 XX XX XX XX           XX XX XX XX
 XX XX XX XX           XX XX XX XX
 FF FF FF FF    →      FF FF FF FF
 FF FF FF FF           FF FF FF FF
 FF FF FF FF           FF FF FF FF
 FF FF FF FF           FF FF FF FF
 FF FF FF FF           FF FF FF FF
```

FIG. 54

(CORRECT DATA)

88 03 FF FF
XX XX XX XX
XX XX XX XX
XX XX XX XX
FF FF FF FF
FF FF FF FF
FF FF FF FF
FF FF FF FF

(RETENTION)

(CORRECT DATA)

AA 03 FF FF
XX XX XX XX
XX XX XX XX
FF FF FF FF
FF FF FF FF
FF FF FF FF
FF FF FF FF
FF FF FF FF

(READ DISTURB)

(CORRECT DATA)

AA 03 FF FF
XX XX XX XX
XX XX XX XX
FF FF FF FF
FF FF FF FF
FF FF FF FF
FF FF FF FF
FF FF FF FF

(RETENTION)

AA 13 FF FF
XX XX XX XX
XX XX XX XX
FF FF FF FF
FF FF FF FF
FF FF FF FF
FF FF FF FF
FF FF FF FF

F I G. 5 7

(CORRECT DATA)　　　(CURRENT DATA)

AA 03 FF FF　　　　AA 03 FF FF
XX XX XX XX　　　　XX XX XX XX
XX XX XX XX　　→　YY YY YY YY
FF FF FF FF　　　　FF FF FF FF
FF FF FF FF　　　　FF FF FF FF
FF FF FF FF　　　　FF FF FF FF
FF FF FF FF　　　　FF FF FF FF
FF FF FF FF　　　　FF FF FF FF

APPARATUSES, METHODS, AND COMPUTER-READABLE NON-TRANSITORY RECORDING MEDIUMS FOR ERASURE IN DATA PROCESSING

BACKGROUND OF THE INVENTION

Field of the Invention

The present invention relates to a memory device.

Description of the Background Art

As described in Japanese Patent Nos. 3450071 and 5162846, various techniques have been conventionally proposed concerning memory devices.

SUMMARY OF THE INVENTION

A memory device according to an aspect is controlled by a host apparatus and includes a memory core, a controller, and a first table. The memory core includes a storage area including a plurality of erasure unit areas each serving as a data erasure unit, to which output data output from the host apparatus is written. The controller includes circuitry that controls the memory core. The first table configured to indicate the correspondence relationship between each of some physical addresses of a plurality of physical addresses assigned to the respective plurality of erasure unit areas and a logical address. The operation modes of the controller include first to third modes. Upon receiving an erase command to perform data erasure, output from the host apparatus, and a first logical address that is the logical address output from the host apparatus together with the erase command, the controller in the first mode sets the erasure unit area as an erasure waiting area for data without erasing data from the erasure unit area assigned with a first physical address that is the physical address associated with the first logical address in the first table. The controller in the first mode replaces, in the first table, the first physical address with the physical address assigned to an erasure completion area that is the erasure unit area from which data has been erased, and sets the erasure completion area as an access area to which the host apparatus can write data. Upon receiving a write command to perform a data write, output from the host apparatus, and a second logical address that is the logical address output from the host apparatus together with the write command, the controller in the first mode writes the output data output from the host apparatus to the access area assigned with the physical address associated with the second logical address in the first table. The controller in the second mode erases data from the erasure waiting area and sets the erasure waiting area as the erasure completion area. The controller operating in the second mode changes the operation mode from the second mode to the third mode upon receiving, from the host apparatus, a release command to release the second mode at some point in time of data erasure from the erasure waiting area. The controller operating in the third mode erases un-erased data from the erasure waiting area, sets the erasure waiting area as the erasure completion area, and changes the operation mode from the third mode to the first mode.

A memory device according to an aspect is controlled by a host apparatus and includes a memory core, a controller, and a first table. The memory core includes a storage area including a plurality of erasure unit areas each serving as a data erasure unit, to which output data output from the host apparatus is written. The controller includes circuitry that controls the memory core. The first table indicates the correspondence relationship between each of some physical addresses of a plurality of physical addresses assigned to the respective plurality of erasure unit areas and a logical address. Upon receiving an erase command to perform data erasure, output from the host apparatus, and a first logical address that is the logical address output from the host apparatus together with the erase command, the controller sets the erasure unit area as an erasure waiting area for data without erasing data from the erasure unit area assigned with a first physical address that is the physical address associated with the first logical address in the first table. The controller replaces, in the first table, the first physical address with the physical address assigned to erasure completion area that is the erasure unit area from which data has been erased, and sets the erasure completion area as an access area to which the host apparatus can write data. Upon receiving a write command to perform a data write, output from the host apparatus, and a second logical address that is the logical address output from the host apparatus together with the write command, the controller writes the output data output from the host apparatus to the access area assigned with the physical address associated with the second logical address in the first table. The controller erases data from the erasure waiting area and sets the erasure waiting area as the erasure completion area. Each of the plurality of erasure unit areas includes a host data area to which the output data is written and a management area for managing a state of the erasure unit area. The management area includes a first management area storing status information indicating whether the erasure unit area including the management area is the access area, the erasure completion area, or the erasure waiting area, and a second management area indicating an updated state of the status information. The second management area includes first to third update management areas respectively corresponding to the erasure completion area, the access area, and the erasure waiting area. The controller writes first predetermined information to the first update management area when rewriting the status information with first status information indicating that the erasure unit area is the erasure completion area. The controller writes second predetermined information to the second update management area when rewriting the status information with second status information indicating that the erasure unit area is the access area. The controller writes third predetermined information to the third update management area when rewriting the status information with third status information indicating that the erasure unit area is the erasure waiting area. The controller performs correct/incorrect determination to determine, on the basis of information in the first to third update management areas, whether the status information is correct.

A controller according to an aspect is a controller included in the above memory device.

A host apparatus according to an aspect is a host apparatus that controls the above memory device and outputs the release command.

A host apparatus according to an aspect is a host apparatus that controls the above memory device and outputs the instruction command.

A data processing system according to an aspect includes the above memory device and a host apparatus that controls the memory device and outputs the erase command and the write command.

A computer-readable non-transitory recording medium according to an aspect stores a control program for controlling a memory device that includes a memory core and a table and is controlled by a host apparatus. The memory core includes a storage area including a plurality of erasure unit areas each serving as a data erasure unit, to which output data output from the host apparatus is written. The table indicates the correspondence relationship between each of some physical addresses of a plurality of physical addresses assigned to the respective plurality of erasure unit areas and a logical address. The control program causes the memory device to execute (a) a step of operating in a first mode, (b) a step of operating in a second mode, and (c) a step of operating in a third mode. The control program causes the memory device to execute steps (a-1) to (a-4) in the step (a). The step (a-1) is a step of receiving an erase command to perform data erasure, output from the host apparatus, and a first logical address that is the logical address output from the host apparatus together with the erase command. The step (a-2) is a step of setting the erasure unit area as an erasure waiting area for data without erasing data from the erasure unit area assigned with a first physical address that is the physical address associated with the first logical address in the table after the step (a-1). The step (a-3) is a step of replacing the first physical address with the physical address assigned to an erasure completion area that is the erasure unit area, from which data has been erased, in the table after the step (a-1) and setting the erasure completion area as an access area to which the host apparatus can write data. The step (a-4) is a step of, upon receiving a write command to perform a data write, output from the host apparatus, and a second logical address that is the logical address output from the host apparatus together with the write command, writing the output data output from the host apparatus to the access area assigned with the physical address associated with the second logical address in the table. In the step (b), the control program causes the memory device to execute (b-1) a step of erasing data from the erasure waiting area and setting the erasure waiting area as the erasure completion area. The control program further causes the memory device to execute steps (d) and (e). The step (d) is a step of, upon receiving from the host apparatus a release command to release the second mode at some point in time of data erasure from the erasure waiting area while operating in the second mode, changing the operation mode from the second mode to the third mode. The step (e) is a step of erasing un-erased data from the erasure waiting area, while operating in the third mode, setting the erasure waiting area as the erasure completion area and changing the operation mode from the third mode to the first mode.

A computer-readable non-transitory recording medium according to an aspect stores a control program for controlling a memory device that includes a memory core and a table and is controlled by a host apparatus. The memory core includes a storage area including a plurality of erasure unit areas each serving as a data erasure unit, to which output data output from the host apparatus is written. The table indicates the correspondence relationship between each of some physical addresses of a plurality of physical addresses assigned to the respective plurality of erasure unit areas and a logical address. The control program causes the memory device to execute steps (a) to (e). The step (a) is a step of receiving an erase command to perform data erasure, output from the host apparatus, and a first logical address that is the logical address output from the host apparatus together with the erase command. The step (b) is a step of setting the erasure unit area as an erasure waiting area for data without erasing data from the erasure unit area assigned with a first physical address that is the physical address associated with the first logical address in the table after the step (a). The step (c) is a step of replacing the first physical address with the physical address assigned to an erasure completion area that is the erasure unit area, from which data has been erased, in the table after the step (a) and setting the erasure completion area as an access area to which the host apparatus can write data. The step (d) is a step of, upon receiving a write command to perform a data write, output from the host apparatus, and a second logical address that is the logical address output from the host apparatus together with the write command, writing the output data output from the host apparatus to the access area assigned with the physical address associated with the second logical address in the table. The step (e) is a step of erasing data from the erasure waiting area and setting the erasure waiting area as the erasure completion area. Each of the plurality of erasure unit areas includes a host data area to which the output data is written and a management area for managing a state of the erasure unit area. The management area includes a first management area storing status information indicating whether the erasure unit area including the management area is the access area, the erasure completion area, or the erasure waiting area and a second management area indicating an updated state of the status information. The second management area includes first to third update management areas respectively corresponding to the erasure completion area, the access area, and the erasure waiting area. The control program causes the memory device to execute steps (f) to (i). The step (f) is a step of writing first predetermined information to the first update management area when rewriting the status information with first status information indicating that the erasure unit area is the erasure completion area. The step (g) is a step of writing second predetermined information to the second update management area when rewriting the status information with second status information indicating that the erasure unit area is the access area. The step (h) is a step of writing third predetermined information to the third update management area when rewriting the status information with third status information indicating that the erasure unit area is the erasure waiting area. The step (i) is a step of performing correct/incorrect determination to determine, on the basis of information in the first to third update management areas, whether the status information is correct.

A computer-readable non-transitory recording medium according to an aspect stores a control program for causing a host apparatus to control the above memory device. The control program causes the host apparatus to output the release command.

A computer-readable non-transitory recording medium according to an aspect stores a control program for causing a host apparatus to control the above memory device. The control program causes the host apparatus to output the instruction command.

An operation method of a memory device according to an aspect is an operation method of a memory device that includes a memory core and a table and is controlled by a host apparatus. The memory core includes a storage area including a plurality of erasure unit areas each serving as a data erasure unit, to which output data output from the host apparatus is written. The table indicates the correspondence relationship between each of some physical addresses of a plurality of physical addresses assigned to the respective plurality of erasure unit areas and a logical address. The operation method of the memory device includes (a) a step in which the memory device operates in a first mode, (b) a step in which the memory device operates in a second mode, and (c) a step in which the memory device operates in a third mode. The step (a) includes steps (a-1) to (a-3). The step (a-1) is a step of receiving an erase command to perform data erasure, output from the host apparatus, and a first logical address that is the logical address output from the host apparatus together with the erase command. The step (a-2) is a step of setting the erasure unit area as an erasure waiting area for data without erasing data from the erasure unit area assigned with a first physical address that is the physical address associated with the first logical address in the table after the step (a-1). The step (a-3) is a step of replacing the first physical address with the physical address assigned to an erasure completion area that is the erasure unit area, from which data has been erased, in the table after the step (a-1) and setting the erasure completion area as an access area to which the host apparatus can write data. The step (a-4) is a step of, upon receiving a write command to perform a data write, output from the host apparatus, and a second logical address that is the logical address output from the host apparatus together with the write command, writing the output data output from the host apparatus to the access area assigned with the physical address associated with the second logical address in the table. The step (b) includes (b-1) a step of erasing data from the erasure waiting area and setting the erasure waiting area as the erasure completion area. The operation method of the memory device further includes steps (d) and (e). The step (d) is a step of, upon receiving from the host apparatus a release command to release the second mode at some point in time of data erasure from the erasure waiting area while operating in the second mode, changing the operation mode from the second mode to the third mode. The step (e) is a step of erasing un-erased data from the erasure waiting area, while operating in the third mode, setting the erasure waiting area as the erasure completion area and changing the operation mode from the third mode to the first mode.

An operation method of a memory device according to an aspect is an operation method of a memory device that includes a memory core and a table and is controlled by a host apparatus. The memory core includes a storage area including a plurality of erasure unit areas each serving as a data erasure unit, to which output data output from the host apparatus is written. The table indicates the correspondence relationship between each of some physical addresses of a plurality of physical addresses assigned to the respective plurality of erasure unit areas and a logical address. The operation method of the memory device includes steps (a) to (e). The step (a) is a step of receiving an erase command to perform data erasure, output from the host apparatus, and a first logical address that is the logical address output from the host apparatus together with the erase command. The step (b) is a step of setting the erasure unit area as an erasure waiting area for data without erasing data from the erasure unit area assigned with a first physical address that is the physical address associated with the first logical address in the table after the step (a). The step (c) is a step of replacing the first physical address with the physical address assigned to an erasure completion area that is the erasure unit area, from which data has been erased, in the table after the step (a) and setting the erasure completion area as an access area to which the host apparatus can write data. The step (d) is a step of, upon receiving a write command to perform a data write, output from the host apparatus, and a second logical address that is the logical address output from the host apparatus together with the write command, writing the output data output from the host apparatus to the access area assigned with the physical address associated with the second logical address in the first table. The step (e) is a step of erasing data from the erasure waiting area and setting the erasure waiting area as the erasure completion area. Each of the plurality of erasure unit areas includes a host data area to which the output data is written and a management area for managing a state of the erasure unit area. The management area includes a first management area storing status information indicating whether the erasure unit area including the management area is the access area, the erasure completion area, or the erasure waiting area and a second management area indicating an updated state of the status information. The second management area includes first to third update management areas respectively corresponding to the erasure completion area, the access area, and the erasure waiting area. The operation method of the memory device further includes steps (f) to (i). The step (f) is a step of writing first predetermined information to the first update management area when rewriting the status information with first status information indicating that the erasure unit area is the erasure completion area. The step (g) is a step of writing second predetermined information to the second update management area when rewriting the status information with second status information indicating that the erasure unit area is the access area. The step (h) is a step of writing third predetermined information to the third update management area when rewriting the status information with third status information indicating that the erasure unit area is the erasure waiting area. The step (i) is a step of performing correct/incorrect determination to determine, on the basis of information in the first to third update management areas, whether the status information is correct.

An operation method of a host apparatus according to an aspect is an operation method of a host apparatus that controls the above memory device and includes a step of outputting the release command.

An operation method of a host apparatus according to an aspect is an operation method of a host apparatus that controls the above memory device and includes a step of outputting the instruction command.

BRIEF DESCRIPTION OF THE DRAWINGS

FIG. 1 is a block diagram showing an example of the composition of a data processing system;

FIG. 5 is a view showing an example of a logical/physical translation table (L2P table);

FIG. 6 is a view showing an example of a management table;

FIGS. 21 to 30 are views each for explaining an example of the operation of the memory device;

FIGS. 37 to 46 are flowcharts each showing an example of the operation of the memory device;

FIGS. 47 to 57 are views each showing an example of data in sectors; and

DESCRIPTION OF THE PREFERRED EMBODIMENTS

<Overall Composition of Data Processing System>

Figure 2:
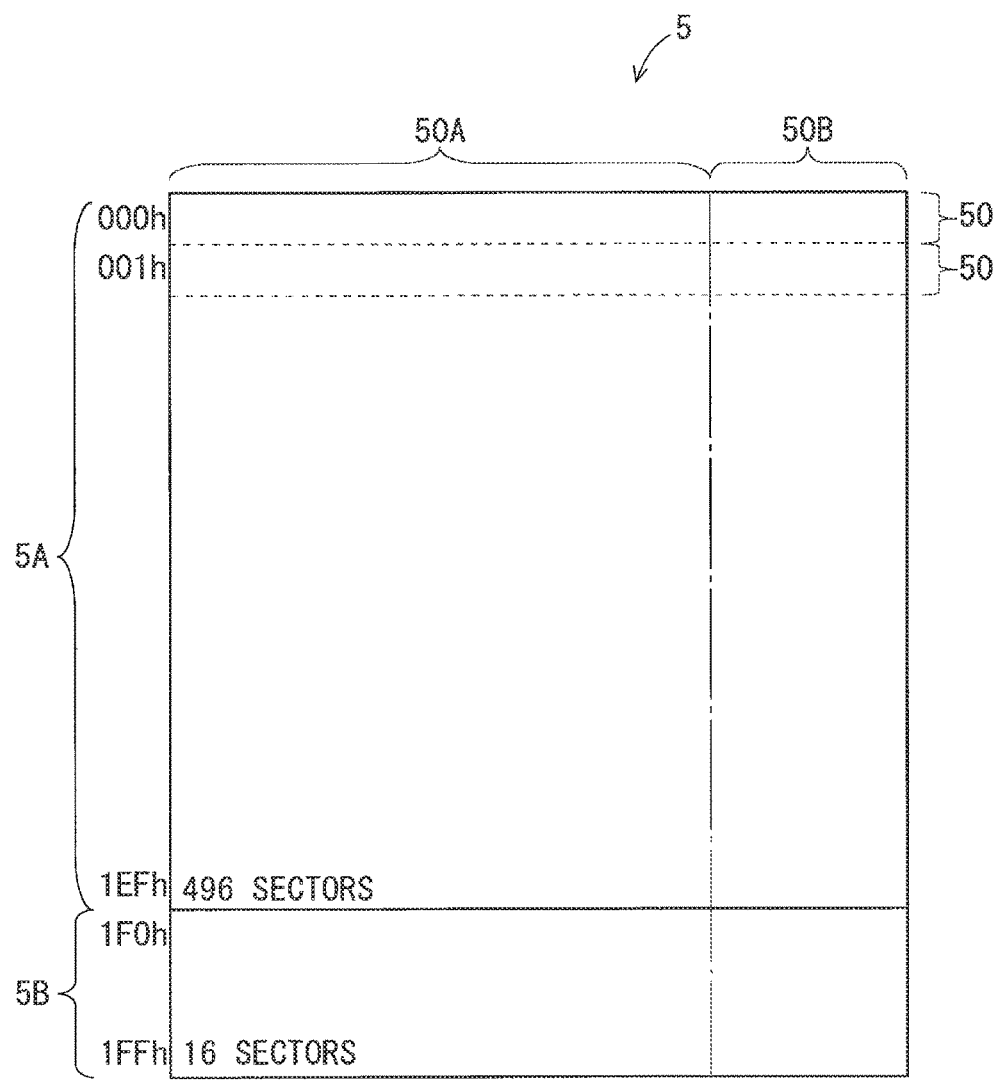
FIG. 2 is a view showing an example of the composition of a storage area.

FIG. 1 is a block diagram showing an example of the composition of a data processing system 1. The data processing system 1 includes a host apparatus 2 and a memory device 3. The host apparatus 2 is a higher level apparatus that controls the memory device 3. The memory device 3 is, for example, a nonvolatile memory device. The memory device 3 is, for example, a serial peripheral interface (SPI) flash memory. The memory device 3 has a memory core 4. The memory device 3 is constituted by, for example, one semiconductor chip. Note that the memory device 3 may be constituted by a plurality of semiconductor chips. The memory device 3 can be said to be a semiconductor memory device.

The host apparatus 2 comprehensively manages the overall operation of the data processing system 1. The host apparatus 2 can be said to be the main body apparatus of the data processing system 1. The host apparatus 2 can read data from the memory device 3 and write data to the memory device 3. For example, when the host apparatus 2 issues a data read instruction to the memory device 3, the memory device 3 reads data in the memory core 4 and outputs the data to the host apparatus 2. In addition, when the host apparatus 2 issues a data write instruction, the memory device 3 writes data from the host apparatus 2 to the memory core 4.

The memory core 4 stores data 210 (to be referred to as "host output data 210" or "output data 210" hereinafter) output from the host apparatus 2. When the data processing system 1 is, for example, a portable electronic device such as a smartphone or tablet, host output data 210 is, for example, save data generated during the execution of an arbitrary application program. In this case, for example, the application program is stored in a memory device such as a memory card that is provided separately from the memory device 3. The host apparatus 2 functioning as a portable electronic device main body executes an application program read from a memory card or the like to make the application program progress in the data processing system 1. Note that the data processing system 1 may be an electronic device other than a portable electronic device, and host output data 210 may be data other than save data.

<Composition of Host Apparatus>

The host apparatus 2 is a kind of computer apparatus, which includes a controller 20, a storage 22, and an I/F circuit 23. The controller 20 includes, for example, a microprocessor 21 or the like, and comprehensively manages the operation of the host apparatus 2. The storage 22 includes a non-transitory recording medium, such as a read only memory (ROM) and a random access memory (RAM), which allows the microprocessor 21 to read-access. The storage 22 stores, for example, a control program 200 for controlling the operation of the host apparatus 2. Various functions of the host apparatus 2 are implemented by causing the microprocessor 21 to execute the control program 200 in the storage 22. The I/F circuit 23 is a circuit for connecting the host apparatus 2 to the memory device 3 to input a signal from the memory device 3 to the controller 20 and output a signal from the controller 20 to the memory device 3.

The controller 20 generates and outputs various commands for instructing the memory device 3. A command output from the controller 20 is input from the I/F circuit 23 to the memory device 3. In addition, the controller 20 performs various types of processing for data read from the memory device 3, which is output from the I/F circuit 23.

Note that all or any part of the functions of the controller 20 may be implemented by a hardware circuit that does not require any software to implement the functions. In addition, the storage 22 may include a computer-readable non-transitory recording medium, other than a ROM and a RAM. The storage 22 may include, for example, a compact hard disk drive, a solid state drive (SSD), and the like.

<Composition of Memory Device>

The memory device 3 includes a controller 30, a volatile memory 32, an I/F circuit 33, and the memory core 4. The controller 30 includes, for example, a microprocessor 31, and comprehensively manages the operation of the memory device 3. The I/F circuit 33 is a circuit for connecting the memory device 3 to the host apparatus 2 to input a signal from the host apparatus 2 to the controller 30 and output a signal from the controller 30 to the host apparatus 2. The controller 30 performs processing in accordance with a command from the host apparatus 2, which is output from the I/F circuit 33.

The volatile memory 32 is, for example, a static RAM (SRAM), and functions as a work memory or the like when the controller 30 performs data processing. Note that the volatile memory 32 may be a dynamic RAM (DRAM).

A storage area 5 of the memory core 4 stores a control program 300 for controlling the operation of the memory device 3, in addition to host output data 210. Various functions of the memory device 3 are implemented by causing the microprocessor 31 to execute the control program 300 in the storage area 5. The memory core 4 can be said to be a non-transitory recording medium that allows the microprocessor 31 to read-access.

Note that all or any part of the functions of the controller 30 may be implemented by a hardware circuit that does not require any software to implement the functions.

<Composition of Storage Area of Memory Core>

FIG. 2 is a view showing an example of the composition of the storage area 5 of the memory core 4. As shown in FIG. 2, the storage area 5 is constituted by N (N≥2) sectors 50. In this case, although N=512, N may be a value other than 512. In the data processing system 1, data in the storage area 5 is erased for each sector 50. Each sector 50 can therefore be said to be an erasure unit area that is a unit of data erasure.

N physical addresses (to be sometimes referred to as "physical ADDs") are assigned to N sectors 50 of the storage area 5. In this case, physical addresses 000h to 1FFh (h represents hexadecimal notation) are respectively assigned to 512 sectors 50.

The host apparatus 2 can access a first partial storage area 5A constituted by 496 sectors 50 assigned with physical addresses 000h to 1EFh. On the other hand, the host apparatus 2 cannot access a second partial storage area 5B constituted by 16 sectors 50 assigned with physical addresses 1F0h to 1FFh. The second partial storage area 5B stores the control program 300 as firmware.

Each sector 50 includes user data area 50A and redundant area 50B. The controller 30 can write output data 210 from the host apparatus 2 to user data area 50A of each sector 50 of the first partial storage area 5A.

Figure 3:
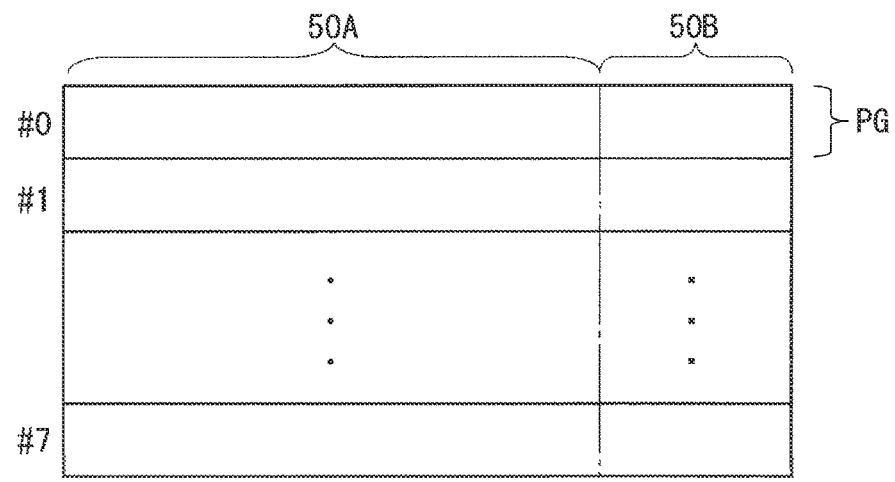
FIG. 3 is a view showing an example of the composition of sectors.

FIG. 3 is a view showing an example of the composition of each sector 50. As shown in FIG. 3, each sector 50 is constituted by M (M≥2) pages PG. In this case, although M=8, M may be a value other than 8. In the data processing system 1, data can be written to and read from the storage area 5 for each page PG. The data processing system 1 can perform a data write and a data read independently with respect to user data area 50A and redundant area 50B. In this case, numbers 0 to 7 are respectively assigned to eight pages PG constituting sector 50. Subsequently, mth (0≤m≤7) page PG will sometimes be referred to as "page m" hereinafter.

In this case, the memory device 3 is a flash memory. For this reason, when writing data to sector 50, the controller 30 needs to write the data to sector 50 after erasing data from sector 50. A data write will sometimes be referred to as a "program".

In this case, 256 sectors 50 of 496 sectors 50 constituting the first partial storage area 5A are used as R/W access sectors 50. On the other hand, each of 240 sectors 50 of the 496 sectors 50 is used as erasure completion sector 50 or erasure waiting sector 50. In this case, R/W access sector 50 is sector 50 that allows the host apparatus 2 to perform a data write and a data read via the controller 30. R/W access sector 50 can be said to be a host access area that is an erasure unit area that allows the host apparatus 2 to perform a data write and a data read via the controller 30.

Erasure completion sector 50 is sector 50 from which data has been erased. The host apparatus 2 cannot access erasure completion sector 50. Erasure completion sector 50 can be said to be an erasure completion area that is an erasure unit area from which data has been erased.

Erasure waiting sector 50 is sector 50 that is waiting for data erasure. The host apparatus 2 cannot access erasure waiting sector 50. Erasure waiting sector 50 can be said to be an erasure waiting area that is an erasure unit area that is waiting for data erasure.

As described later, when the data processing system 1 is operating, sector 50 of the first partial storage area 5A sometimes changes from R/W access sector 50 to erasure waiting sector 50. In addition, sector 50 of the first partial storage area 5A sometimes changes from erasure waiting sector 50 to erasure completion sector 50. Sector 50 of the first partial storage area 5A sometimes changes from erasure completion sector 50 to R/W access sector 50. When the data processing system 1 is operating, sector 50 of the first partial storage area 5A sometimes repeatedly changes to R/W access sector 50, erasure waiting sector 50, and erasure completion sector 50 in this order. Subsequently, sector 50 simply indicates sector 50 of the first partial storage area 5A.

<Operation Modes of Memory Device>

Figure 4:
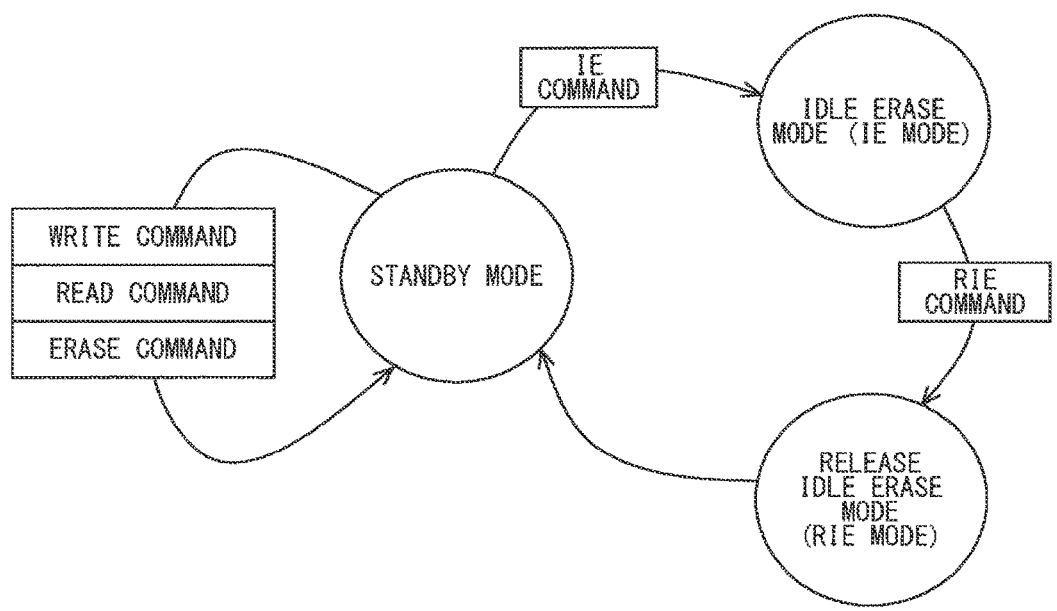
FIG. 4 is a view showing an example of operation modes.

FIG. 4 is a view showing an example of the operation modes of the controller 30. The operation modes of the controller 30 include a standby mode, an idle erase mode (to be referred to as an "IE mode" hereinafter), and a release idle erase mode (to be referred to as an "RIE mode" hereinafter). The standby mode, the IE mode, and the RIE mode can be regarded as the operation modes of the memory device 3. Note that the operation modes of the controller 30 may include other modes.

The controller 30 in the standby mode can accept a write command, read command, and erase command from the host apparatus 2. A write command is a command to write data to sector 50. The host apparatus 2 can write data to the memory core 4 in units of pages PG by using write commands. A write command will sometimes be referred to as a page program command (PP command). A read command is a command to read data from sector 50. The host apparatus 2 can read data from the memory core 4 in units of pages PG by using read commands. An erase command is a command to erase data from sector 50, and will sometimes be referred to as a sector erase command (SE command).

Upon receiving a write command, the controller 30 writes the data output from the host apparatus 2 to page PG in sector 50 designated by the host apparatus 2. In addition, upon receiving a read command, the controller 30 reads data from page PG in sector 50 designated by the host apparatus 2, and outputs the read data to the host apparatus 2 via the I/F circuit 33.

The controller 30 in the standby mode can also accept an IE command that is an instruction command to operate in the IE mode, output from the host apparatus 2. Upon receiving an IE command, the controller 30 changes the operation mode from the standby mode to the IE mode.

The controller 30 in the IE mode erases data from erasure waiting sector 50. The controller 30 in the IE mode then sets erasure waiting sector 50, from which data has been erased, as erasure completion sector 50.

In addition, the controller 30 in the IE mode can accept an RIE command, which is a release command to release the IE mode, output from the host apparatus 2. Upon receiving an RIE command, the controller 30 changes the operation mode from the IE mode to the RIE mode and then changes the mode to the standby mode.

When there is erasure waiting sector 50 from which data has been erased partway in the IE mode, the controller 30 in the RIE mode erases un-erased data from erasure waiting sector 50. The controller 30 then sets erasure waiting sector 50 from which un-erased data has been erased as erasure completion sector 50. Thereafter, the controller 30 changes the operation mode to the standby mode. In addition, when there is no erasure waiting sector 50 from which data has been erased partway, the controller 30 changes the operation mode to the standby mode without performing any specific processing.

In this case, upon receiving an erase command from the host apparatus 2, the controller 30 in the standby mode changes erasure completion sector 50 to R/W access sector 50 instead of erasing data from sector 50 designated by the host apparatus 2. This operation appears to the host apparatus 2 as erasure of data from designated sector 50. The controller 30 then sets sector 50 from which data has not been erased as erasure waiting sector 50, and erases data from erasure waiting sector 50 in the IE mode.

Note that the operations of the controller 30 in the standby mode, the IE mode, and the RIE mode will be described in detail later.

<Tables used by Memory Device>

The controller 30 accesses the memory core 4 using two types of tables in accordance with a command from the host apparatus 2. More specifically, the controller 30 uses a logical/physical translation table (to be referred to as an "L2P table" hereinafter) 60 indicating the correspondence relationship between physical addresses and logical addresses (to be sometimes referred to as "logical ADDs" hereinafter) of R/W access sectors 50 and a management table 70 for managing the physical addresses of erasure completion sectors 50 and erasure waiting sectors 50. The physical addresses of erasure completion sectors 50 and erasure waiting sectors 50 are registered in the management table 70. When the memory device 3 is started up, that is, the power supply of the memory device 3 is switched from OFF to ON, the controller 30 generates the L2P table 60 and the management table 70 and stores them in the volatile memory 32.

FIG. 5 is a view showing an example of the L2P table 60. FIG. 6 is a view showing an example of the management table 70. In the L2P table 60, the physical addresses of 256 R/W access sectors 50 are associated with 256 logical addresses. In the case shown in FIG. 5, the physical addresses of 256 R/W access sectors 50 are respectively associated with 256 logical addresses 00h to FFh. In the L2P table 60, no logical address changes. In contrast to this, sectors 50 set as R/W access sectors 50 change. In the L2P table 60, therefore, physical addresses associated with the logical addresses change. The host apparatus 2 manages logical addresses, and designates a logical address to designate R/W access sector 50 subjected to a data write and a data read. The physical address of R/W access sector 50 will sometimes be referred to as the "R/W access address" hereinafter.

In the management table 70, 240 physical addresses are registered concerning erasure completion sectors 50 and erasure waiting sectors 50. In the management table 70, 240 numbers are respectively assigned as assignment numbers to 240 physical addresses. In the case shown in FIG. 6, 240 serial numbers from 00h to EFh are respectively assigned as assignment numbers to 240 physical addresses. In the management table 70, the registered assignment numbers do not change. In contrast to this, sectors 50 set as erasure completion sectors 50 change, and sectors 50 set as erasure waiting sectors 50 change. Accordingly, in the management table 70, physical addresses associated with the assignment numbers change. As erasure completion sector 50 changes to R/W access sector 50, the controller 30 updates the management table 70 according to the change.

In addition, the controller 30 manages the physical addresses of erasure completion sectors 50 and erasure waiting sectors 50 using erasure completion pointer SP indicating one of a plurality of physical addresses registered in the management table 70 and erasure waiting pointer EP indicating one of the plurality of physical addresses.

Predetermined ordinal numbers are assigned to a plurality of physical addresses in the management table 70. More specifically, assignment numbers are assigned as predetermined ordinal numbers to the respective physical addresses. The controller 30 cyclically moves erasure completion pointer SP and erasure waiting pointer EP respectively in the order of assignment numbers (serial numbers 00h to EFh).

When the 240 physical addresses registered in the management table 70 are cyclically seen in the order of the assignment numbers, physical addresses ranging from the physical address indicated by erasure completion pointer SP to the physical address immediately preceding the physical address indicated by erasure waiting pointer EP are the physical addresses of erasure completion sectors 50. When the 240 physical addresses registered in the management table 70 are cyclically seen in the order of the assignment numbers, physical addresses ranging from the physical address indicated by erasure waiting pointer EP to the physical address immediately preceding the physical address indicated by erasure completion pointer SP are the physical addresses of erasure waiting sectors 50.

In the case shown in FIG. 6, when the 240 physical addresses registered in the management table 70 are cyclically seen in the order of the assignment numbers, 238 physical addresses ranging from 000h indicated by erasure waiting pointer EP to 1EDh immediately preceding 1EEh indicated by erasure completion pointer SP are the physical addresses of erasure waiting sectors 50. When the 240 physical addresses registered in the management table 70 are cyclically seen in the order of the assignment numbers, two physical addresses including 1EEh indicated by erasure completion pointer SP and 1EFh immediately preceding 000h indicated by erasure waiting pointer EP are the physical addresses of erasure completion sectors 50.

In this case, erasure waiting pointer EP and erasure completion pointer SP are mounted in the controller 30 by hardware circuits. However, these pointers may be implemented by software. That is, the microprocessor 31 that executes the control program 300 may generate erasure waiting pointer EP and erasure completion pointer SP.

Subsequently, the physical address of erasure waiting sector 50 will sometimes be referred to as the "erasure waiting address", and the physical address of erasure completion sector 50 will sometimes be referred to as the "erasure completion address".

Upon receiving an erase command from the host apparatus 2, the controller 30 in the standby mode replaces an R/W access address corresponding to the logical address designated by the host apparatus 2 with the erasure completion address of erasure completion sector 50 which is indicated by erasure completion pointer SP in the L2P table 60. With this operation, the physical address of sector 50 that is changed from erasure completion sector 50 to R/W access sector 50 is registered in the L2P table 60. In addition, in the management table 70, the controller 30 in the standby mode replaces the erasure completion address of erasure completion sector 50 indicated by erasure completion pointer SP with an R/W access address corresponding to the logical address designated by the host apparatus 2, and moves erasure completion pointer SP so as to indicate the next physical address. With this operation, the physical address of sector 50 that is changed from R/W access sector 50 to erasure waiting sector 50 is registered in the management table 70.

Figure 7:
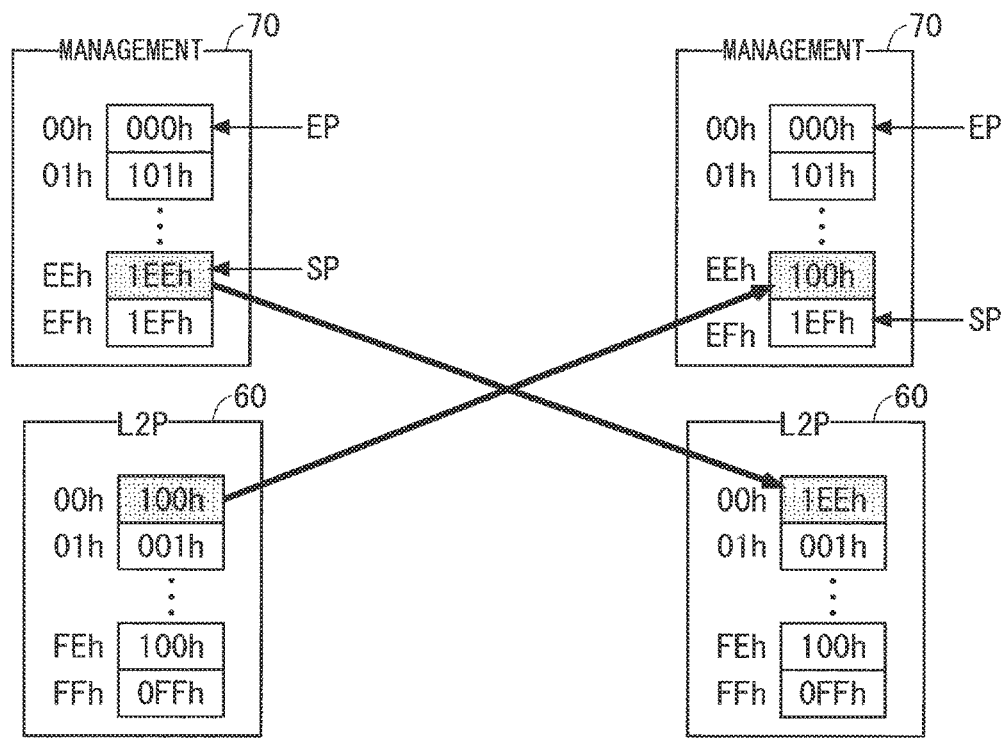
FIG. 7 is a view for explaining an example of an operation of a memory device.

FIG. 7 shows an example of how an R/W access address corresponding to the logical address designated by the host apparatus 2 is replaced with the erasure completion address indicated by erasure completion pointer SP in the L2P table 60. In addition, FIG. 7 shows an example of how the erasure completion address indicated by erasure completion pointer SP is replaced with an R/W access address corresponding to the logical address designated by the host apparatus 2, and erasure completion pointer SP is moved so as to indicate the next physical address in the management table 70. In the case shown in FIG. 7, in the L2P table 60, R/W access address 100h corresponding to logical address 00h designated by the host apparatus 2 is replaced with erasure completion address 1EEh indicated by erasure completion pointer SP. In addition, in the case shown in FIG. 7, in the management table 70, erasure completion address 1EEh indicated by erasure completion pointer SP is replaced with R/W access address 100h corresponding to the logical address designated by the host apparatus 2.

The controller 30 in the IE mode erases data from erasure waiting sector 50 assigned with the physical address indicated by erasure waiting pointer EP, changes erasure waiting sector 50 to erasure completion sector 50, and moves erasure waiting pointer EP so as to indicate the next physical address in the management table 70. With this operation, the physical address of sector 50 from which data has been erased is registered as an erasure completion address in the management table 70.

Figure 8:
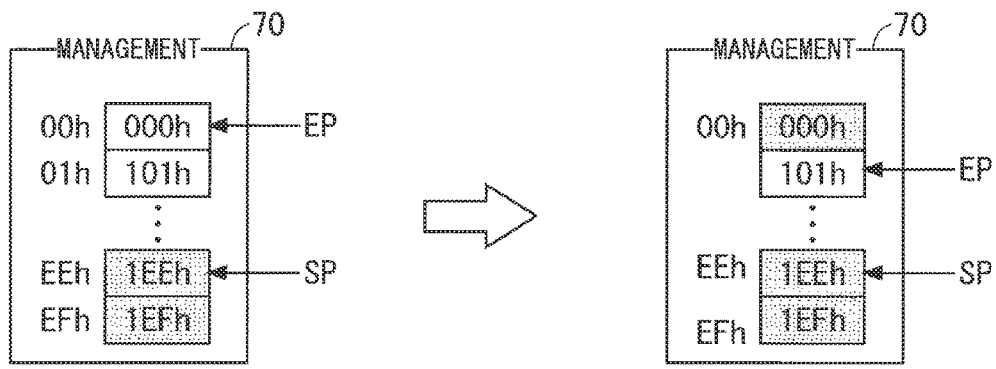
FIG. 8 is a view for explaining an example of the operation of the memory device.

FIG. 8 shows an example of how erasure waiting pointer EP is moved to indicate the next physical address. Referring to FIG. 8, erasure completion addresses are indicated by hatching. In the case shown in FIG. 8, data is erased from erasure waiting sector 50 assigned with physical address 000h indicated by erasure waiting pointer EP, and erasure waiting pointer EP is moved to the next address. In the case shown in FIG. 8, physical address 000h of sector 50, from which data has been erased, has changed to an erasure completion address.

Note that when erasure completion pointer SP and erasure waiting pointer EP indicate the same physical address, all the physical addresses registered in the management table 70 are set as erasure completion addresses or erasure waiting addresses. When erasure completion pointer SP moves to the next address and erasure completion pointer SP and erasure waiting pointer EP indicate the same physical address, all the physical addresses registered in the management table 70 become erasure waiting addresses. In contrast, when erasure waiting pointer EP moves to the next address and erasure completion pointer SP and erasure waiting pointer EP indicate the same physical address, all the physical addresses registered in the management table 70 become erasure completion addresses.

As described above, the controller 30 manages erasure completion addresses and erasure waiting addresses with one management table 70 by using erasure completion pointer SP and erasure waiting pointer EP, thereby reducing the storage capacity required to store the table required to manage erasure completion addresses and erasure waiting addresses.

Note that the controller 30 may use an erasure completion table in which erasure completion addresses are registered and an erasure waiting table in which erasure waiting addresses are registered. Because all 240 physical addresses become erasure completion addresses and all 240 physical addresses become erasure waiting addresses, an erasure completion table and an erasure waiting table each need to register 240 physical addresses. That is, the erasure completion table and the erasure waiting table require, as a whole, a storage capacity for storing 480 physical addresses. In contrast, when one management table 70 capable of registering 240 physical addresses is to be used as in this case, the table is only required to have a storage capacity for storing 240 physical addresses.

<Management Information Written to Redundant Area>

Figure 9:
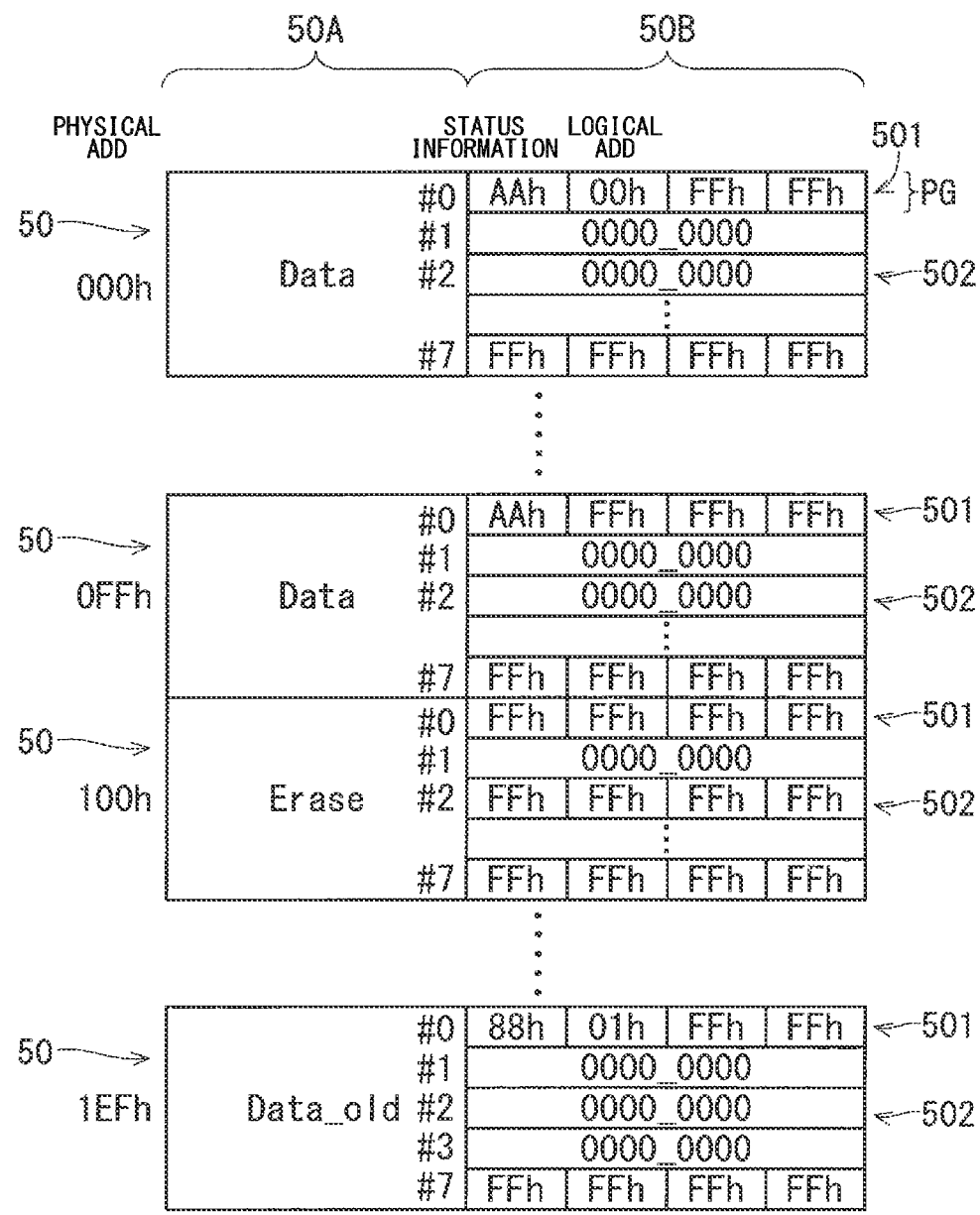
FIG. 9 is a view showing an example of data in sectors.

FIG. 9 is a view showing an example of information written to sector 50 in the first partial storage area 5A. As described above, the controller 30 can write output data 210 from the host apparatus 2 to user data area 50A of sector 50 in the first partial storage area 5A. On the other hand, the controller 30 uses redundant area 50B of sector 50 in the first partial storage area 5A to manage the state of sector 50. Subsequently, user data area 50A of sector 50 in the first partial storage area 5A, in particular, will sometimes be referred to as "host data area 50A". In addition, redundant area 50B of sector 50 in the first partial storage area 5A, in particular, will sometimes be referred to as "management area 50B".

In this case, page 0 in management area 50B of sector 50 is used as first management area 501 in which status information is stored. Status information is information indicating whether sector 50 storing it is R/W access sector 50, erasure completion sector 50, or erasure waiting sector 50. In addition, in first management area 501, a logical address is stored which is associated with the physical address of sector 50 having first management area 501 in the L2P table 60.

In this case, each page PG in redundant area 50B has a storage capacity of, for example, 4 bytes. In addition, each page PG in user data area 50A has a storage capacity of, for example, 512 bytes. Of 32-bit data that can be stored in first management area 501, for example, 1-byte data ranging from the 25th bit, counted from the lowest bit, to the 32nd bit indicates status information. In addition, of the 32-bit data, for example, 1-byte data ranging from the 17th bit, counted from the lowest bit, to the 24th bit indicates a logical address. In this case, of the 32-bit data, 2-byte data ranging from the first bit to the 16th bit are not used.

Status information indicates, for example, FFh when sector 50 storing the information is erasure completion sector 50. In addition, status information indicates, for example, AAh when sector 50 storing the information is R/W access sector 50. Furthermore, status information indicates, for example, 88h when sector 50 storing the information is erasure waiting sector 50.

Sector 50 assigned with physical address 000h and sector 50 assigned with physical address 0FFh shown in FIG. 9 are R/W access sectors 50. Sector 50 assigned with physical address 100h shown in FIG. 9 is erasure completion sector 50. Sector 50 assigned with physical address 1EFh shown in FIG. 9 is erasure waiting sector 50.

Status information in erasure completion sector 50 will sometimes be referred to as "erasure completion status information" hereinafter. In addition, status information in R/W access sector 50 will sometimes be referred to as "R/W access status information". Status information in erasure waiting sector 50 will sometimes be referred to as "erasure waiting status information".

Note that "Data" and "Data old" shown in host data area 50A in FIG. 9 respectively mean host output data 210 and erasure waiting output data 210 that the host apparatus 2 can read. "Erase" shown in host data area 50A in FIG. 9 means that no data is stored in host data area 50A. "Data", "Data old", and "Erase" shown in the subsequent drawings have the same meanings as those described above.

In this case, when data is erased from sector 50, the value of each bit in sector 50 indicates "1". The controller 30 can rewrite the value of each erasure completion bit in sector 50 from "1" to "0" by writing "0" to the bit. The controller 30 cannot rewrite the value of each bit in sector 50 from "1" to "0" unless data is erased from sector 50.

As described above, in this case, erasure completion status information indicates FFh. Because the information "FFh" is 1111_1111b (b represents a binary number) in binary notion, the value of each bit constituting erasure completion status information can be said to be the value of an erasure completion bit. When data is erased from sector 50 and sector 50 becomes erasure completion sector 50, the status information in erasure completion sector 50 automatically indicates FFh.

In addition, R/W access status information indicates AAh. The information "AAh" is 1010_1010b (b represents a binary number) in binary notion. Accordingly, R/W access status information coincides with the information obtained by changing values at the second bit, fourth bit, sixth bit, and eighth bit of erasure completion status information, counted from the highest bit, to "0". The controller 30 can change the status information in first management area 501 from erasure completion status information to R/W access status information by writing data "0" to one or more bits in first management area 501 storing erasure completion status information. More specifically, the controller 30 can change status information to R/W access status information by writing data "0" to the second bit, fourth bit, sixth bit, and eighth bit, counted from the highest bit, in an 8-bit area storing erasure completion status information, in first management area 501.

In addition, erasure waiting status information indicates 88h. The information "88h" is 1000_1000b (b represents a binary number) in binary notion. Accordingly, erasure waiting status information coincides with the information obtained by changing values at the third bit and the seventh bit of R/W access status information, counted from the highest bit, to "0". The controller 30 can change the status information in first management area 501 from R/W access status information to erasure waiting status information by writing data "0" to one or more bits in first management area 501 storing R/W access status information. More specifically, the controller 30 can change status information to erasure waiting status information by writing data "0" to the third bit and the seventh bit, counted from the highest bit, in an 8-bit area storing R/W access status information, in first management area 501.

In this case, pages 1 to 3 in management area 50B of sector 50 are used as second management area 502 indicating the updated state of status information. Pages 1 to 3 in second management area 502 respectively correspond to erasure completion sector 50, R/W access sector 50, and erasure waiting sector 50.

When changing sector 50 to erasure completion sector 50, the controller 30 writes first predetermined information to page 1 in second management area 502 of sector 50. In other words, when rewriting the status information in first management area 501 of sector 50 with FFh, the controller 30 writes first predetermined information to page 1 in second management area 502 of sector 50. When page 1 in second management area 502 is referred to as a first update management area, the controller 30 writes first predetermined information to the first update management area. The first predetermined information is, for example, 0000_0000h. In the following description, to write 0000_0000h to a given area is sometimes expressed as "to write all 0s". In this case, all 0s are written to the first update management area.

When changing sector 50 to R/W access sector 50, the controller 30 writes second predetermined information to page 2 in second management area 502 of sector 50. In other words, when rewriting the status information in first management area 501 of sector 50 with AAh, the controller 30 writes second predetermined information to page 2 in second management area 502 of sector 50. When page 2 in second management area 502 is referred to as a second update management area, the controller 30 writes second predetermined information to the second update management area. The second predetermined information is, for example, 0000_0000h.

When setting sector 50 as erasure waiting sector 50, the controller 30 writes third predetermined information to page 3 in second management area 502 of sector 50. In other words, when rewriting the status information in first management area 501 of sector 50 with 88h, the controller 30 writes third predetermined information to page 3 in second management area 502 of sector 50. When page 3 in second management area 502 is referred to as a third update management area, the controller 30 writes third predetermined information to the third update management area. The third predetermined information is, for example, 0000_0000h.

Subsequently, first predetermined information to third predetermined information are sometimes referred to as first status update information to third status update information. When there is no need to discriminate first status update information to third status update information from one another, the respective pieces of information are sometimes simply referred to as status update information.

As can be understood from the above description, sector 50 changes sector 50 from erasure completion sector 50 to R/W access sector 50, and changes sector 50 from R/W access sector 50 to erasure waiting sector 50. Accordingly, data is written to only page 1 in second management area 502 of erasure completion sector 50 (sector 50 assigned with physical address 100h in FIG. 9), and data is written to only pages 1 and 2 in second management area 502 of each of R/W access sectors 50 (sectors 50 assigned with physical addresses 000h and 0FFh in FIG. 9). In addition, data is written to all pages 1, 2, and 3 in second management area 502 of erasure waiting sector 50 (sector 50 assigned with physical address 1EFh in FIG. 9).

<Initial Shipment State of Sector>

Figure 10:
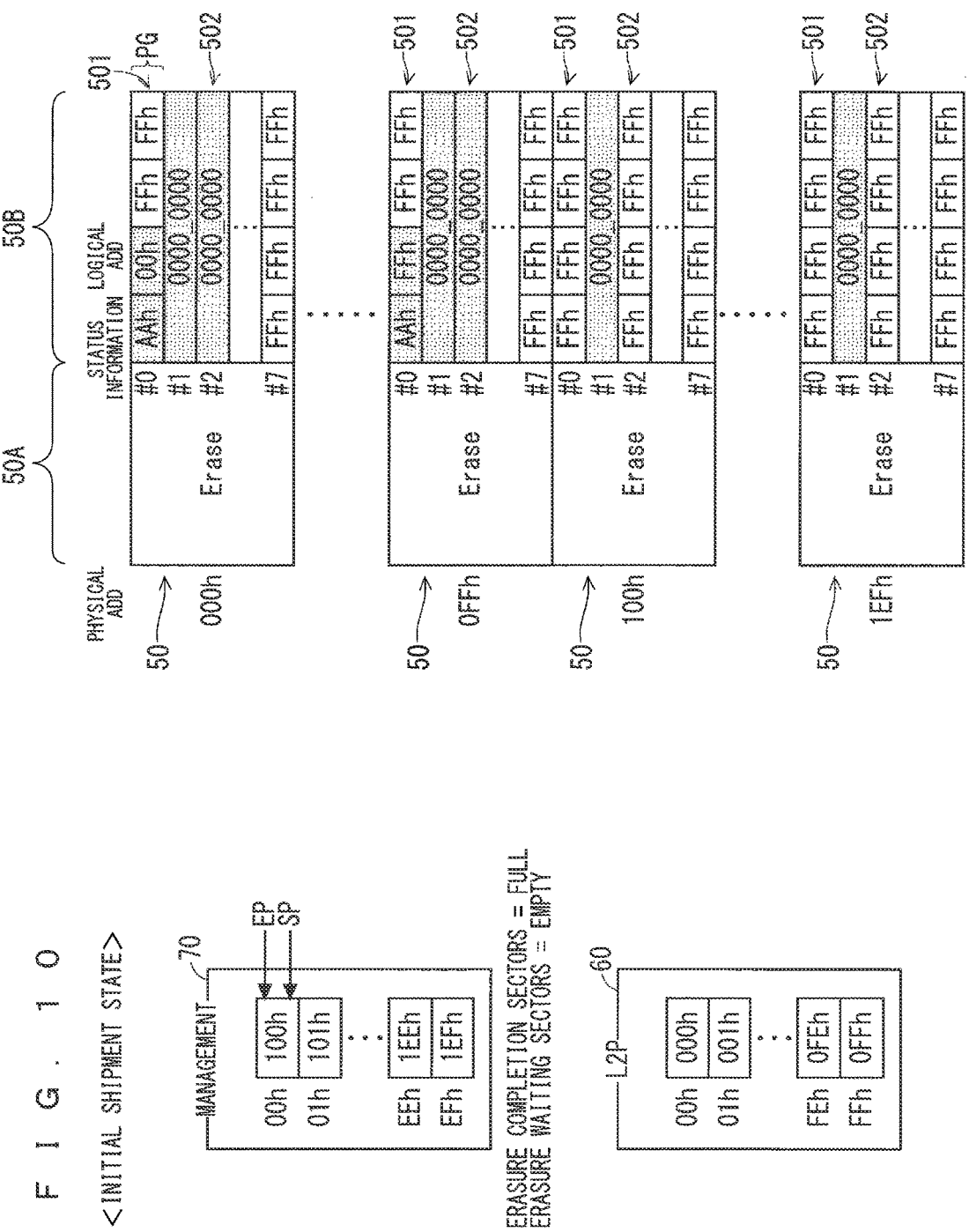
FIGS. 10 and 11 are views each for explaining an example of the operation of the memory device.

FIG. 10 is a view showing an example of the state of sector 50 at the time of shipment of the manufactured memory device 3. As shown in FIG. 10, in the memory device 3 in the initial shipment state, sectors 50 from physical address 000h to physical address 0FFh are set as R/W access sectors 50. In addition, logical addresses 00h to FFh are respectively stored in first management areas 501 of sectors 50 from physical address 000h to physical address 0FFh. When, therefore, the memory device 3 in the initial shipment state is started up, the L2P table 60 is generated, in which physical addresses 000h to 0FFh are respectively associated with logical addresses 00h to FFh, as shown in FIG. 10.

In addition, in the memory device 3 in the initial shipment state, sectors 50 from physical address 100h to physical address 1EFh are set as erasure completion sectors 50. Erasure completion sectors 50 are not included in the storage area 5 of the memory device 3 in the initial shipment state. When the memory device 3 in the initial shipment state is started up, the management table 70 is generated, in which, for example, physical addresses 100h to 1EFh are respectively associated with assignment numbers 00h to EFh, as shown in FIG. 10.

When the memory device 3 in the initial shipment state is started up, the controller 30 generates the L2P table 60 and the management table 70 and stores them in the volatile memory 32 on the basis of the status information and logical addresses in first management area 501 of each sector 50.

Note that "erasure completion sectors=Full" and "erasure waiting sectors=Empty" written in FIG. 10 and the subsequent drawings respectively mean that all the physical addresses in the management table 70 are erasure completion addresses, and no erasure waiting addresses are registered in the management table 70. In addition, "erasure completion sectors=Empty" and "erasure waiting sectors=Full" written in the subsequent drawings respectively mean that no erasure completion sectors are registered in the management table 70, and all the physical addresses in the management table 70 are erasure waiting addresses.

<Details of Each Operation Mode>

The standby mode, the IE mode, and the RIE mode will be described in detail next.

<Details of Standby Mode>
<Operation of Controller upon Reception of Write Command>

The host apparatus 2 outputs a logical address together with a write command. The host apparatus 2 also designates page PG as a write destination with respect to the memory device 3, and outputs data to be written to page PG. The types of write commands include a first write command to write data to host data area 50A and a second write command to write data to management area 50B.

In the memory device 3, upon receiving a write command, the controller 30 specifies a physical address (R/W access address) associated with the logical address output, together with the write command, from the host apparatus 2 in the L2P table 60. The controller 30 writes the data output from the host apparatus 2 to page PG designated by the host apparatus 2 in an area, of host data area 50A and management area 50B of sector 50 (R/W access sector 50) assigned with the specified physical address, which corresponds to the type of write command. At this time, the controller 30 outputs a write command to the memory core 4. Upon receiving the write command, the memory core 4 writes the data to sector 50. The controller 30 writes data to sector 50 without using the management table 70. Subsequently, the controller 30 notifies, via the I/F circuit 33, the host apparatus 2 of the completion of processing corresponding to the write command from the host apparatus 2.

Figure 11:
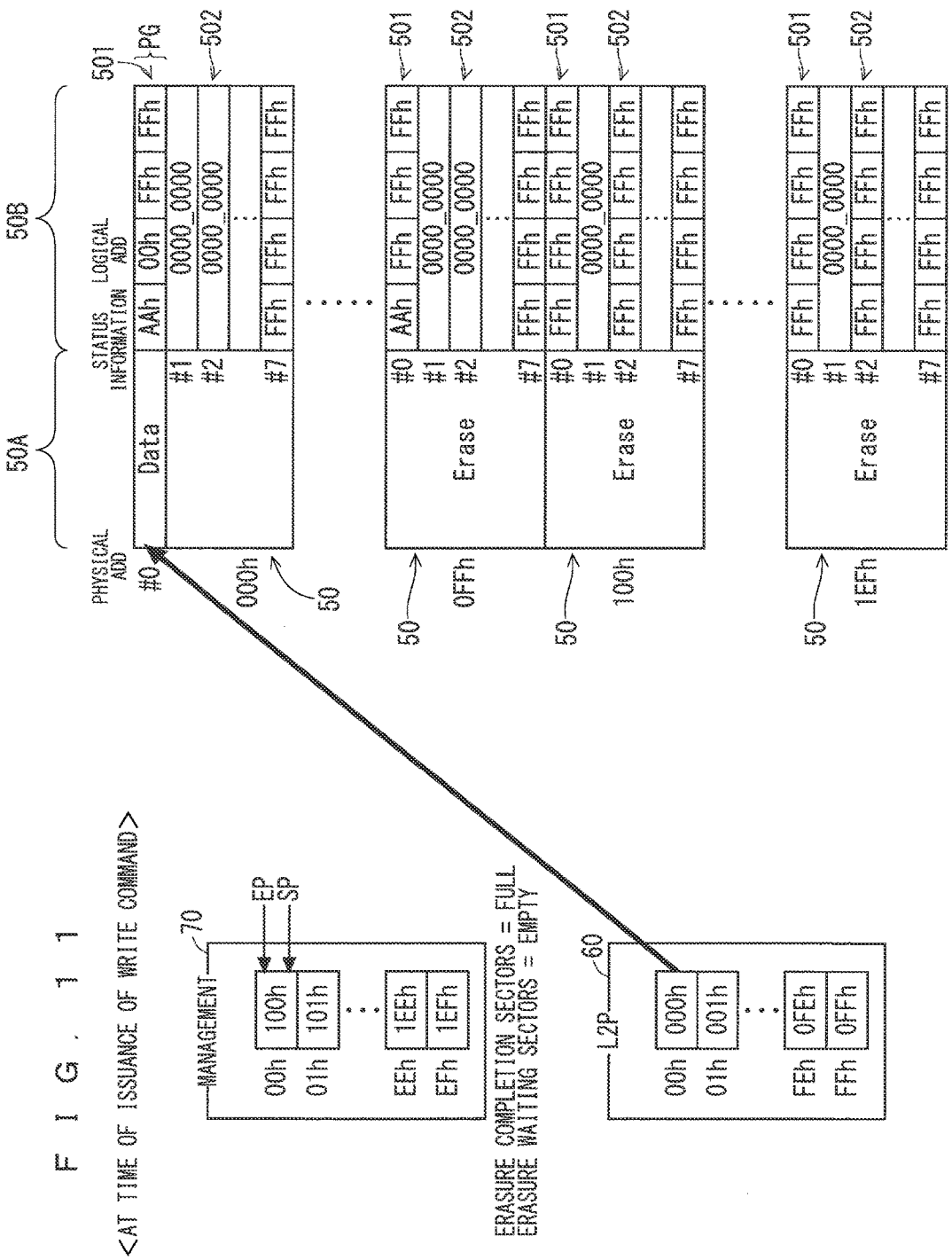

FIG. 11 is a view showing an example of how data from the host apparatus 2 is written to host data area 50A of sector 50. FIG. 11 shows a case in which the host apparatus 2 outputs a first write command and logical address 00h, and designates page 0 as page PG as a write destination. In the case shown in FIG. 11, because physical address 000h is associated with logical address 00h in the L2P table 60, the data output from the host apparatus 2 is written to page 0 in host data area 50A of R/W access address 50 assigned with physical address 000h.

<Operation of Controller upon Reception of Read Command>

The host apparatus 2 outputs a logical address together with a read command. The host apparatus 2 also designates page PG as a read target with respect to the memory device 3. The types of read commands include a first read command to read data from host data area 50A and a second read command to read data from management area 50B.

In the memory device 3, upon receiving a read command, the controller 30 specifies a physical address (R/W access address) associated with the logical address output from the host apparatus 2 together with the read command in the L2P table 60. The controller 30 then reads data from page PG designated by the host apparatus 2 in an area, of host data area 50A and management area 50B of sector 50 (R/W access sector 50) assigned with the specified physical address, which corresponds to the type of read command. At this time, the controller 30 outputs a read command to the memory core 4. Upon receiving the read command, the memory core 4 reads data from sector 50, and outputs the data to the controller 30. The controller 30 outputs the read data to the host apparatus 2 via the I/F circuit 33. The controller 30 reads data from sector 50 without using the management table 70.

<Operation of Controller upon Reception of Erase Command>

Figure 12:
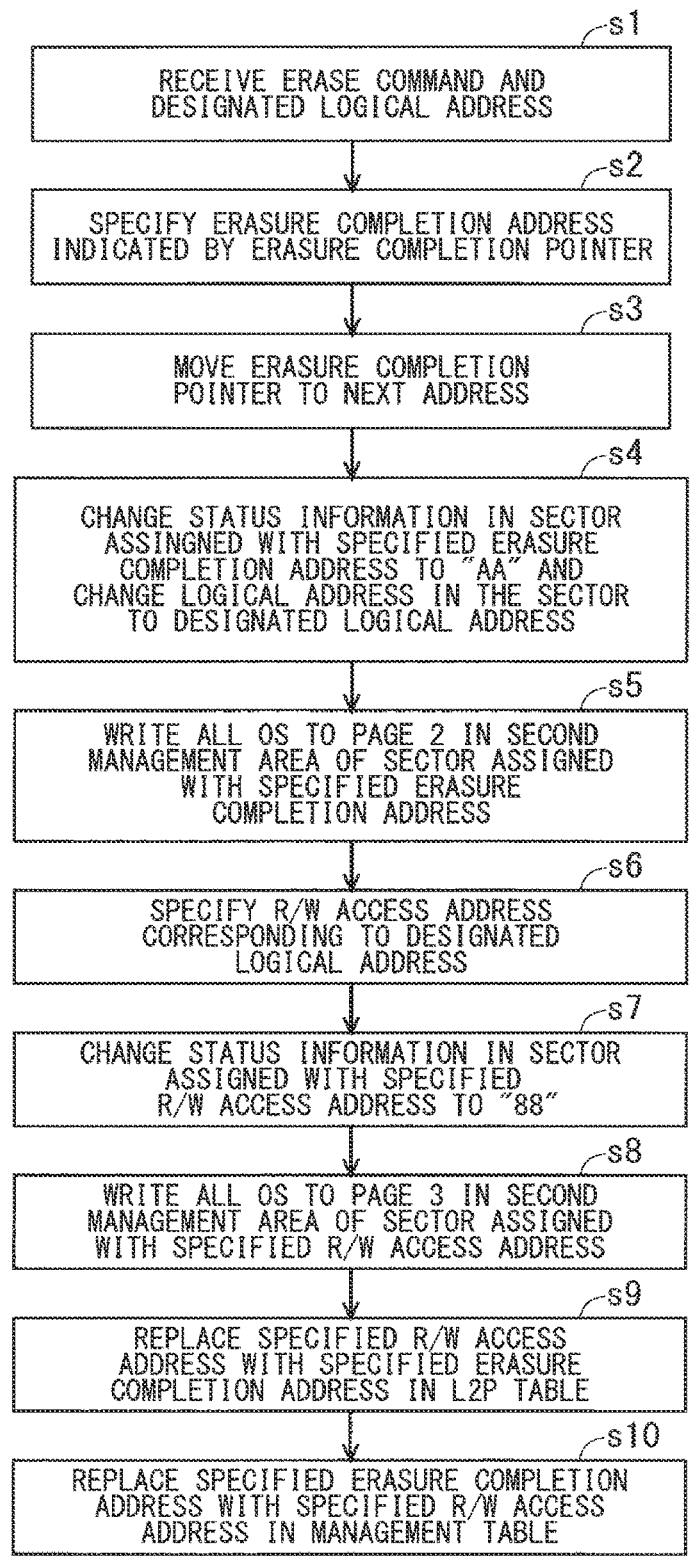
FIG. 12 is a flowchart showing an example of the operation of the memory device.

FIG. 12 is a flowchart showing an example of the operation of the controller 30 that receives an erase command when erasure waiting sector 50 is included in the memory core 4. The host apparatus 2 outputs a logical address together with a read command. In the following description, the logical address output from the host apparatus 2 will sometimes be referred to as a "designated logical address".

As shown in FIG. 12, upon receiving an erase command and a designated logical address from the host apparatus 2 in step s1, the controller 30 specifies the erasure completion address indicated by erasure completion pointer SP in step s2. This specified erasure completion address will be referred to as the "specified erasure completion address". In step s3, the controller 30 moves erasure completion pointer SP to the next address.

In step s4, the controller 30 changes erasure completion sector 50 assigned with the specified erasure completion address to R/W access sector 50. More specifically, the controller 30 changes the status information in first management area 501 of sector 50 assigned with the specified erasure completion address from FFh to AAh, and changes the logical address in first management area 501 to a designated logical address. The controller 30 writes data "0" to the second bit, fourth bit, sixth bit, and eighth bit, counted from the highest bit, in the 8-bit area storing the erasure completion status information (FFh) in first management area 501 of erasure completion sector 50, thereby changing the status information from erasure completion status information (FFh) to R/W access status information (AAh). The controller 30 can change status information from erasure completion status information (FFh) to R/W access status information (AAh) without erasing data from erasure completion sector 50, and hence can easily change status information.

In this case, upon writing data to page PG in sector 50, the controller 30 performs verification processing of reading data from page PG and determining whether the read data coincides with the written data, thereby checking whether the data has been correctly written. In step s4, upon writing data in first management area 501 (page 0) of sector 50 assigned with the specified erasure completion address and changing the status information and the logical address, the controller 30 performs verification processing. Subsequently, the controller 30 performs verification processing upon writing data to sector 50 even without any specific description.

In step s5, the controller 30 writes all 0s to page 2 in second management area 502 of sector 50 assigned with the specified erasure completion address.

In step s6, the controller 30 specifies an R/W access address corresponding to the designated logical address in the L2P table 60. This specified R/W access address will be referred to as the "specified R/W access address".

In step s7, the controller 30 changes R/W access sector 50 assigned with the specified R/W access address to erasure waiting sector 50. More specifically, the controller 30 changes the status information in first management area 501 of sector 50 assigned with the specified R/W access address from AAh to 88h. The controller 30 changes the status information from the R/W access status information (AAh) to the erasure waiting status information (88h) by writing data "0" to the third bit and the seventh bit, counted from the highest bit, in the 8-bit area storing the R/W access status information (AAh) in first management area 501 of R/W access sector 50. The controller 30 can change the status information from the R/W access status information (AAh) to the status information (88h) without erasing data from R/W access sector 50, and hence can easily change the status information.

In step s8, the controller 30 writes all 0s to page 3 in second management area 502 of sector 50 assigned with the specified R/W access address.

In step s9, the controller 30 replaces the specified R/W access address with the specified erasure completion address in the L2P table 60. In step s10, the controller 30 replaces the specified erasure completion address with the specified R/W access address in the management table 70. Upon execution of step s10, the controller 30 notifies, via the I/F circuit 33, the host apparatus 2 of the completion of processing corresponding to the erase command from the host apparatus 2.

With the above operation of the memory device 3, when the host apparatus 2 outputs an erase command and a designated logical address, the memory device 3 erases data from sector 50 corresponding to the designated logical address in a pseudo manner.

FIGS. 13 to 19 are views each for explaining an example of a series of operations of the controller 30 that has received an erase command and designated logical address 00h when sectors 50, the L2P table 60, and the management table 70 are set in the state shown in FIG. 11.

Figure 13:
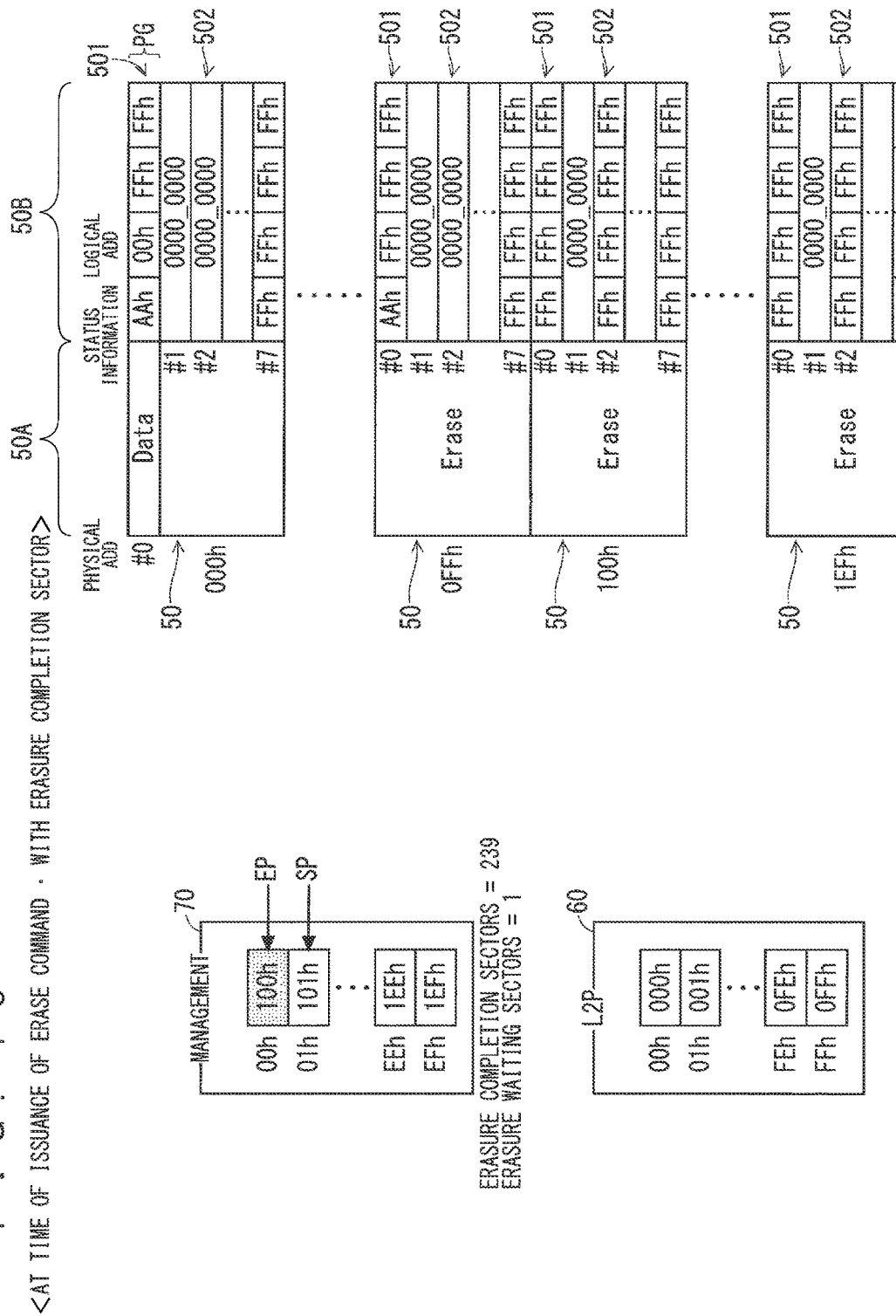
FIGS. 13 to 19 are views each for explaining an example of the operation of the memory device.

Upon receiving an erase command and designated logical address 00h (step s1), the controller 30 specifies erasure completion address 100h indicated by erasure completion pointer SP (see FIG. 13). As shown in FIG. 13, the controller 30 then moves erasure completion pointer SP to the next address. With this operation, the numbers of erasure completion sectors 50 and erasure waiting sectors 50 respectively becomes 239 and 1 on the management table 70. Referring to FIG. 13, "erasure completion sectors×239" means that the number of erasure completion sectors 50 is 239, and "erasure waiting sectors=1" means that the number of erasure waiting sectors 50 is 1.

Figure 14:
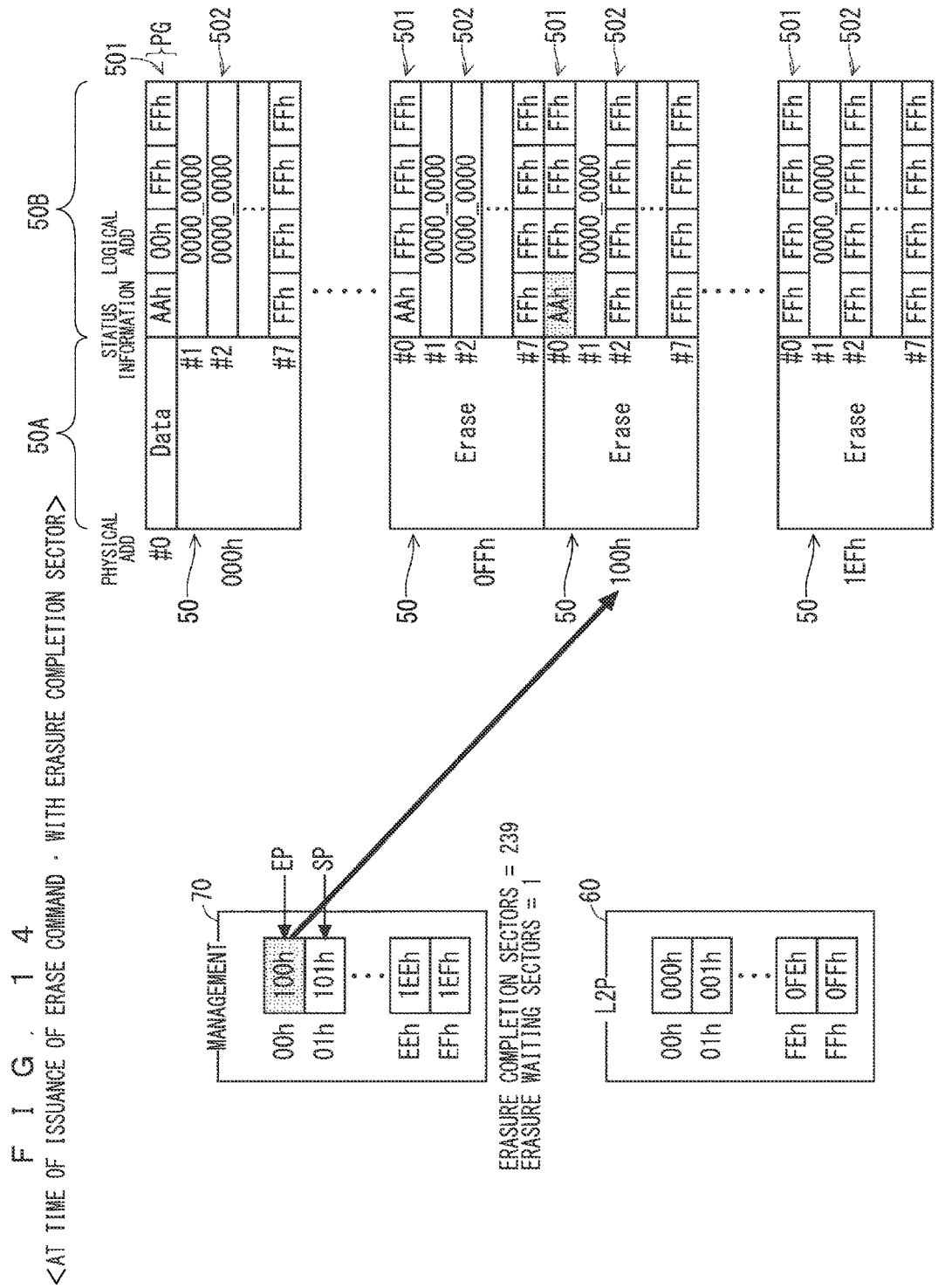
Figure 15:
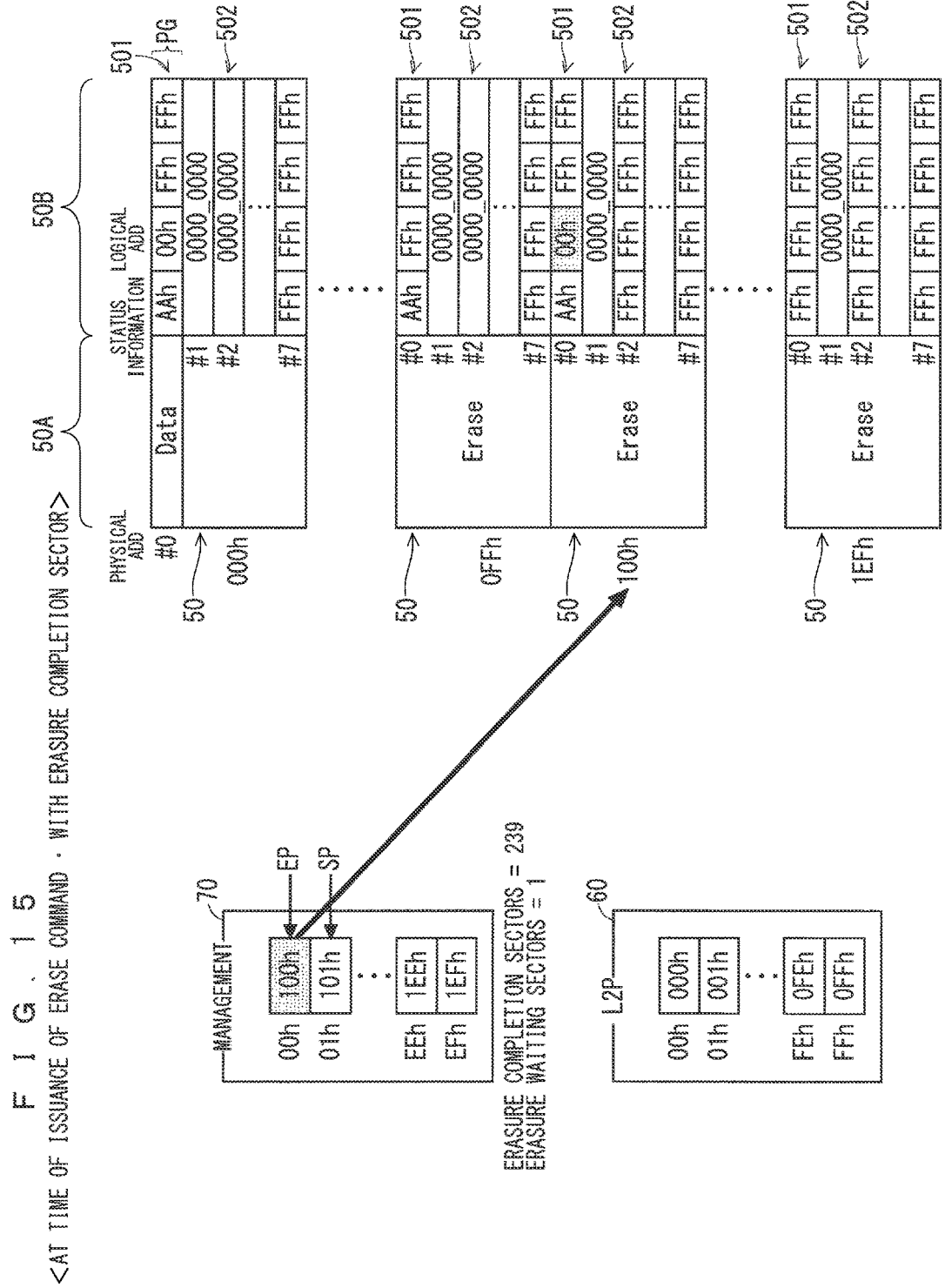

As shown in FIG. 14, the controller 30 then changes the status information in first management area 501 of sector 50 assigned with specified erasure completion address 100h from FFh to AAh (step s4). In addition, as shown in FIG. 15, the controller 30 changes logical address FFh in first management area 501 of sector 50 assigned with specified erasure completion address 100h to designated logical address 00h from the host apparatus 2 (step s4). This will change erasure completion sector 50 assigned with specified erasure completion address 100h to R/W access sector 50.

Figure 16:
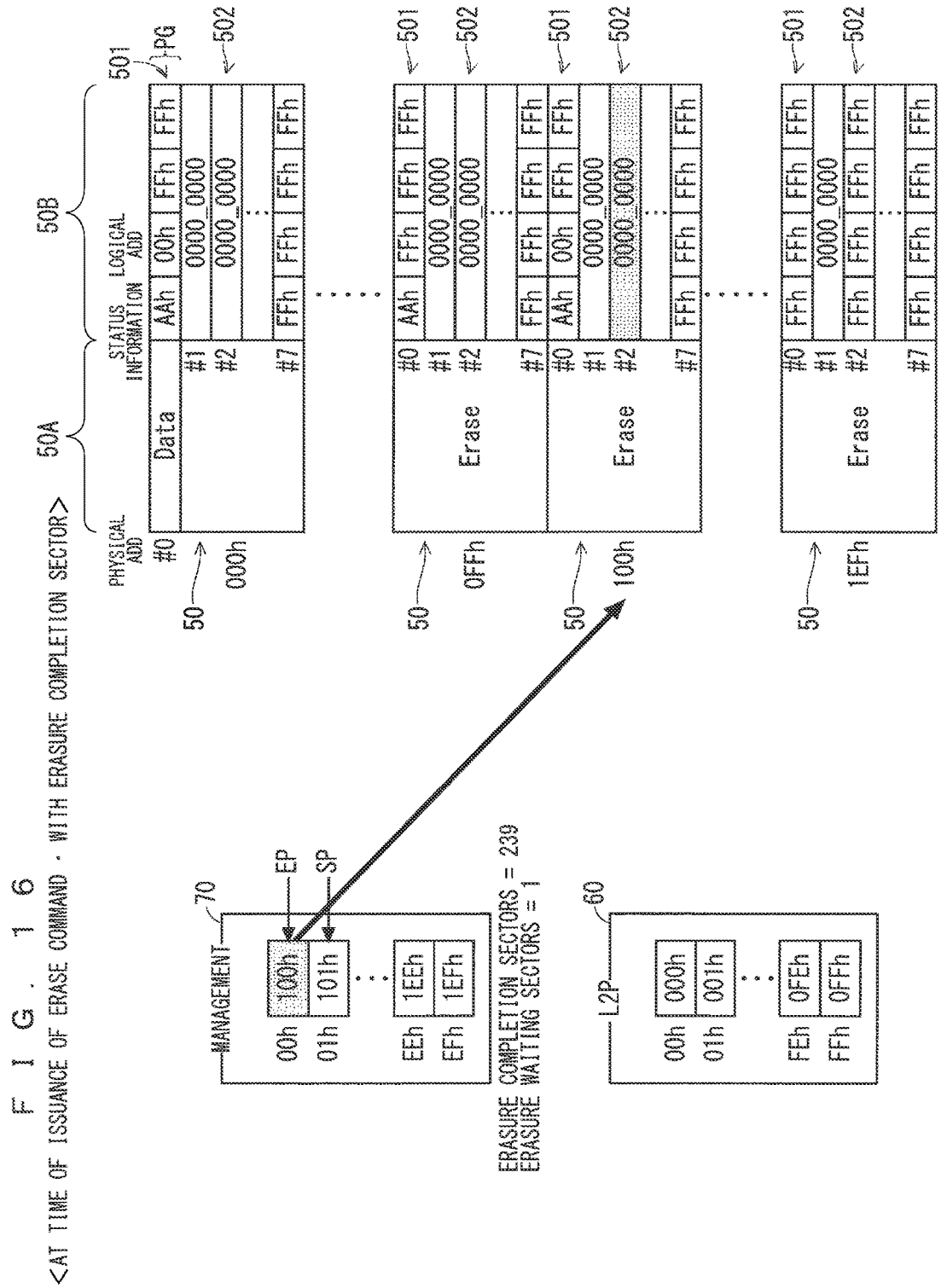

As shown in FIG. 16, the controller 30 writes all 0s to page 2 in second management area 502 of sector 50 assigned with specified erasure completion address 100h (step s5).

Figure 17:
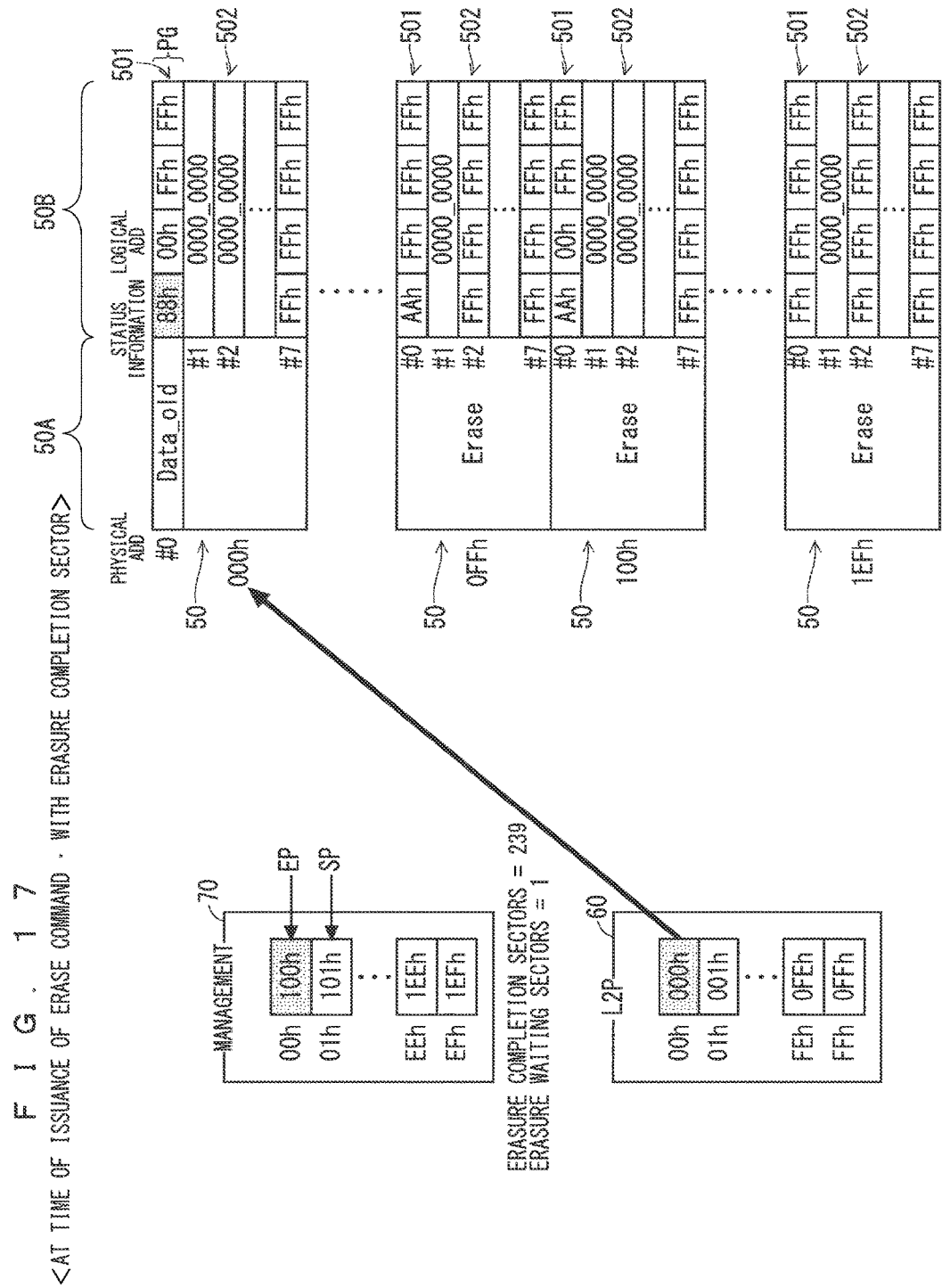

The controller 30 then specifies R/W access address 000h corresponding to the designated logical address in the L2P table 60 (step s6). As shown in FIG. 17, the controller 30 changes the status information in first management area 501 of R/W access sector 50 assigned with specified R/W access address 000h from AAh to 88h (step s7). With this operation, R/W access sector 50 assigned with specified R/W access address 000h is changed to erasure waiting sector 50.

Figure 18:
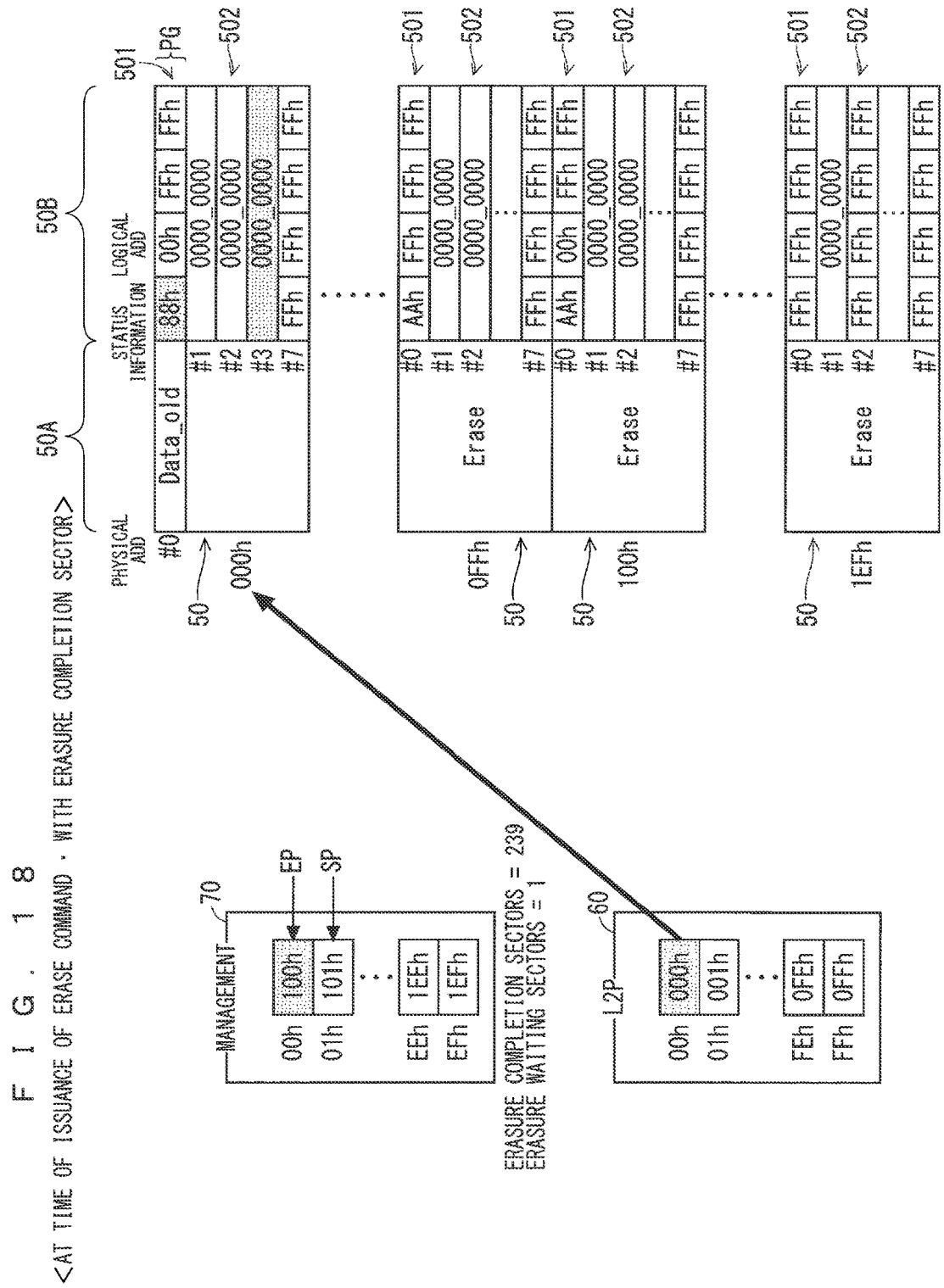

As shown in FIG. 18, the controller 30 then writes all 0s to page 3 in second management area 502 of sector 50 assigned with specified R/W access address 000h.

Figure 19:
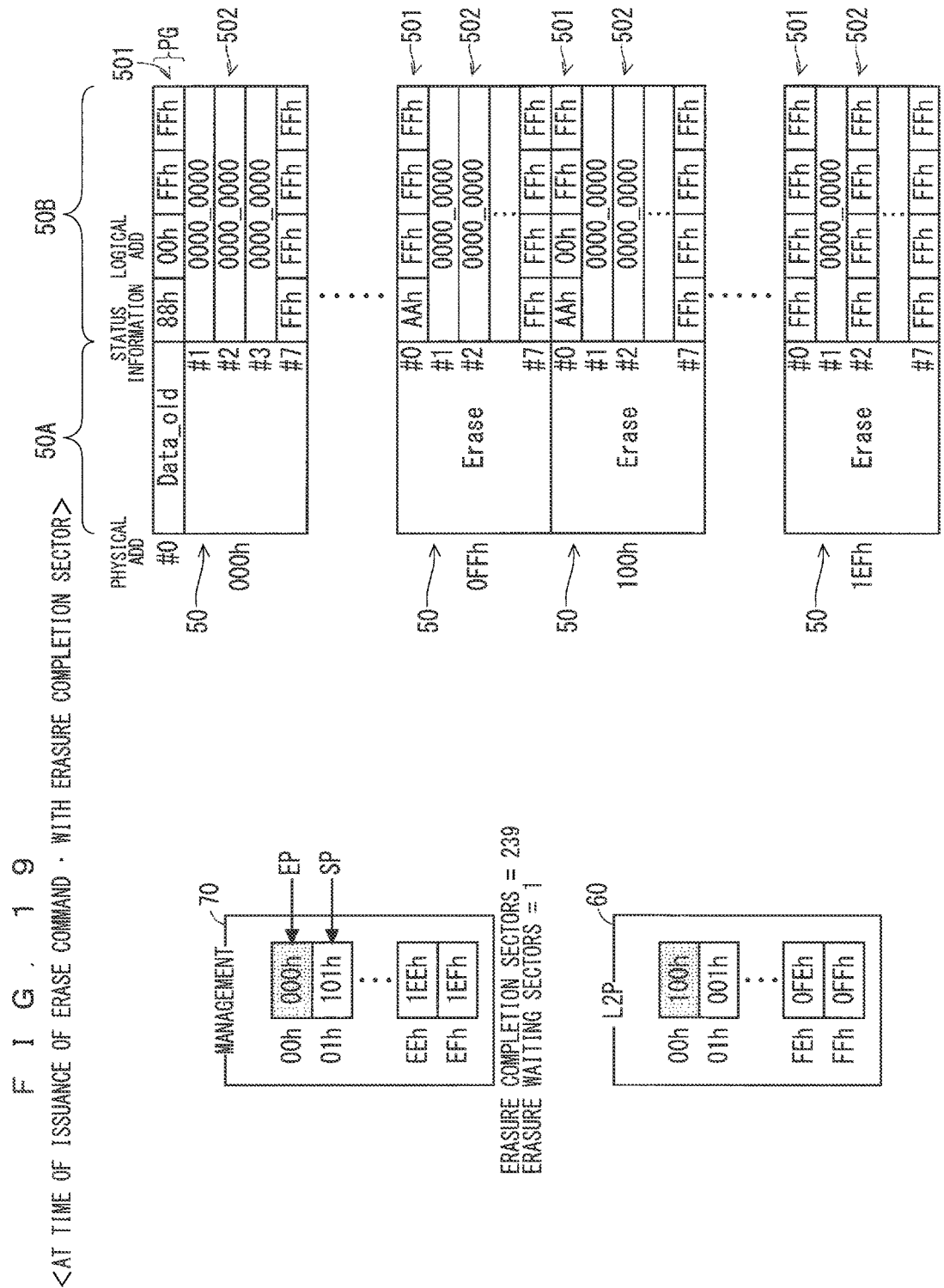

As shown in FIG. 19, the controller 30 replaces specified R/W access address 000h with specified erasure completion address 100h in the L2P table 60 (step s9). The controller 30 then replaces specified erasure completion address 100h with specified R/W access address 000h in the management table 70 (step s10). Thereafter, the controller 30 notifies the host apparatus 2, via the I/F circuit 33, of the completion of processing corresponding to the erase command from the host apparatus 2.

As described above, in this case, upon receiving an erase command and a designated logical address, the controller 30 erases data from sector 50 corresponding to the designated logical address in a pseudo manner by associating erasure completion sector 50 with the designated logical address instead of sector 50 without erasing data from sector 50 corresponding to the designated logical address. Because it requires much time to erase data from sector 50, erasing data from sector 50 in a pseudo manner as described above can greatly shorten the processing time in the controller 30. This therefore improves the performance of the memory device 3. In addition, the host apparatus 2 can shorten the time from output of an erase command to output of write command as compared with a case in which data is actually erased from sector 50. Accordingly, the host apparatus 2 can save data such as save data in the memory device 3 within a short period of time as compared with the case in which data is actually erased from sector 50.

Figure 20:
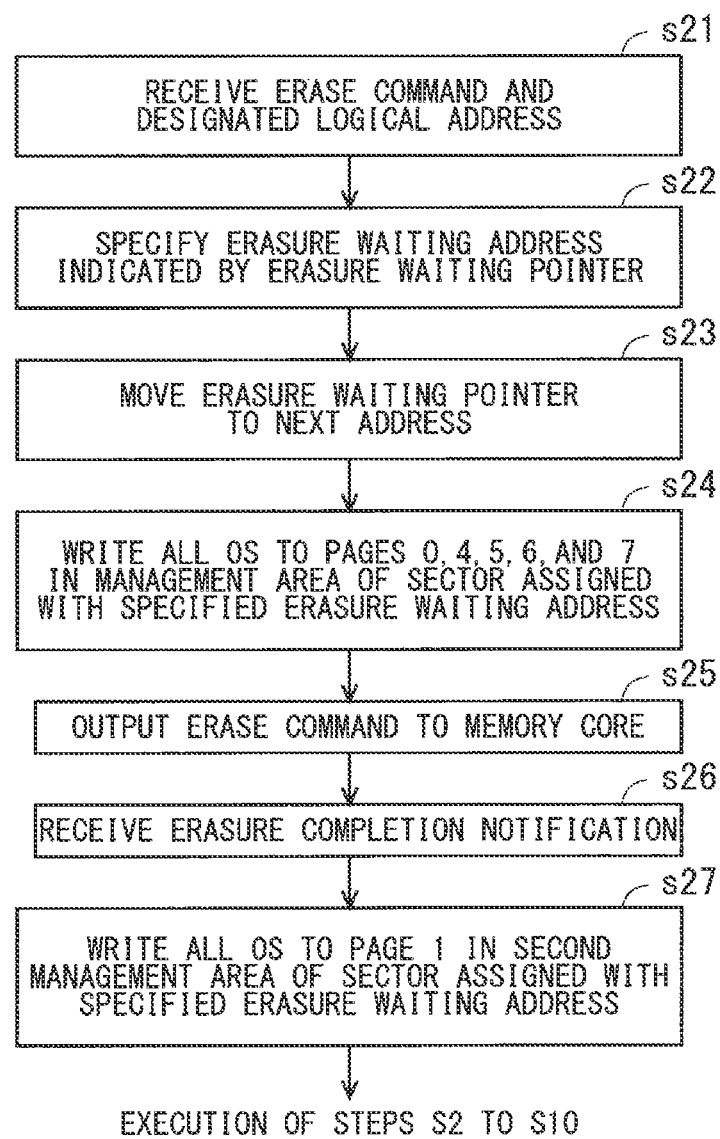
FIG. 20 is a flowchart showing an example of the operation of the memory device.

An operation of the controller 30 that receives an erase command when no erasure completion sector 50 is included in the memory core 4 will be described next. FIG. 20 is a flowchart showing an example of the operation. When no erasure completion sector 50 is included in the memory core 4, the controller 30 erases data from erasure waiting sector 50 to generate erasure completion sector 50 upon receiving an erase command. Thereafter, steps s2 to s10 described above are executed.

As shown in FIG. 20, upon receiving an erase command and a designated logical address from the host apparatus 2 in step s21, the controller 30 specifies the erasure waiting address indicated by erasure waiting pointer EP in step s22. This specified erasure waiting address will be referred to as a "specified erasure waiting address". In step s23, the controller 30 moves erasure waiting pointer EP to the next address.

In step s24, the controller 30 writes all 0s to pages 0, 4, 5, 6, and 7 in management area 50B of erasure waiting sector 50 assigned with the specified erasure waiting address.

In step s25, the controller 30 outputs an erase command to the memory core 4 to erase data from erasure waiting sector 50 assigned with the specified erasure waiting address. Upon receiving the erase command, the memory core 4 erases data from erasure waiting sector 50 assigned with the specified erasure waiting address. This changes erasure waiting sector 50 assigned with the specified erasure waiting address to erasure completion sector 50. Thereafter, the memory core 4 outputs, to the controller 30, an erasure completion notification that notifies the completion of data erasure.

Upon receiving the erasure completion notification in step s26, the controller 30 writes all 0s to page 1 in second management area 502 of erasure waiting sector 50 assigned with the specified erasure waiting address in step s27. Thereafter, the controller 30 executes steps s2 to s10 described above. After the execution of step s10, the controller 30 notifies, via the I/F circuit 33, the host apparatus 2 of the completion of processing corresponding to the erase command from the host apparatus 2.

FIG. 21 is a view showing an example of the states of sectors 50, the L2P table 60, and the management table 70 when no erasure completion sector 50 is included in the memory core 4. Sectors 50 assigned with physical addresses 000h and 0FFh shown in FIG. 21 are R/W access sectors 50. In addition, sectors 50 assigned with physical addresses 100h and 1EFh shown in FIG. 21 are erasure waiting sectors 50.

FIGS. 22 to 29 are views each for explaining an example of a series of operations of the controller 30 that has received an erase command and designated logical address 00h when sectors 50, the L2P table 60, and the management table 70 are set in the states shown in FIG. 21.

Upon receiving the erase command and designated logical address 00h (step s21), the controller 30 specifies erasure waiting address 100h indicated by erasure waiting pointer EP (step s22). As shown in FIG. 22, the controller 30 moves erasure waiting pointer EP to the next address (step s23).

As shown in FIG. 22, the controller 30 writes all 0s to pages 0, 4, 5, 6, and 7 in management area 50B of erasure waiting sector 50 assigned with specified erasure waiting address 100h (step s24).

The controller 30 then outputs an erase command to the memory core 4 (step s25). This erases data from erasure waiting sector 50 assigned with erasure waiting address 100h, as shown in FIG. 23.

Thereafter, upon receiving an erasure completion notification from the memory core 4 (step s26), the controller 30 writes all 0s to page 1 in second management area 502 of erasure waiting sector 50 assigned with specified erasure waiting address 100h, as shown in FIG. 24 (step s27).

The controller 30 specifies erasure completion address 100h indicated by erasure completion pointer SP (step s2). As shown in FIG. 25, the controller 30 then moves erasure completion pointer SP to the next address (step s3).

As shown in FIG. 25, the controller 30 then changes the status information in first management area 501 of sector 50 assigned with specified erasure completion address 100h from FFh to AAh (step s4). In addition, as shown in FIG. 26, the controller 30 changes logical address FFh in first management area 501 of sector 50 assigned with specified erasure completion address 100h to designated logical address 00h from the host apparatus 2 (step s4).

As shown in FIG. 27, the controller 30 then writes all 0s to page 2 in second management area 502 of sector 50 assigned with specified erasure completion address 100h (step s5).

Figure 28:
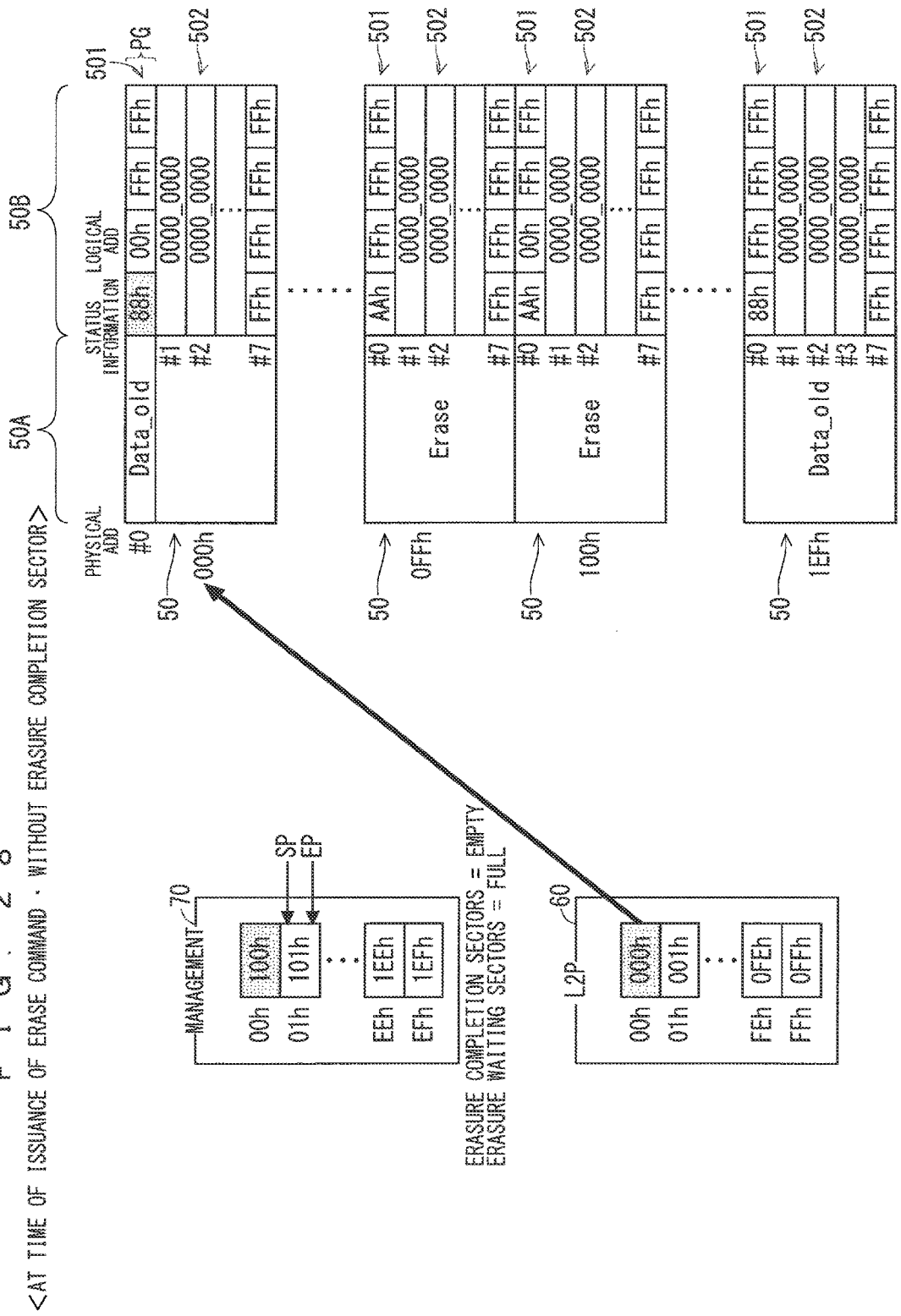

The controller 30 specifies R/W access address 000h corresponding to the designated logical address in the L2P table 60 (step s6). As shown in FIG. 28, the controller 30 then changes the status information in first management area 501 of R/W access sector 50 assigned with specified R/W access address 000h from AAh to 88h (step s7).

Figure 29:
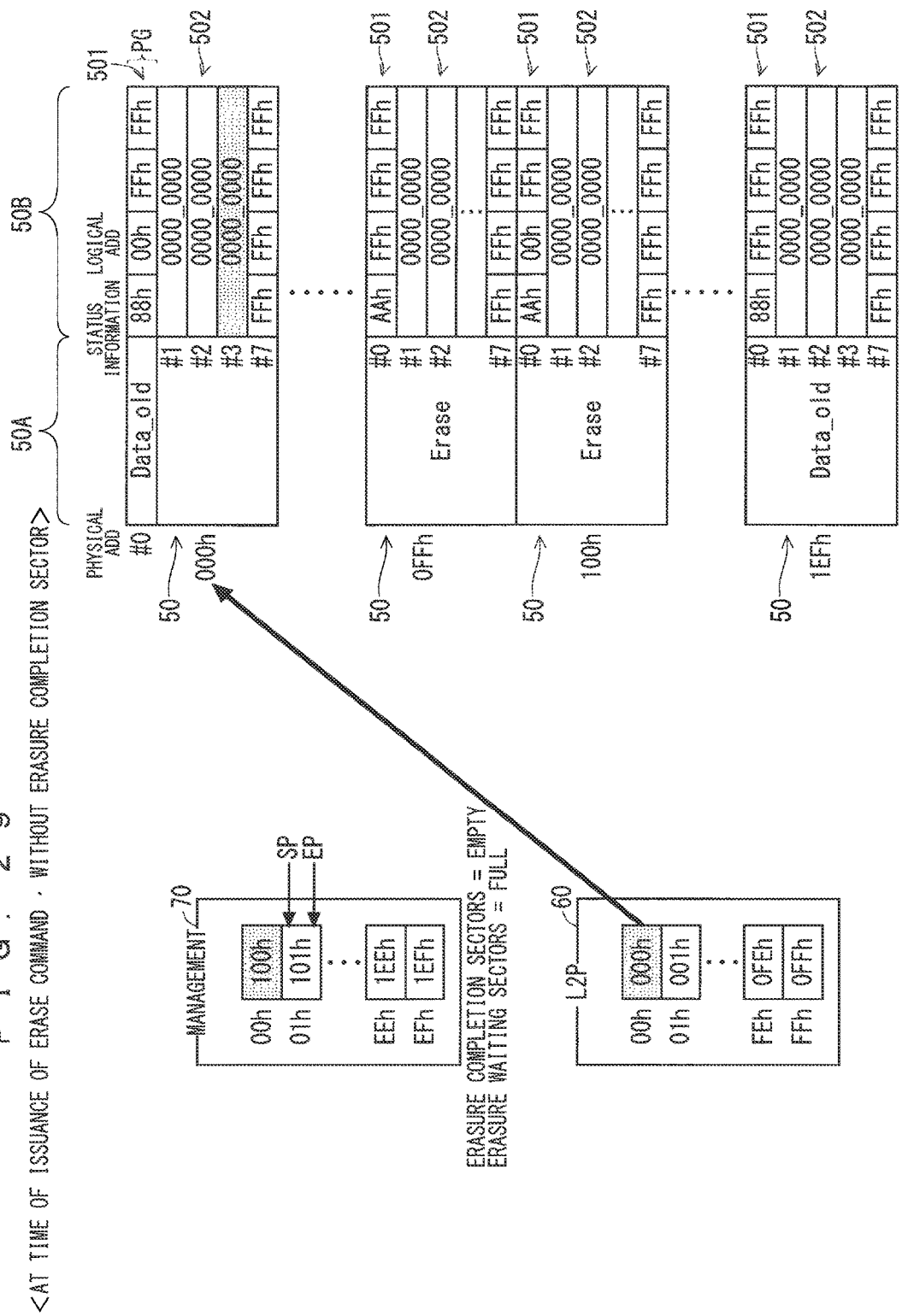

As shown in FIG. 29, the controller 30 writes all 0s to page 3 in second management area 502 of sector 50 assigned with specified R/W access address 000h.

Figure 30:
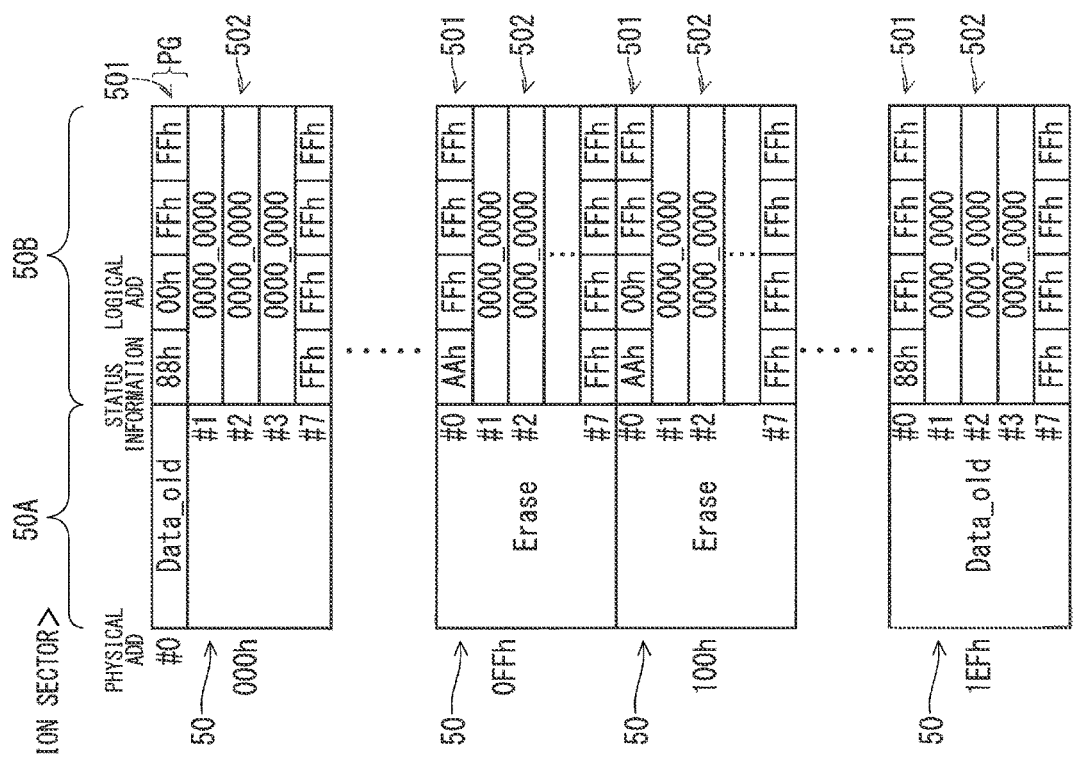

As shown in FIG. 30, the controller 30 replaces specified R/W access address 000h with specified erasure completion address 100h in the L2P table 60 (step s9). The controller 30 then replaces specified erasure completion address 100h with specified R/W access address 000h in the management table 70 (step s10). Thereafter, the controller 30 notifies, via the I/F circuit 33, the host apparatus 2 of the completion of processing corresponding to the erase command from the host apparatus 2.

Note that the order in which a plurality of processes are performed when the controller 30 receives an erase command is not limited to the above order. For example, step s3 may be executed at any timing after step s1. Steps s6 to s8 may be executed before steps s2 to s5. Step s10 may be executed before step s9. Steps s9 and s10 may be executed at any timing after steps s2 and s6. In addition, step s5 may be executed before step s4. Furthermore, step s8 may be executed before step s7.

<Details of IE Mode>

Figure 31:
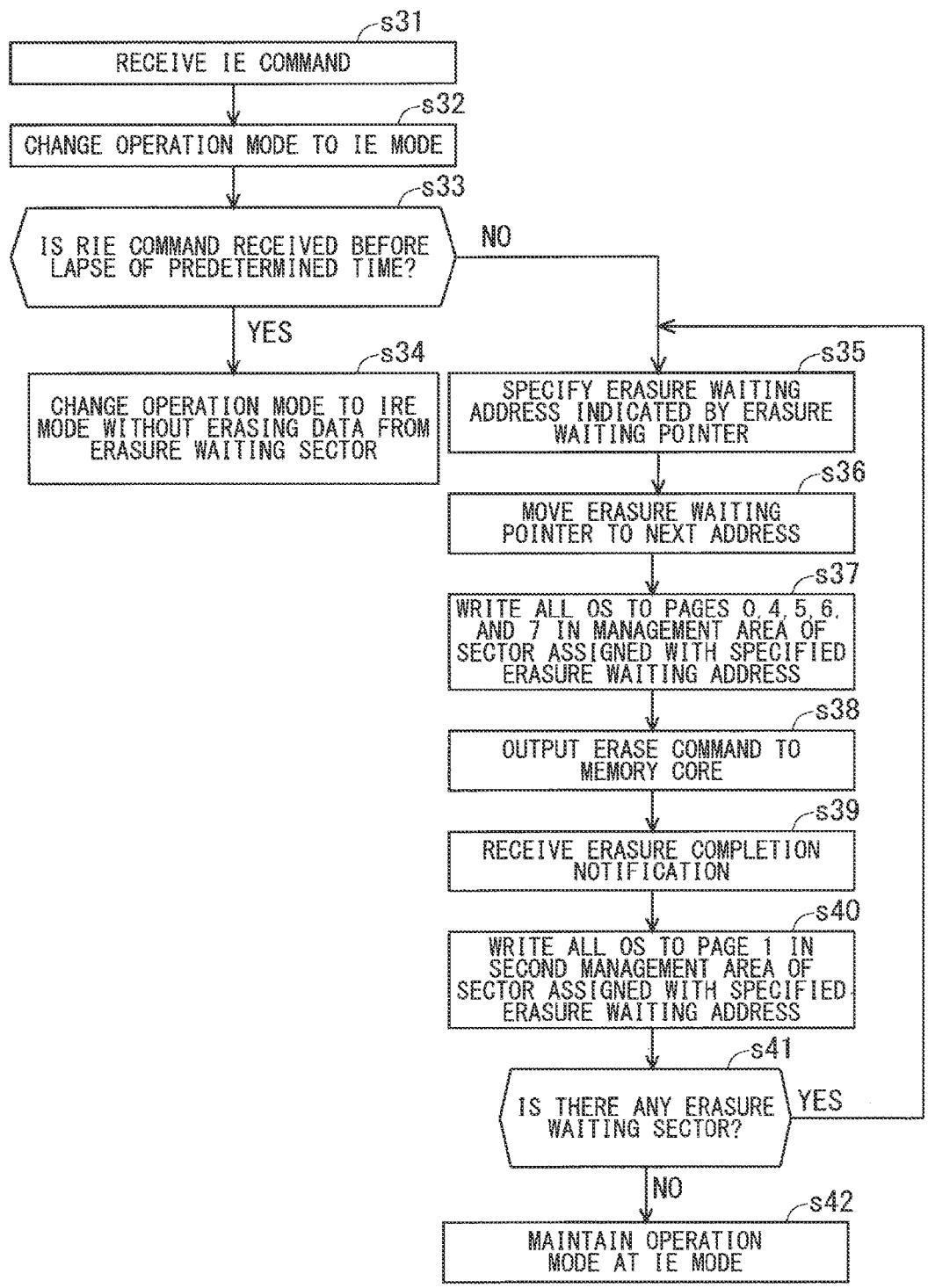
FIG. 31 is a flowchart showing an example of the operation of the memory device.

FIG. 31 is a flowchart showing an example of the operation of the controller 30 that has received an IE command from the host apparatus 2. As shown in FIG. 31, upon receiving the IE command from the host apparatus 2 in step s31, the controller 30 in the standby mode changes the operation mode from the standby mode to the IE mode in step s32.

In step s33, the controller 30 in the IE mode determines whether it has received an IRE command before the lapse of a predetermined time since reception of the IE command. The predetermined time is set to, for example, several hundred ms. Upon receiving the IRE command before the lapse of a predetermined time since reception of an IE command (YES in step s33), the controller 30 changes the operation mode from the IE mode to the RIE mode without erasing data from erasure waiting sector 50 in step s34. Accordingly, when the host apparatus 2 outputs an IRE command before the lapse of a predetermined time since output of an IE command, the memory device 3 erases no data from sector 50. In contrast, when a predetermined time has elapsed without reception of an IRE command since reception of the IE command (NO in step s33), the controller 30 starts erasing data from erasure waiting sector 50.

When erasing data from erasure waiting sector 50, the controller 30 specifies, first, the erasure waiting address indicated by erasure waiting pointer EP in step s35. In step s36, the controller 30 moves erasure waiting pointer EP to the next address.

In step s37, the controller 30 writes all 0s to pages 0, 4, 5, 6, and 7 in management area 50B of erasure waiting sector 50 assigned with the specified erasure waiting address specified in step s35.

In step s38, the controller 30 outputs an erase command to the memory core 4 to erase data from erasure waiting sector 50 assigned with the specified erasure waiting address. Upon receiving the erase command, the memory core 4 erases data from erasure waiting sector 50 assigned with the specified erasure waiting address. This changes erasure waiting sector 50 assigned with the specified erasure waiting address to erasure completion sector 50. Thereafter, the memory core 4 outputs an erase completion notification to the controller 30.

Upon receiving the erasure completion notification in step s39, the controller 30 writes all 0s to page 1 in second management area 502 of sector 50 assigned with the specified erasure waiting address in step s40.

In step s41, the controller 30 determines whether there is any erasure waiting sector 50 in the memory core 4. If there is no erasure waiting sector 50 in the memory core 4 (NO in step s41), the controller 30 maintains the operation mode at the IE mode in step s42. On the other hand, if there is any erasure waiting sector 50 in the memory core 4 (YES in step s41), the controller 30 executes step s35 again to specify the erasure waiting address indicated by erasure waiting pointer EP. Subsequently, the controller 30 operates in the same manner as described above.

Assume that the controller 30 determines that a predetermined time has elapsed without receiving any IRE command since reception of an IE command, and there is no erasure waiting sector 50 in the memory core 4 in step s33. In this case, the controller 30 executes step s42 without executing steps s35 to s41.

Upon receiving an RIE command from the host apparatus 2 between step s35 and step s42, the controller 30 in the IE mode immediately changes the operation mode from the IE mode to the RIE mode. Consequently, while data is erased from erasure waiting sector 50, the operation mode sometimes changes from the IE mode to the RIE mode. Upon receiving an IRE command while operating in the IE mode, the controller 30 changes the operation mode from the IE mode to the RIE mode regardless of whether data is in the process of being erased from erasure waiting sector 50. In addition, when a plurality of erasure waiting sectors 50 are included in the storage area 5 of the memory core 4, the controller 30 in the IE mode continues erasing data from the plurality of erasure waiting sectors 50 until the reception of an RIE command.

Figure 32:
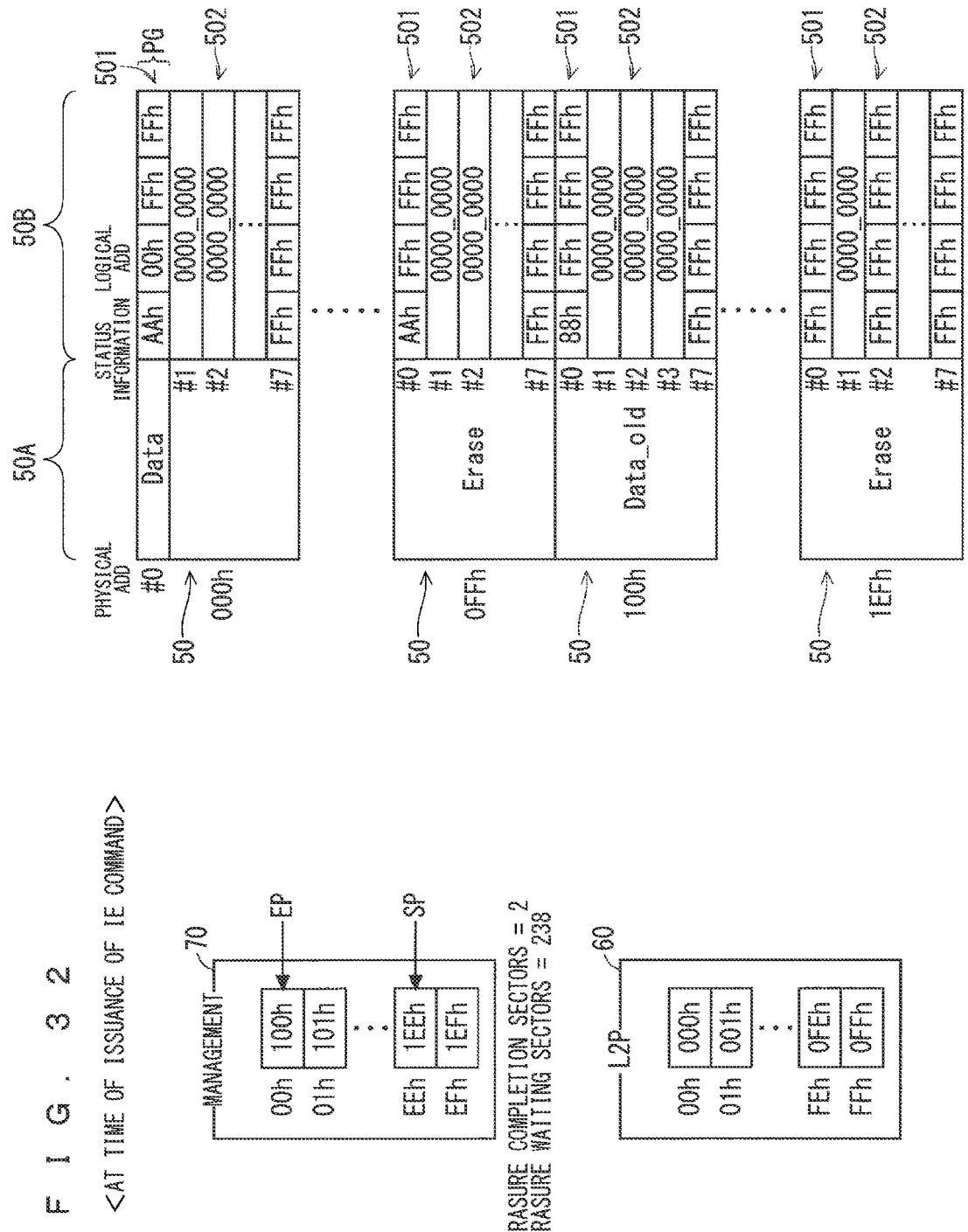
FIGS. 32 to 35 are views each for explaining an example of the operation of the memory device.
Figure 33:
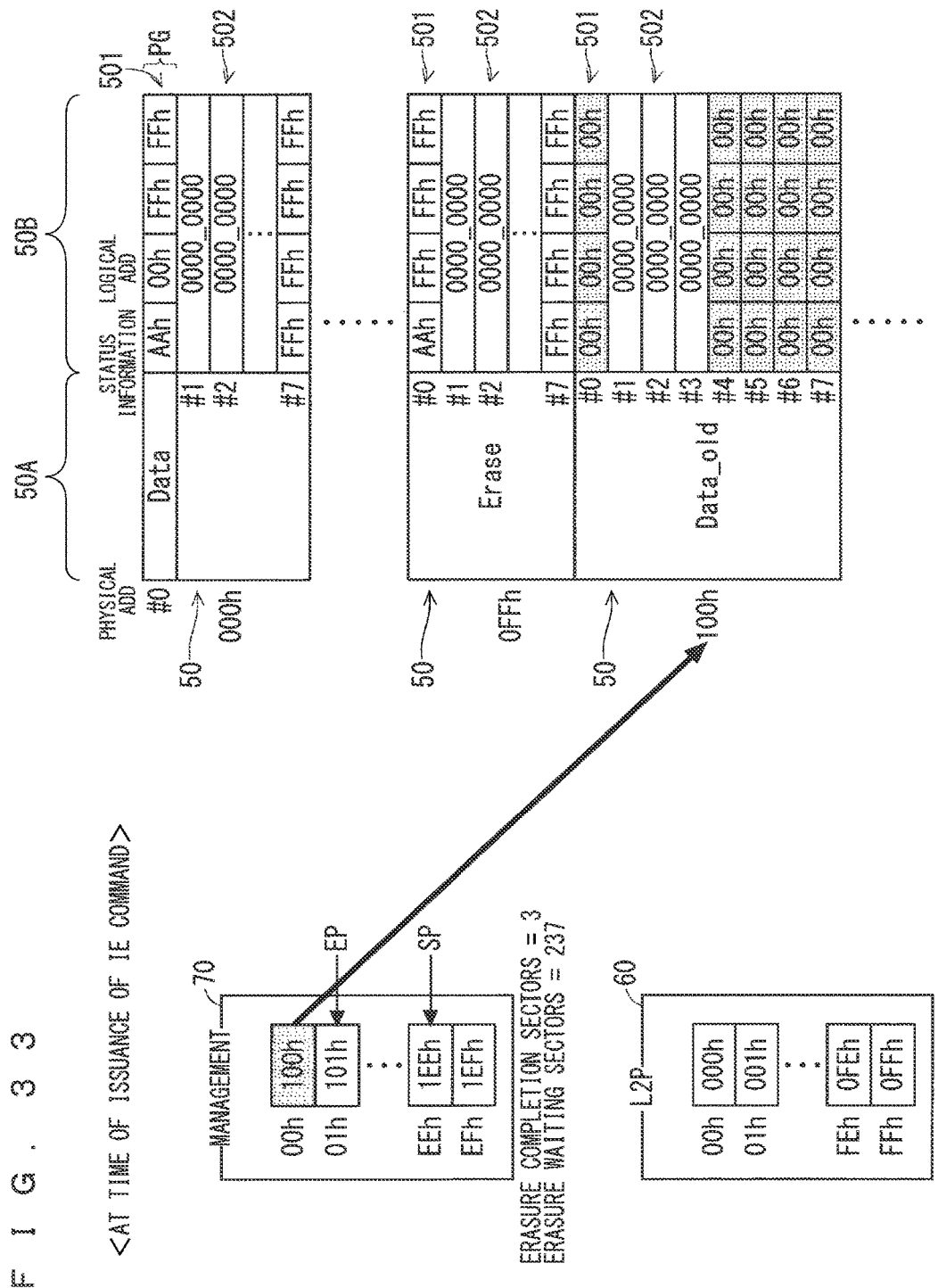
Figure 34:
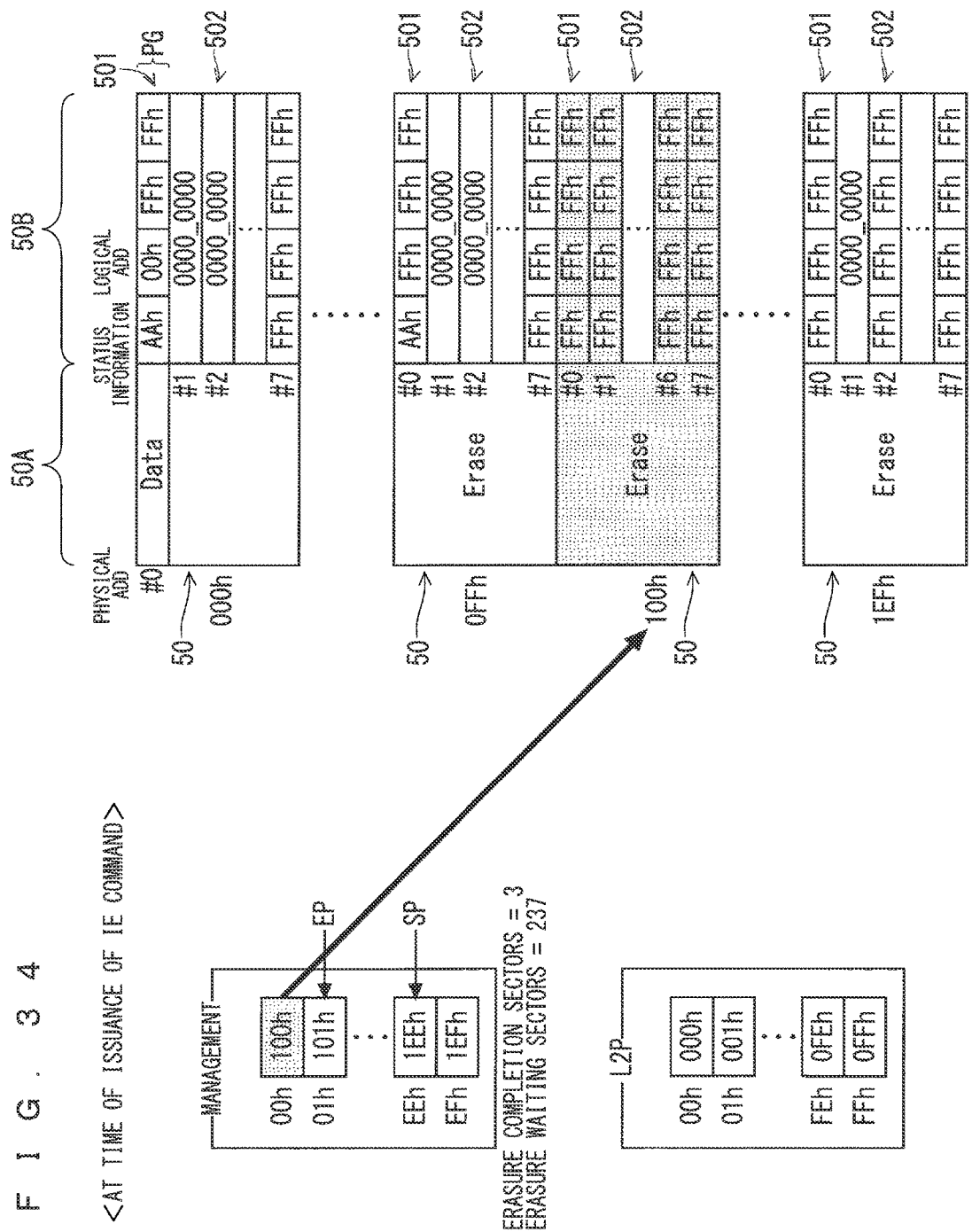
Figure 35:
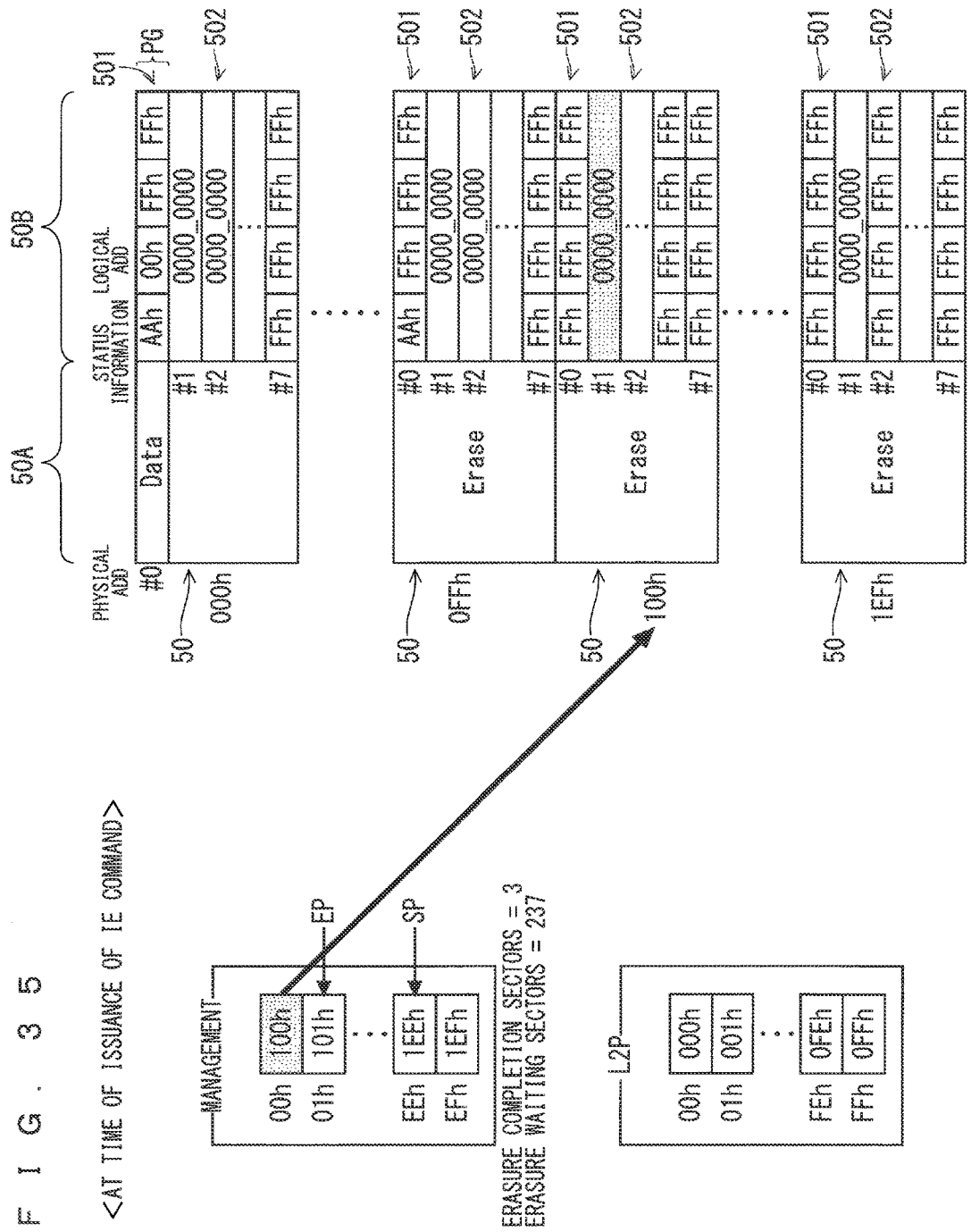

FIG. 32 is a view showing an example of the states of sectors 50, the L2P table 60, and the management table 70. FIGS. 33 to 35 are views each for explaining an example of a series of operations when the controller 30 erases data from erasure waiting sector 50 upon receiving an IE command while sectors 50, the L2P table 60, and the management table 70 are set in the states shown in FIG. 32. Sectors 50 assigned with physical addresses 000h and 0FFh shown in FIG. 32 are R/W access sectors 50. Sector 50 assigned with physical address 100h shown in FIG. 32 is erasure waiting sector 50. Sector 50 assigned with physical address 1EFh shown in FIG. 32 is erasure completion sector 50.

The controller 30 executes steps s31 to s33 described above. In this case, upon determining in step s33 that a predetermined time has elapsed without reception of an IRE command since reception of the IE command, the controller 30 specifies erasure waiting address 100h indicated by erasure waiting pointer EP (step s35). As shown in FIG. 33, the controller 30 then moves erasure waiting pointer EP to the next address (step s36).

As shown in FIG. 33, the controller 30 then writes all 0s to pages 0, 4, 5, 6, and 7 in management area 50B of erasure waiting sector 50 assigned with specified erasure waiting address 100h (step s37).

The controller 30 outputs an erase command to the memory core 4 (step s38). As shown in FIG. 34, with this operation, data is erased from erasure waiting sector 50 assigned with specified erasure waiting address 100h, and erasure waiting sector 50 changes to erasure completion sector 50.

Subsequently, upon receiving an erasure completion notification (step s39), the controller 30 writes all 0s to page 1 in second management area 502 of sector 50 assigned with specified erasure waiting address 100h, as shown in FIG. 35 (step s40).

The controller 30 determines whether there is any erasure waiting sector 50 in the memory core 4 (step s41). In this case, because there is erasure waiting sector 50 in the memory core 4, the controller 30 specifies erasure waiting address 101h currently indicated by erasure waiting pointer EP (step s35). Subsequently, the controller 30 operates in the same manner as described above.

As described above, when a plurality of erasure waiting sectors 50 are included in the storage area 5 of the memory core 4, the controller 30 in the IE mode continues erasing data from the plurality of sectors 50 until reception of an RIE command. Accordingly, this makes it unnecessary for the host apparatus 2 to output a command every time data is erased from erasure waiting sector 50. This makes it unnecessary for the controller 30 to process a command from the host apparatus 2 whenever erasing data from erasure waiting sector 50. This can simplify the processing performed by the memory device 3 to erase data from a plurality of erasure waiting sectors 50. It is therefore possible to improve the performance of the memory device 3 and simplify the processing performed by the host apparatus 2.

If no erasure waiting sector 50 is left during an operation in the IE mode (NO in step s41), the controller 30 may directly change the operation mode from the IE mode to the standby mode without going through the RIE mode.

<Consumption Current of Memory Device in IE Mode>

Figure 36:
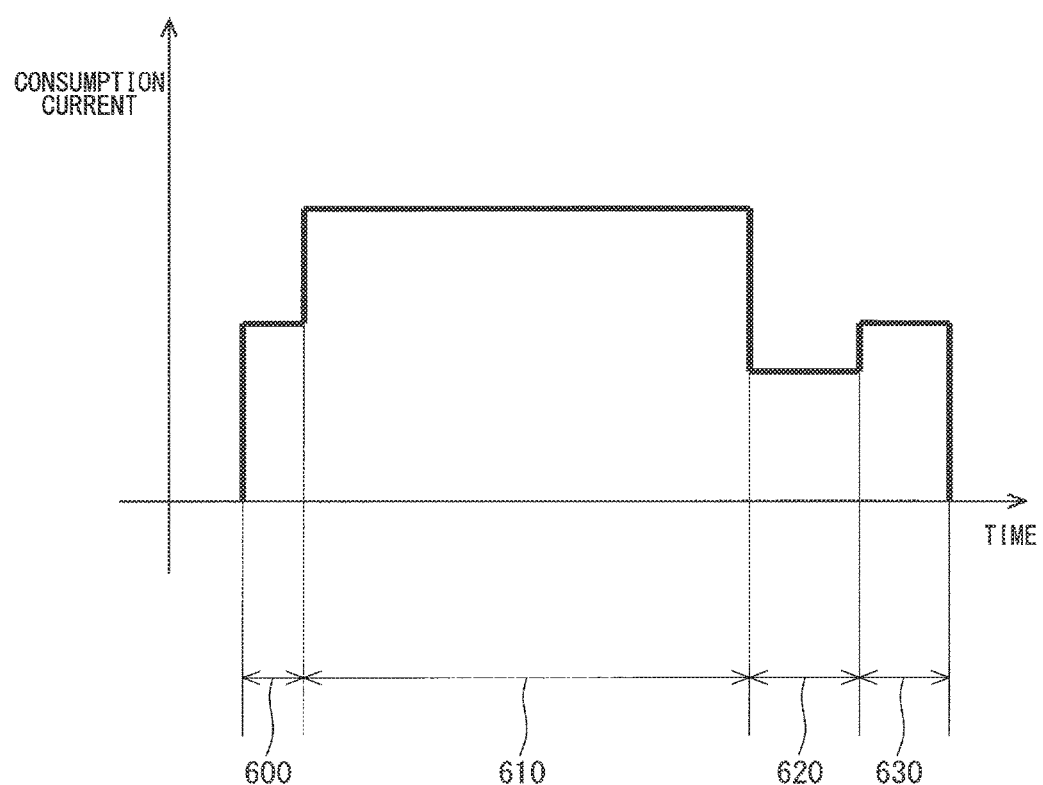
FIG. 36 is a graph showing an example of a consumption current waveform in the memory device.

FIG. 36 is a view showing an example of the consumption current waveform of the memory device 3 when the controller 30 in the IE mode erases data from erasure waiting sector 50. In the following description, the simple term "consumption current" means the consumption current of the memory device 3.

As shown in FIG. 36, when the controller 30 in the IE mode erases data from erasure waiting sector 50, operation periods 600, 610, 620, and 630 sequentially appear. Operation period 600 is a period in which the controller 30 writes all 0s to pages 0, 4, 5, 6, and 7 in management area 50B of sector 50 assigned with a specified erasure waiting address, and then performs verification processing with respect to pages 0, 4, 5, 6, and 7 (step s37). Operation period 610 is a period in which the memory core 4 that has received an erase command erases data from sector 50 assigned with the specified erasure waiting address (steps s38 and s39). Operation period 620 is a period in which the controller 30 performs verification processing with respect to host data area 50A and management area 50B of sector 50 from which data has been erased. Operation period 630 is a period in which the controller 30 writes all 0s to page 1 in second management area 502 of sector 50 from which data has been erased, and then performs verification processing with respect to page 1 (step s40).

In this case, as shown in FIG. 36, the consumption current in operation period 610 is larger than that in operation period 600. In addition, the consumption current in operation period 620 is smaller than that in operation period 610. The consumption current in operation period 630 is larger than that in operation period 620 and smaller than that in operation period 610. These lead to the fact that the consumption current when data is erased from sector 50 is larger than that when data is written to sector 50 and larger than that when data is read from sector 50.

Assume that the controller 30 in the standby mode receives an erase command, and the memory core 4 includes no erasure completion sector 50. In this case, as described above, the controller 30 executes steps s2 to s10 after generating erasure completion sector 50 by erasing data from erasure waiting sector 50. The operation of the controller 30 in the standby mode when the controller 30 erases data from erasure waiting sector 50 is the same as that of the controller 30 in the IE mode when the controller 30 erases data from erasure waiting sector 50. Accordingly, when the controller 30 in the standby mode erases data from erasure waiting sector 50, operation periods 600, 610, 620, and 630 shown in FIG. 36 sequentially appear.

<Details of RIE Mode>

Figure 37:
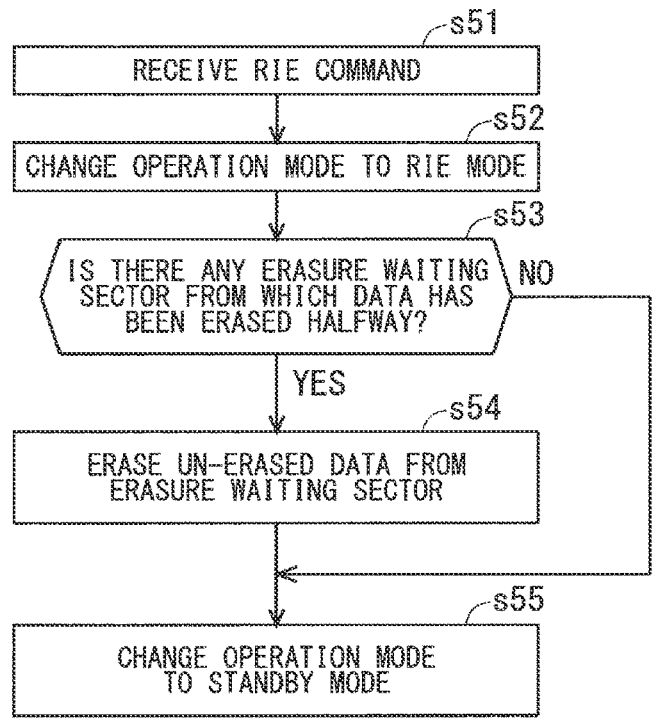

FIG. 37 is a flowchart showing an example of the operation of the controller 30 that has received an RIE command from the host apparatus 2. As shown in FIG. 37, upon receiving an RIE command from the host apparatus 2 in step s51, the controller 30 in the IE mode changes the operation mode from the IE mode to the RIE mode in step s52.

In step s53, the controller 30 in the RIE mode determines whether there is any erasure waiting sector 50 from which data has been erased partway in the memory core 4. If there is any erasure waiting sector 50 from which data has been erased partway in the memory core 4, the controller 30 erases un-erased data from erasure waiting sector 50 and changes erasure waiting sector 50 to erasure completion sector 50 in step s54. In step s55, the controller 30 changes the operation mode from the RIE mode to the standby mode. When the controller 30 receives an RIE command at some point in time of data erasure from erasure waiting sector 50 while operating in the IE mode, erasure waiting sector 50 is generated, from which data has been erased partway. In contrast, if there is no erasure waiting sector 50 from which data has been erased partway in the memory core 4, the controller 30 executes step s55 to change the operation mode from the RIE mode to the standby mode.

As described above, in this case, upon receiving an RIE command while erasing data from erasure waiting sector 50 in the IE mode, the controller temporally changes the operation to the RIE mode instead of immediately changing the operation mode to the standby mode. The controller 30 erases, in the RIE mode, un-erased data from erasure waiting sector 50 from which data has been erased partway, and then changes the operation mode to the standby mode. Consequently, when the operation mode is set to the standby mode, the controller 30 erases all the data from sector 50 from which data has been erased only partway in the IE mode. This makes it possible for the controller 30 to immediately write data to sector 50. This will improve the performance of the memory device 3.

Note that even in a case in which the controller 30 executes step s54 when the operation mode of the controller 30 changes from the IE mode to the RIE mode while data is erased from given erasure waiting sector 50, the controller 30 erases data from given erasure waiting sector 50 as in the above case, and hence operation periods 600, 610, 620, and 630 shown in FIG. 36 sequentially appear. That is, when the controller 30 erases data from erasure waiting sector 50 regardless of the operation mode of the controller 30, operation periods 600, 610, 620, and 630 shown in FIG. 36 sequentially appear.

<Command Issuing Operation of Host Apparatus>

Figure 38:
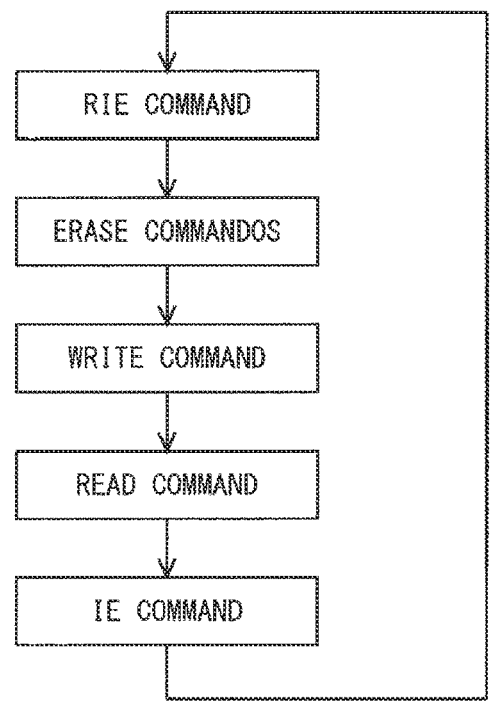

FIG. 38 is a view showing the order of commands to be output when the host apparatus 2 writes data to sector 50. In this case, the operation mode of the controller 30 is basically set to the IE mode. When the host apparatus 2 writes data to sector 50, the controller 20 of the host apparatus 2 outputs an RIE command first, and then changes the operation mode of the controller 30 of the memory device 3 to the standby mode, as shown in FIG. 38. The controller 20 outputs an erase command, and then outputs a write command. Because sector 50 is constituted by eight pages PG, the host apparatus 2 outputs a write command eight times to write data to all pages PG in sector 50.

Subsequently, the host apparatus 2 outputs read commands in number equal to the number of pages PG to which data has been written, and reads data from each page PG to which data has been written. The host apparatus 2 performs verification processing of comparing the data read from each page PG with the data written to each page PG to check whether data has been correctly written to each page PG. Thereafter, the controller 20 outputs an IE command to return the operation mode of the controller 30 to the IE mode.

When there is another sector 50 to which data should be written, the controller 20 outputs an IE command first, and then sequentially outputs an RIE command, erase command, write command, read command, and IE command again to write data to another sector 50. When consecutively writing data to a plurality of sectors 50, the controller 20 repeatedly performs the processing of sequentially outputting an RIE command, erase command, write command, read command, and IE command.

In this case, as described above, upon receiving an RIE command before the lapse of a predetermined time since reception of the IE command, the controller 30 changes the operation mode from the IE mode to the RIE mode without erasing data from erasure waiting sector 50. When consecutively writing data to a plurality of sectors 50, the controller 20 of the host apparatus 2 outputs an RIE command before the lapse of a predetermined time since output of an IE command. This can prevent data from being erased from erasure waiting sectors 50 when data is consecutively written to a plurality of sectors 50. Therefore, this operation shortens the time required for the memory device 3 to write data to a plurality of sectors 50. This will improve the performance of the memory device 3.

In this case, the host apparatus 2 can control the memory device 3 to execute or not to execute data erasure from erasure waiting sector 50 by only changing the timing of outputting an RIE command without changing the output order of commands. Accordingly, this can simplify the processing to be performed when the host apparatus 2 controls the memory device 3 to execute or not to execute data erasure from erasure waiting sector 50. As described above, when consecutively writing data to a plurality of sectors 50, the host apparatus 2 outputs an RIE command before the lapse of a predetermined time since output of an IE command. In contrast, when wanting to cause the memory device 3 to erase data from erasure waiting sector 50, the host apparatus 2 does not output any RIE command before the lapse of a predetermined time since output of an IE command. When wanting to set the operation mode of the controller 30 to the standby mode, the host apparatus 2 outputs an RIE command. For example, during a period in which there is no need to write and read data to and from the memory device 3, the host apparatus 2 causes the controller 30 to erase data from erasure waiting sector 50 without outputting any RIE command. For example, the host apparatus 2 causes the controller 30 to erase data from erasure waiting sector 50 without outputting any RIE command during a period in which an application program is read from a memory device provided separately from the memory device 3. This allows the memory device 3 to erase data from erasure waiting sector 50 when there is no access from the host apparatus 2. Therefore, this can reduce the possibility of causing data erasure from erasure waiting sector 50 to affect the overall processing by the data processing system 1.

<Operation of Memory Device at Time of Startup>

Figure 39:
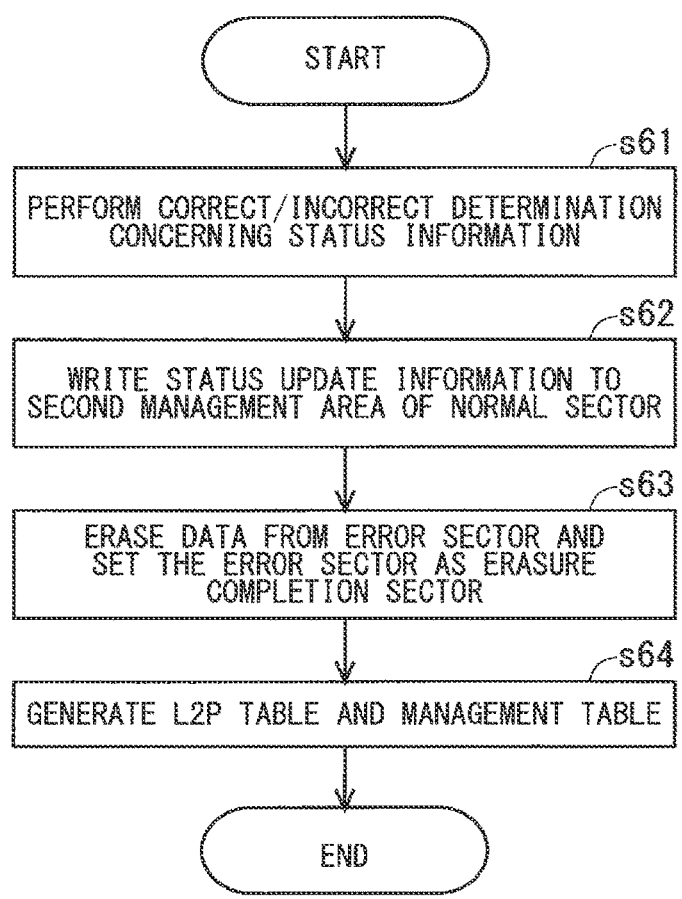

FIG. 39 is a flowchart showing an example of the operation of the memory device 3 at the time of startup. When power supply to the memory device 3 starts, as shown in FIG. 39, the controller 30 performs correct/incorrect determination to determine, on the basis of status update information in pages 1 to 3 (first to third update management areas) in second management area 502 of each sector 50, in step s61 whether each status information is correct. The controller 30 sets, as normal sector 50, sector 50 that stores status information determined to be correct in this correct/incorrect determination, and sets, as error sector 50, sector 50 that stores status information determined to be incorrect in the correct/incorrect determination. Correct/incorrect determination will be described in detail later.

In step s62, the controller 20 writes status update information corresponding to the type of normal sector 50 to second management area 502 of each normal sector 50.

More specifically, when the status information stored in normal sector 50 indicates FFh, the controller 30 writes all 0s (first status update information) to page 1 in second management area 502 of normal sector 50 (erasure completion sector 50).

In addition, when the status information stored in normal sector 50 indicates AAh, the controller 30 writes all 0s (second status update information) to page 2 in second management area 502 of normal sector 50 (R/W access sector 50).

When the status information stored in normal sector 50 indicates 88h, the controller 30 writes all 0s (third status update information) to page 3 in second management area 502 of normal sector 50 (erasure waiting sector 50).

In this case, while the memory device 3 is operating, as the number of data reads from page PG in sector 50 increases, an error may occur in information in page PG. As in this case, rewriting status update information corresponding to the type of normal sector 50 to second management area 502 of normal sector 50 during the operation of the memory device 3 can reduce the possibility of the occurrence of an error in the status update information in second management area 502 during the operation of the memory device 3.

In step s63, the controller 30 erases data from each error sector 50, and sets error sector 50 as erasure completion sector 50. At this time, the controller 30 writes all 0s to page 1 in second management area 502 of error sector 50 set as erasure completion sector 50.

In step s64, the controller 30 generates the L2P table 60 and the management table 70 on the basis of physical addresses assigned to sectors 50 and information stored in sectors 50. In step s64, the controller 30 associates and registers, in the L2P table, the physical address assigned to R/W access sector 50 storing status information AAh and the logical address in first management area 501 of R/W access sector 50. In addition, the controller 30 registers, in the management table 70, the physical address assigned to erasure completion sector 50 storing status information FFh. At this time, when there are a plurality of erasure completion sectors 50 in the memory core 4, a plurality of consecutive assignment numbers are associated with the physical addresses of the plurality of erasure completion sectors 50. The controller 30 also registers, in the management table 70, the physical address assigned to erasure waiting sector 50 storing status information 88h. At this time, when there are a plurality of erasure waiting sectors 50 in the memory core 4, a plurality of consecutive assignment numbers are associated with the physical addresses of the plurality of erasure waiting sectors 50.

Assume that there is error sector 50 in the memory core 4. In this case, because error sector 50 is set as erasure completion sector 50, when step s64 is executed, the number of R/W access sectors 50 included in the memory core 4 may be less than 256. In such a case, the controller 30 changes a predetermined number of erasure completion sectors 50 to R/W access sectors 50 so as to set the number of R/W access sectors 50 to 256. The controller 30 then stores, in first management area 501 of each sector 50 that has been changed to R/W access sector 50, those logical addresses, of logical addresses 00h to FFh, which are not stored in first management area 501 of each sector 50 that has been initially R/W access sector 50. With this operation, when step s64 is executed, even if the number of R/W access sectors 50 included in the memory core 4 is less than 256, 256 R/W access addresses are registered in the finally generated L2P table.

Figure 40:
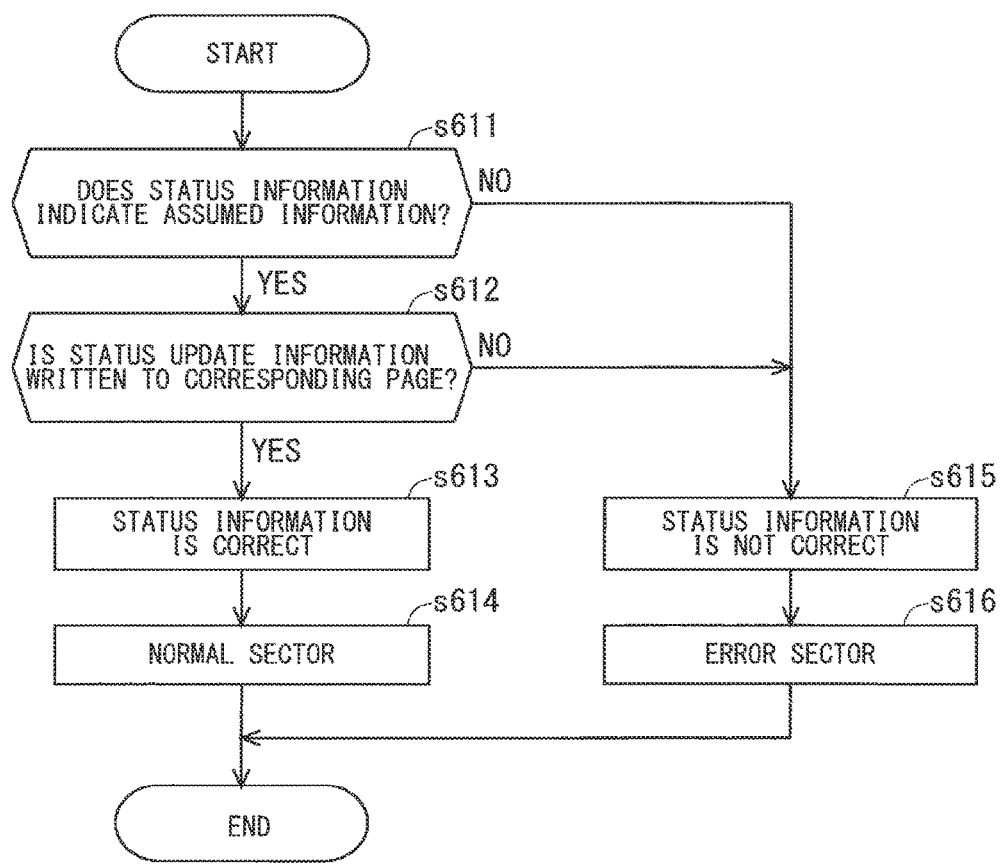

FIG. 40 is a flowchart showing an example of the operation of the controller 30 when the controller 30 determines in correct/incorrect determination whether the status information in given sector 50 is correct. Sector 50 as an explanation target will sometimes be referred to as "target sector 50" hereinafter. In addition, the status information in first management area 501 of target sector 50 will sometimes be referred to as "target status information". The controller 30 executes the processing shown in FIG. 40 with respect to each sector 50 in correct/incorrect determination.

As shown in FIG. 40, in step s611, the controller 30 determines whether target status information indicates assumed information. More specifically, the controller 30 determines whether the target status information read from target sector 50 indicates one of FFh, AAh, and 88h. In step s611, if the target information indicates assumed information, that is, the target status information indicates one of FFh, AAh, and 88h, the controller 30 executes step s612. In contrast to this, if the target status information does not indicate assumed information, that is, the target status information indicates information other than FFh, AAh, and 88h, the controller 30 determines in step s614 that the target status information is not correct.

In this case, for example, when an error has occurred in the status information, which is FFh, the status information may become, for example, AAh. Consequently, even if status information indicates assumed information, the status information may not be correct.

In this case, when target status information indicates assumed information, the controller 30 determines, by using status update information, whether the target status information is correct information.

In step s612, the controller 30 determines whether status update information is written to page PG in second management area 502 of target sector 50 which corresponds to the target status information. Page PG will be referred to as "corresponding page PG" hereinafter. When target status information indicates FFh, page 1 in second management area 502 of target sector 50 becomes corresponding page PG. When the target status information indicates AAh, page 2 in second management area 502 of target sector 50 becomes corresponding page PG. When the target status information indicates 88h, page 3 in second management area 502 of target sector 50 becomes corresponding page PG.

In step s612, when the target status information indicates FFh, the controller 30 determines whether first status update information is written to page 1 in second management area 502 of target sector 50. That is, the controller 30 determines whether 0000_0000h is written to page 1 in second management area 502 of target sector 50. If 0000_0000h is written to page 1 in second management area 502 of target sector 50, the controller 30 determines that status update information is written to corresponding page PG. In contrast, if 0000_0000h is not written to page 1 in second management area 502 of target sector 50, the controller 30 determines that no status update information is written to corresponding page PG.

When the status information in target sector 50 indicates AAh, the controller 30 determines whether second status update information is written to page 2 in second management area 502 of target sector 50. That is, the controller 30 determines whether 0000_0000h is written to page 2 in second management area 502 of target sector 50. If 0000_0000h is written to page 2 in second management area 502 of target sector 50, the controller 30 determines that status update information is stored in corresponding page PG. In contrast, if 0000_0000h is not written to page 2 in second management area 502 of target sector 50, the controller 30 determines that no status update information is written to corresponding page PG.

When the status information in target sector 50 indicates 88h, the controller 30 determines whether third status update information is written to page 3 in second management area 502 of target sector 50. That is, the controller 30 determines whether 0000_0000h is written to page 3 in second management area 502 of target sector 50. If 0000_0000h is written to page 3 in second management area 502 of target sector 50, the controller 30 determines that status update information is written to corresponding page PG. In contrast, if 0000_0000h is not written to page 3 in second management area 502 of target sector 50, the controller 30 determines that no status update information is written to corresponding page PG.

Upon determining in step s612 that status update information is written to corresponding page PG, the controller 30 determines in step s613 that the target status information is correct. In step s614, the controller 30 then sets target sector 50 as normal sector 50. In contrast, upon determining that no status update information is written to corresponding page PG, the controller 30 determines in step s615 that the target status information is not correct. In step s616, the controller 30 then sets target sector 50 as error sector 50.

As described above, in this case, the state of sector 50 changes as follows. Erasure completion sector 50 changes to R/W access sector 50. R/W access sector 50 changes to erasure waiting sector 50. Erasure waiting sector 50 changes to erasure completion sector. Subsequently, when the status information is changed to FFh (sector 50 is changed to erasure completion sector 50), the first status update information is written to page 1 in second management area 502. When the status information is changed to AAh (sector 50 is changed to R/W access sector 50), the second status update information is written to page 2 in second management area 502. When the status information is changed to 88h (sector 50 is changed to erasure waiting sector 50), the third status update information is written to page 3 in second management area 502. Therefore, determining, on the basis of the status update information in pages 1 to 3 in second management area 502, whether status information is correct can accurately determine whether the status information is correct. Accordingly, this improves the performance of the memory device 3.

Assume that an error has occurred in status information that should be FFh, and the status information has become AAh. In this case, second status update information is not stored in page 2 in second management area 502. When, therefore, the status information indicates AAh, and the second status update information is not stored in page 2 in second management area 502, the controller 30 can accurately determine that the status information is not correct. Assume also that an error has occurred in status information that should be AAh, and the status information has become 88h. In this case, third status update information is not stored in page 3 in second management area 502. When, therefore, the status information indicates 88h, and the third status update information is not stored in page 3 in second management area 502, the controller 30 can accurately determine that the status information is not correct.

In addition, in this case, the value of each of a plurality of bits constituting status update information is "0", which differs from "1" that is the value indicated by each bit in sector 50 after data erasure. For this reason, when writing status update information to corresponding page PG in second management area 502, the controller 30 needs to rewrite the value of each of a plurality of bits constituting page PG from "1" to "0". Consequently, in step s612 described above, if all the values of the respective bits of corresponding page PG have been rewritten from "1" to "0", the controller 30 determines that status update information is stored in corresponding page PG. This can reduce the possibility of erroneously determining that status update information is stored in corresponding page PG in step s61. This in turn can reduce the possibility of erroneously determining in correct/incorrect determination that status information is correct.

Note that in the above case, all the first status update information to the third status update information each are 0000_0000h. However, at least one piece of the first status update information to the third status update information may be 0000_0000h. In addition, each status update information may be other than 0000_0000h.

In the above case, when the memory device 3 is started up, steps s61 to s63 are executed. However, steps s61 to s63 may be executed at a timing other than the startup time of the memory device 3.

VARIOUS MODIFICATION EXAMPLES

Various modification examples of the memory device 3 will be described below.

First Modification Example

When, for example, an error has occurred in status information that should be AAh and the status information has become FFh, the first status update information is stored in page 1 in second management area 502 corresponding to FFh. In this case, therefore, the controller 30 determines YES in step s612 in the correct/incorrect determination in FIG. 40, and erroneously determines that the status information is correct.

In this modification example, as shown in FIG. 41, the controller 30 executes step s618 after step s612. In step s618, the controller 30 determines whether status update information is written to page PG (to be simply referred to as "next page PG" hereinafter) next in number to corresponding page PG in second management area 502 of target sector 50. That is, the controller 30 determines whether 0000_0000h is written to next page PG. If corresponding page PG is page 1 in second management area 502, the controller 30 determines whether 0000_0000h is written to page 2 in second management area 502, which is next page PG. If corresponding page PG is page 2 in second management area 502, the controller 30 determines whether 0000_0000h is written to page 3 in second management area 502, which is next page PG. If corresponding page PG is page 3 in second management area 502, the controller 30 determines whether 0000_0000h is written to page 4 in second management area 502, which is next page PG.

If 0000_0000h is not written to next page PG, the controller 30 determines in step s613 that the target status information is correct, and executes step s614. In contrast, if 0000_0000h is written to next page PG, the controller 30 determines in step s615 that the target status information is not correct, and executes step s616.

As described above, in this modification example, when target status information indicates assumed information and status update information is written to corresponding page PG, the controller 30 determines, on the basis of a determination result indicating whether status update information is written to the next page, whether the target status information is correct, instead of immediately determining that the target status information is correct. Accordingly, this makes it possible to more accurately determine whether status information is correct.

Note that because page 4 in second management area 502 is unused, if corresponding page PG is page 3 in second management area 502, the controller 30 may execute step s615 without determining in step s618 whether 0000_0000h is written to page 4 in second management area 502.

Second Modification Example

In this modification example, upon changing the status information to FFh, the controller 30 writes, to page 1 in second management area 502, a first error correction code as the first status update information which is obtained by error correction coding of all the data stored in first management area 501 after the change. For example, in step s27 in FIG. 20 and step s40 in FIG. 31 described above, the controller 30 writes, to page 1 in second management area 502 of sector 50, the first error correction code obtained by error correction coding of the data stored in first management area 501 of sector 50 assigned with a specified erasure waiting address.

In addition, when status information changes to AAh, the controller 30 writes, to page 2 in second management area 502, a second error correction code as the second status update information which is obtained by error correction coding of all the data stored in first management area 501 after the change. For example, in step s5 in FIG. 12 described above, the controller 30 writes, to page 2 in second management area 502 of sector 50, the second error correction code obtained by error correction coding of the data stored in first management area 501 of sector 50 assigned with a specified erasure completion address.

Furthermore, when status information changes to 88h, the controller 30 writes, to page 3 in second management area 502, a third error correction code as the third status update information which is obtained by error correction coding of all the data stored in first management area 501 after the change. For example, in step s8 in FIG. 12 described above, the controller 30 writes, to page 3 in second management area 502 of sector 50, the third error correction code obtained by error correction coding of the data stored in first management area 501 of sector 50 assigned with a specified R/W access address.

The controller 30 may perform error correction coding of the data stored in first management area 501 by using, for example, an error correction code (ECC) such as a block check character (BCC) code, BCH code, or Reed-Solomon code. In this modification example, the controller 30 performs error correction coding of all the data stored in first management area 501. However, the controller 30 may perform error correction coding of only necessary data stored in first management area 501, that is, only status information and a logical address. Alternatively, the controller 30 may perform error correction coding of only status information. First to third error correction codes each will be referred to as an "error correction code" hereinafter if they need not be discriminated from one another.

Figure 42:
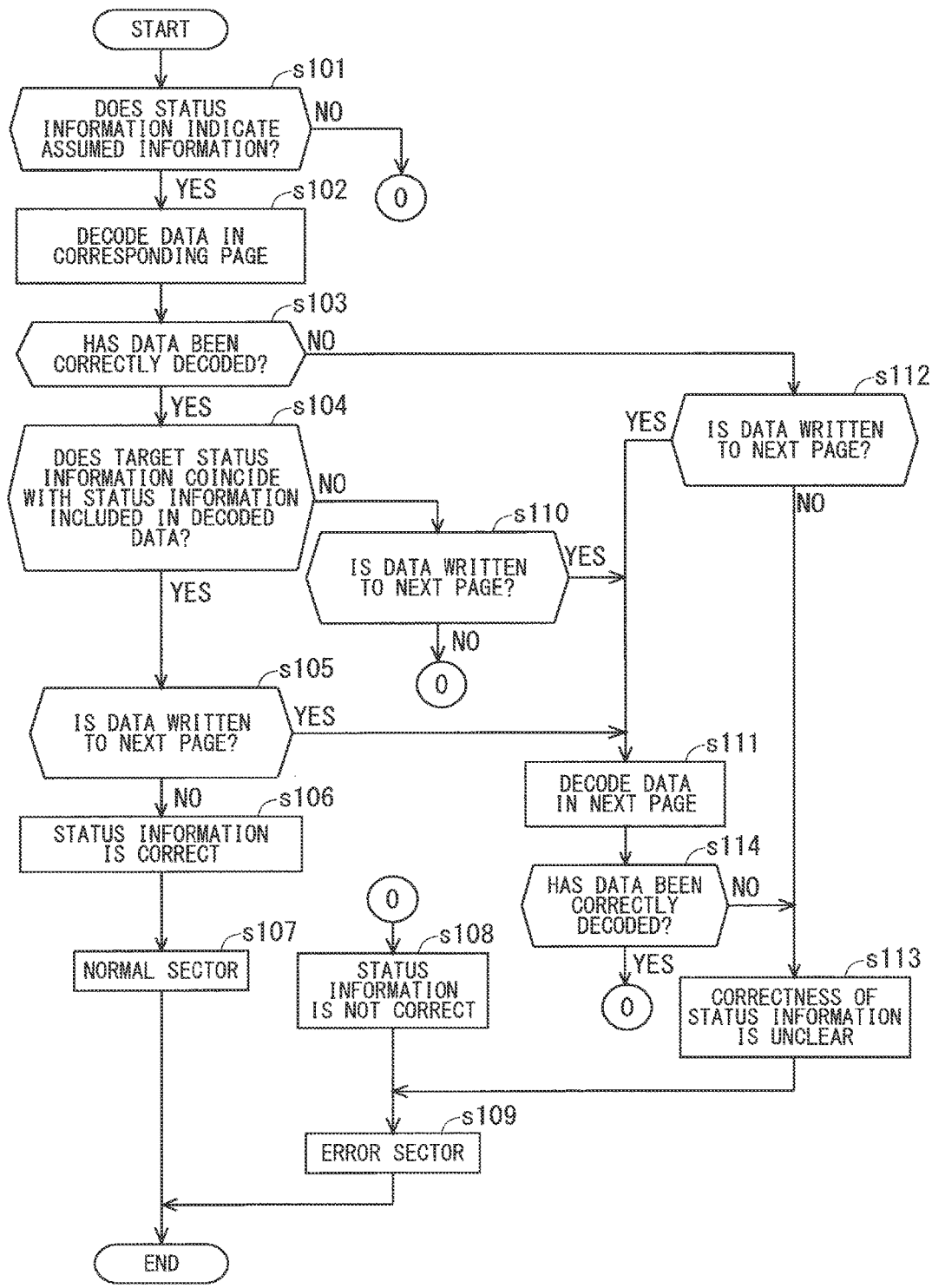

FIG. 42 is a flowchart showing an example of correct/incorrect determination according to this modification example which is executed in step s61. In correct/incorrect determination, the controller 30 executes the processing shown in FIG. 42 with respect to each sector 50.

As shown in FIG. 42, in step s101, as in step s611 described above, the controller 30 determines whether target status information indicates assumed information. If the target status information does not indicate assumed information, the controller 30 determines in step s108 that the target status information is not correct. In step s109, the controller 30 then sets target sector 50 as error sector 50. In contrast, if the target status information indicates assumed information, the controller 30 performs error correction decoding of all the data in corresponding page PG in step s102. Error correction decoding is sometimes simply referred to as "decoding" hereinafter.

In step s103, after step s102, the controller 30 determines whether the data has been correctly decoded in step s102. If the data has been correctly decoded, the controller 30 decodes the data into the original data having undergone error correction coding. If the data has been correctly decoded, the controller 30 executes step s104. In contrast, if the data has not been correctly decoded, the controller 30 executes step s112. If no error correction code is stored in corresponding page PG, the controller 30 cannot correctly decode the data. In addition, if a bit count error exceeding the error correction performance has occurred in the error correction code in corresponding page PG, the controller 30 cannot correct all the errors included in the data in corresponding page PG and cannot correctly decode the data. The data obtained by correctly decoding data will be referred to as the "decoded data" hereinafter.

In step s104, the controller 30 determines whether the target status information coincides with status information included in decoded data (decoded original data). If the target status information coincides with the status information included in the decoded data, the controller 30 executes step s105. In contrast, if the target status information does not coincide with the status information included in the decoded data, the controller 30 determines in step s110 whether data is written to next page PG. If the value of each bit of next page PG is "1", the controller 30 determines that no data is written to next page PG. In contrast, if the value of any of the bits of next page PG is "0", the controller 30 determines that data is written to next page PG. Upon determining that data is written to next page PG, the controller 30 executes step s111. In contrast, upon determining that no data is written to next page PG, the controller 30 determines in step s108 that the target status information is not correct. The controller 30 then executes step s109.

In step s105, as in step s110 described above, the controller 30 determines whether data is written to next page PG. Upon determining that data is written to next page PG, the controller 30 executes step s111. In contrast, upon determining that no data is written to next page PG, the controller 30 determines in step s106 that the target status information is correct. In step s107, the controller 30 then sets target sector 50 as normal sector 50.

In step s112, which is executed when NO is determined in step s103, the controller 30 determines, as in step s110 described above, whether data is written to next page PG. Upon determining that data is written to next page PG, the controller 30 executes step s111. In contrast, upon determining that no data is written to next page PG, the controller 30 determines in step s113 that the correctness of the target status information is unclear. In step s109, the controller 30 sets, as error sector 50, target sector 50 storing target status information whose correctness is unclear.

In step s111, the controller 30 decodes data in next page PG. In step s114, the controller 30 determines whether the data has been correctly decoded in step s111. Upon determining that the data has been correctly decoded, the controller 30 determines in step s108 that the target status information is not correct. The controller 30 then executes step s109. The fact that the data in next page PG has been correctly decoded means that an error correction code is stored in next page PG. In contrast, if the target status information is correct, no error correction code is stored in next page PG. Consequently, if the controller 30 determines in step s114 that data has been correctly decoded, it can be said that the target status information is not correct.

In contrast, upon determining in step s114 that the data has not been correctly decoded, the controller 30 determines in step s113 that the correctness of the target status information is unclear. The controller 30 then executes step s109.

As described above, using an error correction code as status update information can correct an error included in status update information. Accordingly, this makes it possible to accurately determine whether status information is correct.

Although all the first status update information to the third status update information are error correction codes, at least one piece of information of the first status update information to the third status update information may be an error correction code.

Third Modification Example

The memory device 3 according to this modification example is configured to change correct/incorrect determination performed by the memory device 3 according to the second modification example described above. In the third modification example, in the correct/incorrect determination in step s61, the controller 30 estimates a cause of an error included in status information and corrects the error as well as determines whether the status information is correct. FIGS. 43 to 46 are flowcharts each showing an example of correct/incorrect determination according to this modification example. In this correct/incorrect determination, the controller 30 executes the processing shown in FIGS. 43 to 46 with respect to each sector 50. The following will mainly describe the differences between the memory device 3 according to the third modification example and the memory device 3 according to the second modification example.

Figure 43:
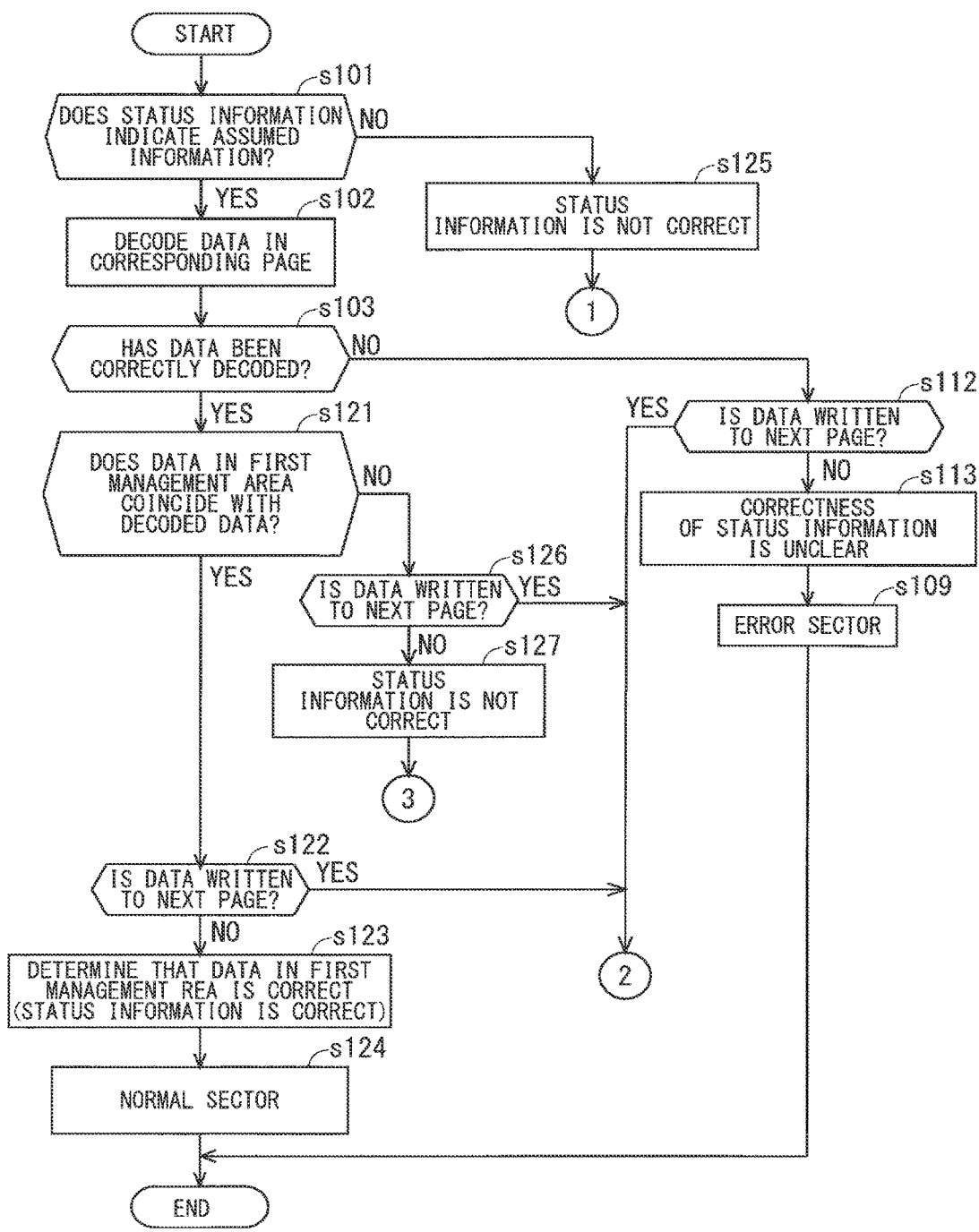

As shown in FIG. 43, the controller 30 executes step s101 described above. Upon determining in step s101 that target status information does not indicate assumed information, the controller 30 determines in step s125 that the target status information is not correct. The controller 30 then executes step s131 shown in FIG. 44. In contrast, upon determining that the target status information indicates assumed information, the controller 30 executes steps s102 and s103 described above.

Upon determining in step s103 that data has not been correctly decoded, the controller 30 executes step s112. Upon determining in step s112 that data is written to the next page, the controller 30 executes step s151 shown in FIG. 45. In contrast, upon determining that no data is written to the next page, the controller 30 executes step s113 described above to determine that the correctness of the target status information is unclear. The controller 30 then executes step s109 to set target sector 50 as error sector 50.

Upon determining in step s103 that data has been correctly decoded, the controller 30 determines in step s121 whether all the data in first management area 501 of target sector 50 coincides with decoded data (decoded original data). Upon determining that all the data in first management area 501 of target sector 50 coincides with the decoded data, the controller 30 determines in step s122 whether data is written to next page PG. Upon determining that no data is written to next page PG, the controller 30 determines in step s123 that all the data in the first management area is correct. This makes the controller 30 determine that the target status information is correct. In step s124, the controller 30 then sets target sector 50 as normal sector 50. In contrast, upon determining in step s122 that data is written to next page PG, the controller 30 executes step s151 shown in FIG. 45. Data in first management area 501 will sometimes be referred to as "first management data" hereinafter. In this modification example, first management data includes status information and a logical address.

Upon determining in step s121 that the data in first management area 501 of target sector 50 differs from the decoded data, the controller 30 determines in step s126 whether data is written to next page PG. Upon determining that data is written to next page PG, the controller 30 executes step s151 shown in FIG. 45. In contrast, upon determining that no data is written to next page PG, the controller 30 determines in step s127 that the target status information is not correct. The controller 30 executes step s171 shown in FIG. 46.

Figure 44:
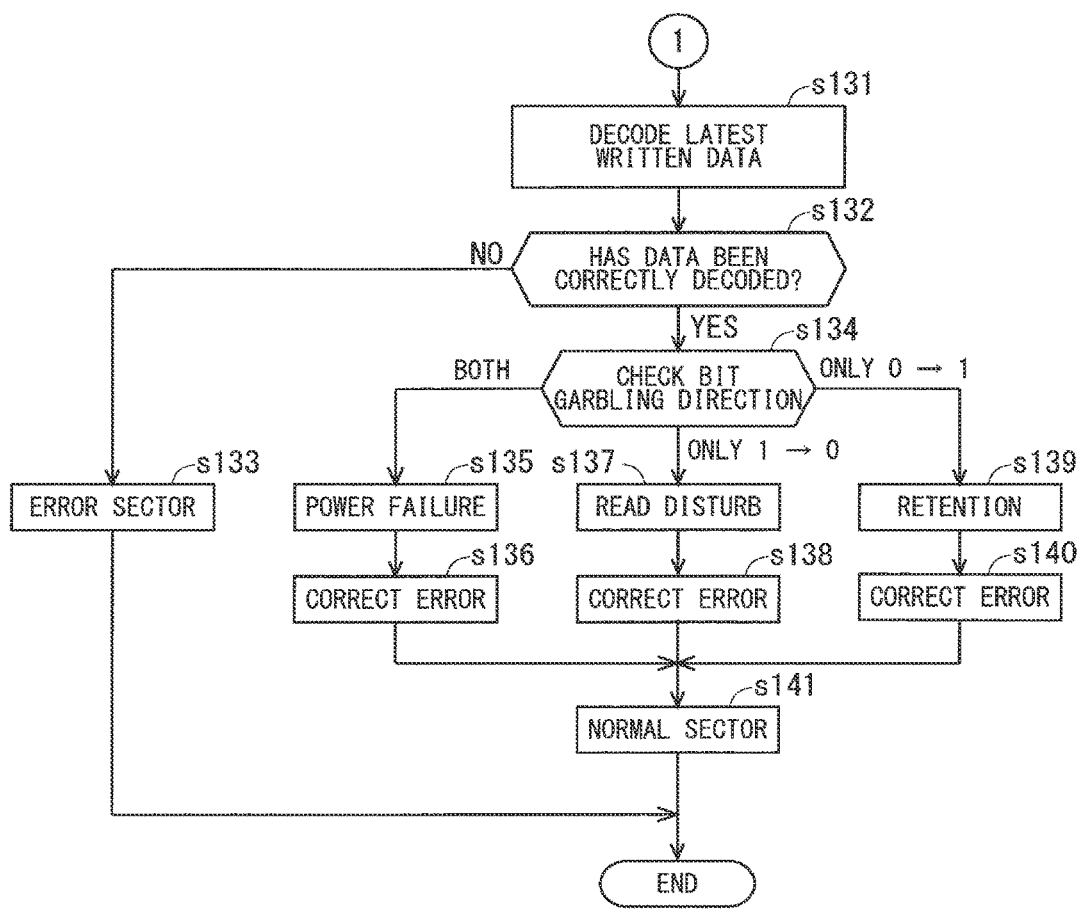

In step s131 shown in FIG. 44, the controller 30 decodes the latest data written to second management area 502 of target sector 50. The latest data written to second management area 502 of target sector 50 will be simply referred to as the "latest data" hereinafter.

In step s131, first, the controller 30 determines whether data is written to page 3 in second management area 502 of target sector 50. When data is written to page 3 in second management area 502 of target sector 50, the controller 30 decodes the data as the latest data. When no data is written to page 3 in second management area 502 of target sector 50, the controller 30 determines whether data is written to page 2 in second management area 502 of target sector 50. When data is written to page 2 in second management area 502 of target sector 50, the controller 30 decodes the data as the latest data. When no data is written to page 2 in second management area 502 of target sector 50, the controller 30 decodes the data written to page 1 in second management area 502 of target sector 50 as the latest error correction code.

In step s132 after step s131, the controller 30 determines whether data has been correctly decoded in step s31. Upon determining that the data has not been correctly decoded, the controller 30 sets target sector 50 as error sector 50 in step s133.

Upon determining in step s132 that the data has been correctly decoded, the controller 30 checks, in step s134, a bit garbling direction with respect to each bit of first management data of target sector 50 on the basis of the decoded data obtained in step s131. In this case, to check a bit garbling direction means to estimate whether the value of a bit has erred (garbled) from "1" to "0" or from "0" to "1".

In this case, the decoded data can be considered to indicate the correct value of the first management data. In other words, the decoded data can be considered to indicate the first management data including no error. Accordingly, when the value of a given bit of the first management data differs from the value of a bit of the decoded data which is located at the same bit position as that of the given bit, it can be estimated that the value of the given bit is wrong. The value of a bit of the first management data which is estimated to be an error will be referred to as an "error bit value" hereinafter. In addition, when an error bit value indicates "1", the error bit value can be considered to err from "0" to "1". In contrast, when the error bit value indicates "0", the error bit value can be considered to err from "1" to "0". An error bit value indicating "1" will be referred to as "error bit value (1→1)", whereas an error bit value indicating "0" will be referred to as "error bit value (1→0)".

When checking a bit garbling direction, the controller 30 specifies an error bit value included in the first management data by comparing, at the same bit positions, the values of the 32 bits constituting the first management data with the values of the 32 bits constituting the decoded data. If each of all the specified error bit values is error bit value (1→1), the controller 30 estimates in step s139 that the cause of the error included in the first management data is retention. Retention is a phenomenon in which electrons stored in a memory cell come out with the lapse of time, and the value of a bit of data in the storage area 5 changes from "0" to "1". If each of all the specified error bit values is bit value (1→1) and an error bit value is included in target status information, the cause of the error included in the target status information can be estimated to be retention.

If each of all the specified error bit values is error bit value (1→0), the controller 30 estimates in step s137 that the cause of the error included in the first management data is read disturb. Read disturb is a phenomenon in which the value of a bit of data in the storage area 5 which is generated by a data read operation from the storage area 5 changes from "1" to "0". If each of all the specified error bit values is bit value (1→0) and an error bit value is included in target status information, the cause of the error included in the target status information can be estimated to be read disturb.

If the specified error bit values include both error bit value (1→0) and error bit value (1→1), the controller 30 estimates in step s135 that the cause of an error included in the first management data is the stoppage of power supply to the memory device 3 (power failure) during a data write operation to first management area 501 or data erasure from sector 50. If the specified error bit values include both error bit value (1→0) and error bit value (1→1) and an error bit value is included in target status information, the cause of the error included in the target status information can be estimated to be the stoppage of power supply to the memory device 3 during a data write operation to first management area 501 or data erasure from sector 50.

In step s140 after step s139, the controller 30 corrects an error included in the first management data. The controller 30 can write "0" to the bits in sector 50 in units of pages PG by outputting a write command to the memory core 4. The controller 30 writes "0" to bits each having error bit value (1→1) included in the first management data. This will correct the error included in the first management data to obtain correct first management data.

In step s138 after step s137, the controller 30 corrects an error included in the first management data. The controller 30 cannot write "1" to the bits in sector 50 in units of pages PG by outputting a write command to the memory core 4. The controller 30 erases data from target sector 50 first, and then writes correct data, that is, the decoded data obtained in step s131, to first management area 501 of target sector 50. This will correct the error in the first management data. At this time, the data stored in second management area 502 before the erasure of data from target sector 50 is written to second management area 502 of target sector 50.

In step s136 after step s135, the controller 30 corrects an error included in first management data in the same manner as in step s138. The controller 30 erases data from target sector 50, and then writes correct data, that is, the decoded data obtained in step s131, to first management area 501 of target sector 50. This will correct the error in the first management data. At this time, the data stored in second management area 502 before the erasure of data from target sector 50 is written to second management area 502 of target sector 50.

After step s140, the controller 30 sets target sector 50 as normal sector 50 in step s141. After step s138, the controller 30 executes step s141 to set target sector 50 as normal sector 50. After step s136, the controller 30 executes step s141 to set target sector 50 as normal sector 50.

FIG. 47 is a view showing an example of data in management area 50B of target sector 50 when the controller 30 estimates in step s135 that the cause of an error included in the first management data is that power supply to the memory device 3 has stopped during a data write operation to first management area 501. FIG. 48 is a view showing an example of data in management area 50B of target sector 50 when the controller 30 estimates in step s137 that the cause of an error included in the first management data is read disturb. FIG. 49 is a view showing an example of data in management area 50B of target sector 50 when the controller 30 estimates in step s139 that the cause of an error included in the first management data is retention. FIGS. 47 to 49 each show original correct data in pages 0 to 7 on the left side and data including an error in pages 0 to 7 in management area 50B of target sector 50 on the right side. The same applies to the subsequent drawings. Referring to each of FIGS. 47 to 49, in the data shown on the right side, the underline indicates a portion in which an error has occurred. The same applies to the subsequent drawings. Referring to each of FIGS. 47 to 49, "XXXX XXXX" indicates an error correction code that can correctly decode data in page PG. The same applies to the subsequent drawings. In the case shown in FIGS. 48 and 49, errors have occurred in target status information.

Figure 45:
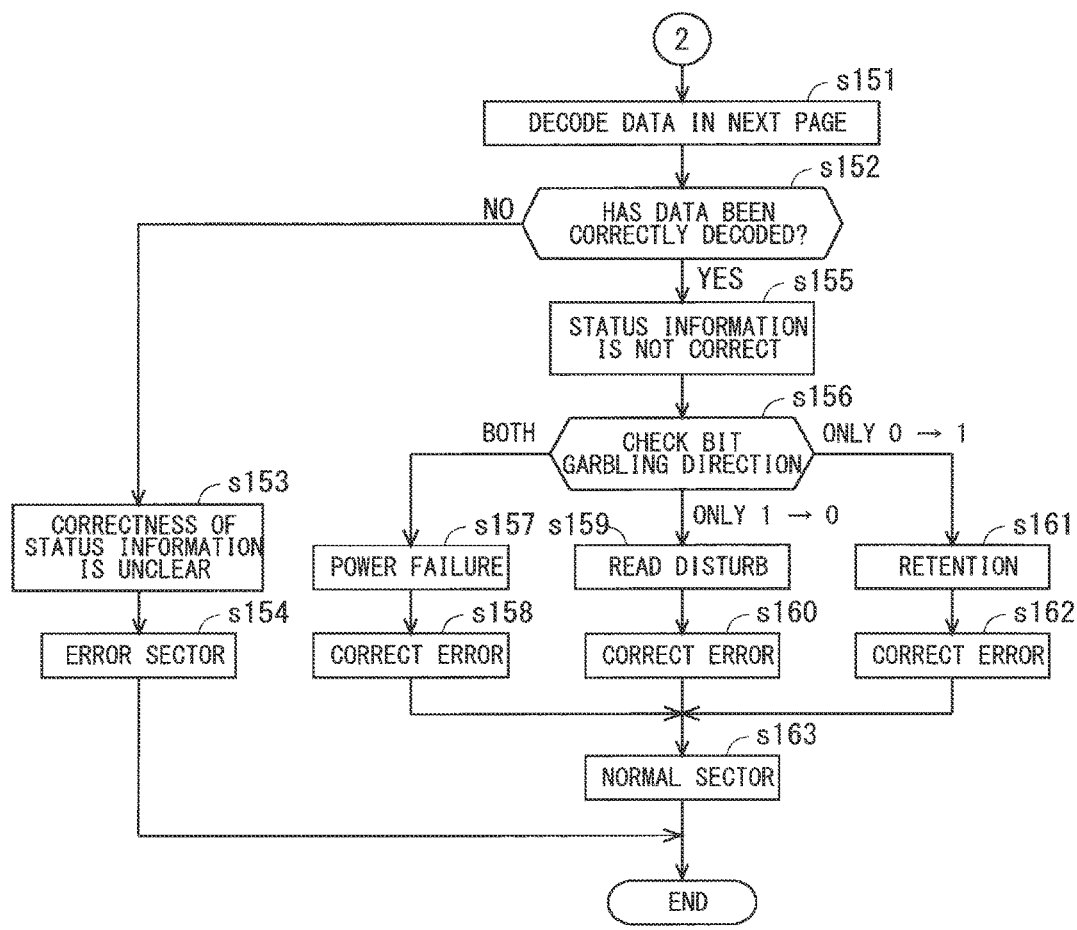

In step s151 shown in FIG. 45, the controller 30 decodes data in next page PG. In step s152, the controller 30 then determines whether the data has been correctly decoded in step s151. Upon determining that the data has not been correctly decoded, the controller 30 determines in step s153 whether the correctness of the target status information is unclear. In step s154, the controller 30 sets target sector 50 as error sector 50.

Upon determining in step s152 that the data has been correctly decoded, the controller 30 determines in step s155 that the target status information is not correct. The fact that the data in next page PG has been correctly decoded means that an error correction code has been written to next page. If the target status information is correct, no error correction code is written to next page PG. Consequently, if the controller 30 determines in step s152 that the data has been correctly decoded, in other words, if an error correction code is stored in next page PG, it can be said that the target status information is not correct.

In step s156 after step s155, as in step s134 described above, the controller 30 checks a bit garbling direction with respect to each bit of first management data of target sector 50 on the basis of the decoded data obtained in step s151.

If each of all the specified error bit values is error bit value (1→1), the controller 30 estimates in step s161 that the cause of the error included in the first management data is retention. If each of all the error bit values specified in a bit garbling direction check is error bit value (1→0), the controller 30 estimates in step s159 that the cause of the error included in the first management data is read disturb. If the specified error bit values include both error bit value (1→0) and error bit value (1→1), the controller 30 estimates in step s157 that the cause of the error included in the first management data is the stoppage of power supply to the memory device 3 during a data write operation to first management area 501 or data erasure from sector 50.

In step s162 after step s161, the controller 30 corrects the error included in the first management data in the same manner as in step s140 described above. The controller 30 then sets target sector 50 as normal sector 50 in step s163.

In step s160 after step s159, the controller 30 corrects the error included in the first management data in the same manner as in step s138 described above. The controller 30 then executes step s163.

In step s158 after step s157, the controller 30 correct the error included in the first management data in the same manner as in step s136 described above. The controller 30 then executes step s163.

FIG. 50 is a view showing an example of data in management area 50B of target sector 50 when the controller 30 estimates in step s157, which is executed if YES is determined in step s126, that the cause of the error included in the first management data is the stoppage of power supply to the memory device 3 during a data write operation to first management area 501. FIG. 51 is a view showing an example of data in management area 50B of target sector 50 when the controller 30 estimates in step s161, which is executed if YES is determined in step s126, that the cause of the error included in the first management data is retention. In the case shown in FIG. 51, an error has occurred in the target status information.

FIG. 52 is a view showing an example of data in management area 50B of target sector 50 when the controller 30 determines in step s152, which is executed if YES is determined in step s122, that the data has not been correctly decoded. Referring to FIG. 52, "YYYY_YYYY" indicated by boldface indicates data in next page PG which has not been correctly decoded. In the case shown in FIG. 52, no error is included in the first management data. FIGS. 53 and 54 each show an example of data in management area 50B of target sector 50 when the 30 estimates in step s161, which is executed if YES is determined in step s122, that the cause of the error included in the first management data is retention. In each of the cases shown in FIGS. 53 and 54, an error has occurred in the target status information.

In step s171 shown in FIG. 46, the controller 30 checks a bit garbling direction with respect to each bit of first management data of target sector 50 on the basis of the decoded data obtained in step s102 in the same manner as in step s134 described above.

If each of all the error bit values specified in a bit garbling direction check is error bit value (1→1), the controller 30 estimates in step s176 that the cause of the error included in the first management data is retention. If each of all the specified error bit values is error bit value (1→0), the controller 30 estimates in step s174 that the cause of the error included in the first management data is read disturb. If the specified error bit values include both error bit value (1→0) and error bit value (1→1), the controller 30 estimates in step s172 that the cause of the error included in the first management data is the stoppage of power supply to the memory device 3 during a data write operation to first management area 501 or data erasure from sector 50.

In step s177 after step s176, the controller 30 corrects the error included in the first management data in the same manner as in step s140 described above. The controller 30 then sets target sector 50 as normal sector 50 in step s178.

In step s175 after step s174, the controller 30 corrects the error included in the first management data in the same manner as in step s138 described above. The controller 30 then executes step s178.

In step s173 after step s172, the controller 30 corrects the error included in the first management data in the same manner as in step s136 described above. The controller 30 then executes step s178.

FIG. 55 is a view showing an example of data in management area 50B of target sector 50 when the controller 30 estimates in step s174 that the cause of the error included in the first management data is read disturb. FIG. 56 is a view showing an example of data in management area 50B of target sector 50 when the controller 30 estimates in step s176 that the cause of the error included in the first management data is retention.

FIG. 57 is a view showing an example of data in management area 50B of target sector 50 when the controller 30 determines in step s103 that the data has not been correctly decoded and determines in step s112 that no data is written to next page PG. Referring to FIG. 57, "YYYY_YYYY" indicated by boldface indicates data in corresponding page PG which has not been correctly decoded.

Upon estimating the cause of the error in the first management data stored in target sector 50 in the above manner, the controller 30 stores the estimated cause of the error in unused page PG (for example, page 7) in management area 50B of target sector 50. At this time, the controller 30 may store the estimated cause of the error, together with the date and time when the cause of the error was estimated, in management area 50B. This allows the user of the memory device 3 to specify which error has occurred in which sector 50. The user can estimate the usage state or the like of the memory device 3 on the basis of the specified information and use the estimation result for design change or the like.

Fourth Modification Example

In the fourth modification example, the controller 30 writes the fourth error correction code obtained by error correction coding of output data 210 stored in host data area 50A of sector 50 to an area other than first management area 501 and second management area 502. In this modification example, the controller 30 writes the fourth correction code to, for example, page 4 in management area 50B.

Figure 58:
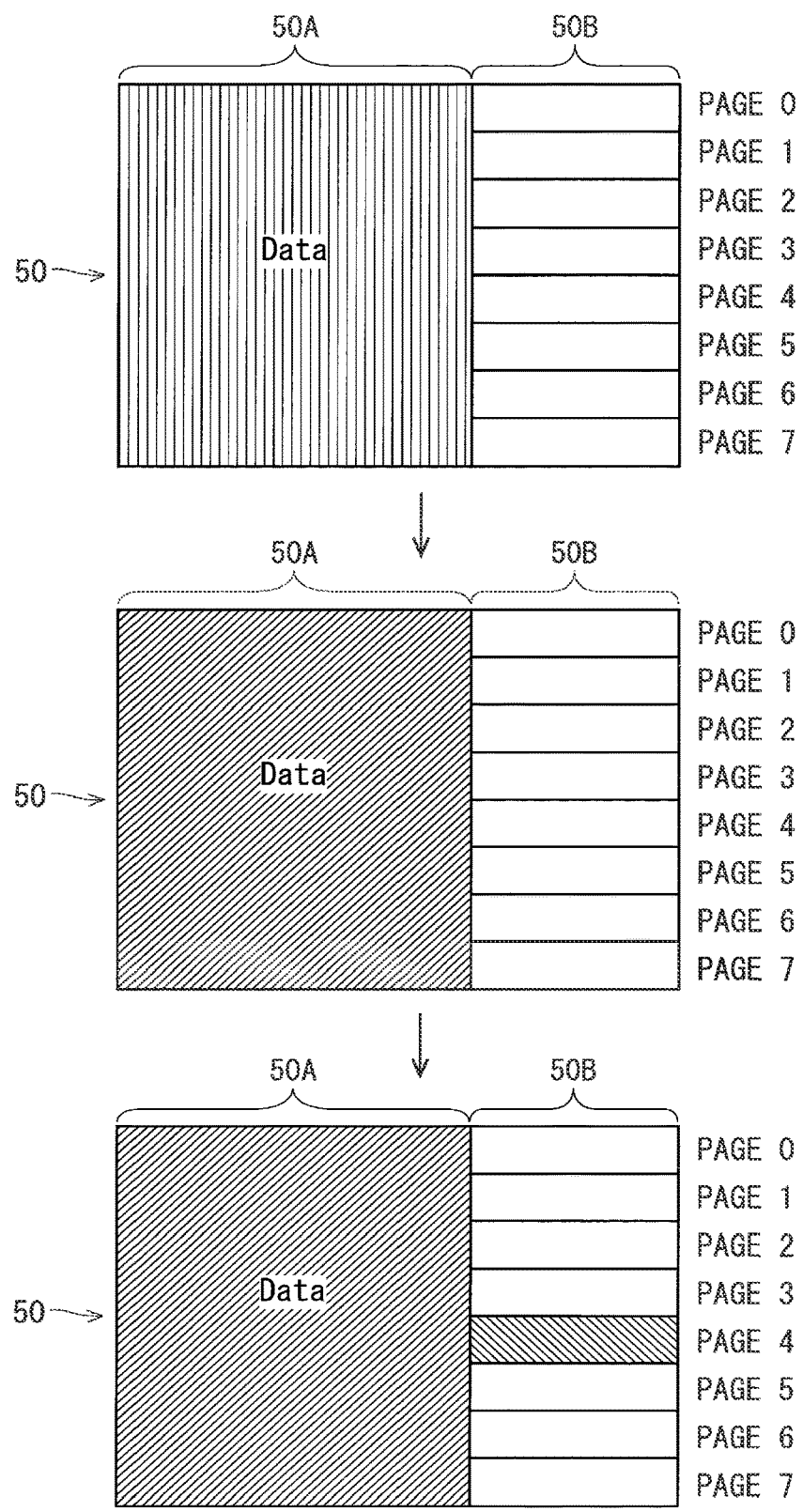
FIGS. 58 and 59 are views each for explaining an example of the operation of the memory device.

FIG. 58 is a view for explaining an example of an operation to be performed when the memory device 3 according to this modification example writes output data 210 to target sector 50. The upper part of FIG. 58 shows target sector 50 before new output data 210 is written, that is, target sector 50 storing old output data 210. When writing new output data 210 to target sector 50, as described above, the controller 30 writes new output data 210 to host data area 50A of target sector 50 after erasing data from target sector 50. The middle part of FIG. 58 shows target sector 50 immediately after new output data 210 is written.

Upon writing new output data 210 to target sector 50, the controller 30 performs verification processing with respect to host data area 50A. Upon completing verification processing with respect to last page PG in host data area 50A of target sector 50, the controller 30 generates the fourth error correction code by error correction coding of overall output data 210 written to host data area 50A. The controller 30 then writes the generated fourth error correction code to page 4 in management area 50B of target sector 50. The lower part of FIG. 58 shows target sector 50 in which the fourth error correction code is written to page 4 in management area 50B.

When consecutively writing output data 210 to a plurality of sectors 50, the controller 30 repeatedly performs the above processing.

Figure 59:
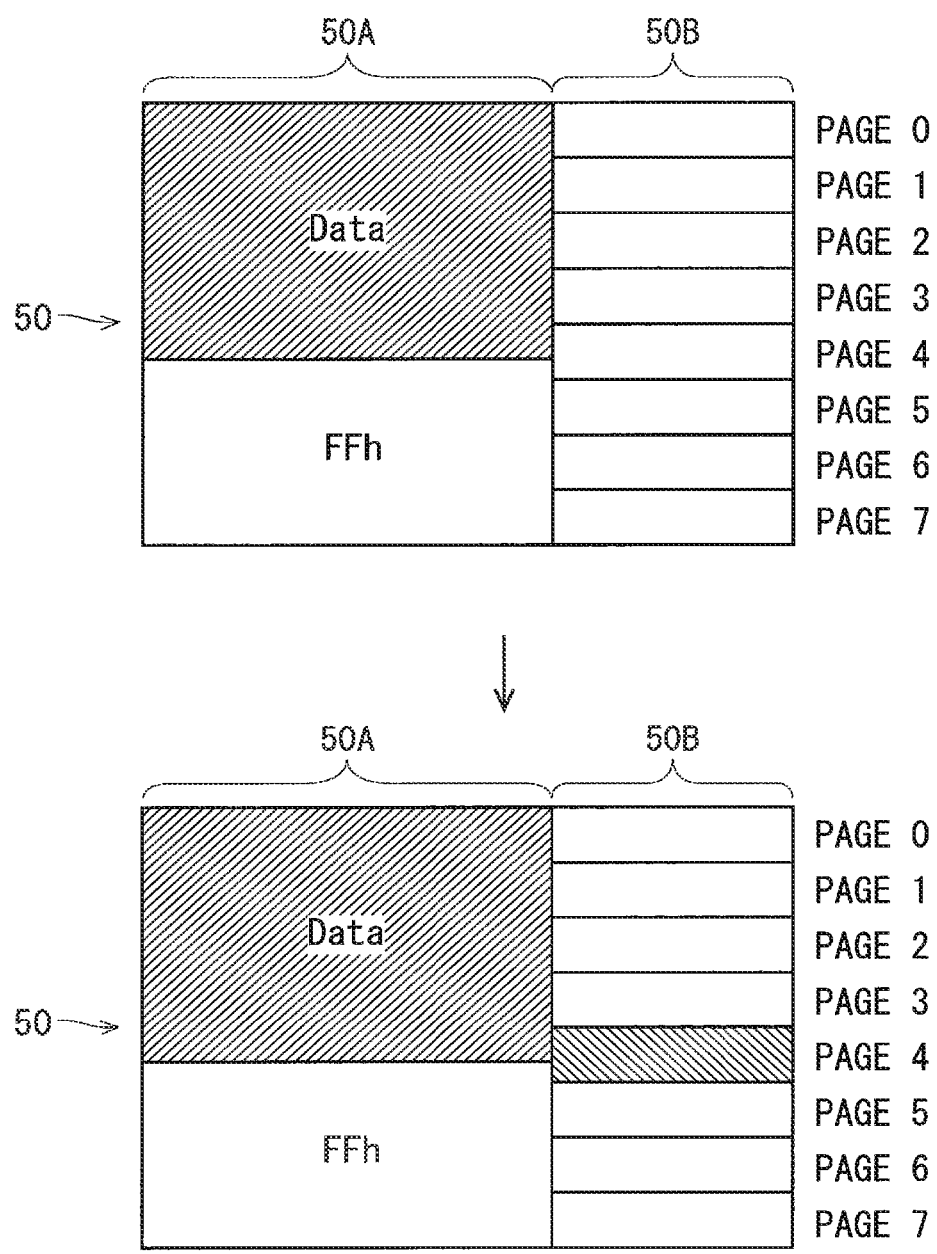

When writing output data 210 to only part of host data area 50A of target sector 50, the controller 30 performs error correction coding of only output data 210 written to host data area 50A instead of the overall data in host data area 50A, and writes the fourth error correction code obtained in this manner to page 4 in management area 50B. The upper part of FIG. 59 shows target sector 50 to which output data 210 is written to only part of host data area 50A. The lower part of FIG. 59 shows how the fourth error correction code is written to target sector 50.

As described above, the controller 30 writes the fourth error correction code obtained by error correction coding of output data 210 stored in host data area 50A to management area 50B. This makes it possible to obtain correct output data 210 stored in host data area 50A from the fourth error correction code. Accordingly, this improves the performance of the memory device 3.

As described above, the data processing system 1 has been described in detail, but the above description is given as examples in all aspects and the present invention not limited to the above description. The various modification examples described above can be applied in combination as long as they do not contradict each other. It should be understood that countless modification examples not illustrated are conceivable without departing from the scope of the present invention.

While the invention has been shown and described in detail, the foregoing description is in all aspects illustrative and not restrictive. It is therefore understood that numerous modifications and variations can be devised without departing from the scope of the invention.

What is claimed is:

1. A memory device configured to be controlled by a host apparatus, the device comprising:
a memory core comprising a storage area including a plurality of erasure unit areas each serving as a data erasure unit, to which output data output from the host apparatus is written;
a controller comprising circuitry configured to control the memory core; and
a first table configured to indicate a correspondence relationship between physical addresses and logical addresses, a respective physical address being assigned to a corresponding erasure unit area from the plurality of erasure unit areas,
wherein
operation modes of the controller include first to third modes,
upon receiving an erase command to perform data erasure, output from the host apparatus, and a first logical address that is the logical address output from the host apparatus together with the erase command, the controller in the first mode
sets an erasure unit area that is waiting for data erasure as an erasure waiting area for data without erasing data from the erasure unit area assigned with a first physical address that is the respective physical address associated with the first logical address in the first table,
replaces the first physical address with the respective physical address assigned to an erasure completion area that is the erasure unit area from which data has been erased in the first table,
sets the erasure completion area as an access area to which the host apparatus is configured to write data, and
upon receiving a write command to perform a data write, output from the host apparatus, and a second logical address that is the logical address output from the host apparatus together with the write command, write the output data output from the host apparatus to the access area assigned with a physical address associated with the second logical address in the first table,
the controller in the second mode
erases data from the erasure waiting area set by the controller in the first mode and sets the erasure waiting area as the erasure completion area, and
changes the operation mode from the second mode to the third mode upon receiving, from the host apparatus, a release command to release the second mode at some point in time of data erasure from the erasure waiting area, and
the controller operating in the third mode
erases un-erased data from the erasure waiting area, sets the erasure waiting area as the erasure completion area, and
changes the operation mode from the third mode to the first mode.

2. The memory device according to claim 1, wherein when the storage area includes the plurality of erasure waiting areas, the controller in the second mode consecutively erases data from the plurality of erasure waiting areas until reception of the release command.

3. The memory device according to claim 1, wherein
the controller operating in the second mode changes the operation mode from the second mode to the third mode upon receiving the release command, regardless of whether data is in the process of being erased from the erasure waiting area,
the controller operating in the third mode erases, when there is the erasure waiting area from which data has been erased partway, un-erased data from the erasure waiting area and changes the operation mode to the first mode,
the controller operating in the third mode changes, when there is not the erasure waiting area from which data has been erased partway, the operation mode to the first mode without erasing data from the erasure waiting area,
the controller operating in the first mode changes the operation mode to the second mode upon receiving an instruction command to operate in the second mode from the host apparatus,
the host apparatus repeatedly executes processing of outputting the release command, outputting the erase command after the release command, outputting the write command after the erase command, and outputting the instruction command after the write command to the memory device operating in the second mode, and
the controller changes the operation mode to the third mode without erasing data from the erasure waiting area when receiving the release command before lapse of a predetermined time since reception of the instruction command, and starts to erase data from the erasure waiting area when not receiving the release command before lapse of the predetermined time since reception of the instruction command.

4. The memory device according to claim 1, wherein
each of the plurality of erasure unit areas includes a host data area to which the output data is written and a management area for managing a state of the erasure unit area,
the management area includes a first management area storing status information indicating whether the erasure unit area including the management area is the access area, the erasure completion area, or the erasure waiting area, and a second management area indicating an updated state of the status information,
the second management area includes first to third update management areas respectively corresponding to the erasure completion area, the access area, and the erasure waiting area, and
the controller writes first predetermined information to the first update management area when rewriting the status information with first status information indicating that the erasure unit area is the erasure completion area, writes second predetermined information to the second update management area when rewriting the status information with second status information indicating that the erasure unit area is the access area, writes third predetermined information to the third update management area when rewriting the status information with third status information indicating that the erasure unit area is the erasure waiting area, and determines, on the basis of information in the first to third update management areas, whether the status information is correct or incorrect.

5. The memory device according to claim 1, wherein the controller operating in the first mode changes the operation mode to the second mode upon receiving an instruction command to operate in the second mode from the host apparatus.

6. The memory device according to claim 1, further comprising a second table in which a plurality of second physical addresses, each being a physical address other than the physical addresses registered in the first table, are registered,
wherein
numbers are assigned to the plurality of second physical addresses,
the controller cyclically moves a first pointer indicating one of the plurality of second physical addresses and a second pointer indicating one of the plurality of second physical addresses in order of the numbers,
when the plurality of second physical addresses are cyclically seen in order of the numbers, physical addresses ranging from the second physical address indicated by the first pointer to the second physical address immediately preceding the second physical address indicated by the second pointer are the physical addresses in the erasure completion area, and physical addresses ranging from the second physical address indicated by the second pointer to the second physical address immediately preceding the second physical address indicated by the first pointer are the physical addresses in the erasure waiting area,
the controller in the first mode replaces, upon receiving the erase command, the first physical address with a third physical address that is the second physical address in the erasure completion area which is indicated by the first pointer in the first table, replaces the third physical address with the first physical address in the second table, and moves the first pointer to indicate the next second physical address, and
the controller in the second mode erases data from the erasure waiting area at the second physical address indicated by the second pointer, sets the erasure waiting area as the erasure completion area, and moves the second pointer to indicate the next second physical address.

7. The memory device according to claim 1, wherein the host apparatus further being configured to output the release command.

8. The memory device according to claim 1, the host apparatus being configured to output the instruction command.

9. A data processing system comprising:
the memory device according to claim 1; and
a host apparatus configured to control the memory device and outputs the erase command and the write command.

10. A memory device configured to be controlled by a host apparatus, the device comprising:
a memory core comprising a storage area including a plurality of erasure unit areas each serving as a data erasure unit, to which output data output from the host apparatus is written;
a controller comprising circuitry configured to control the memory core; and
a first table configured to indicate a correspondence relationship between physical addresses and logical addresses, a respective physical address being assigned to a corresponding erasure unit area from the plurality of erasure unit areas,
wherein
upon receiving an erase command to perform data erasure, output from the host apparatus, and a first logical address that is the logical address output from the host apparatus together with the erase command, the controller sets an erasure unit area that is waiting for data erasure as an erasure waiting area for data without erasing data from the erasure unit area assigned with a first physical address that is the respective physical address associated with the first logical address in the first table, replaces the first physical address with the respective physical address assigned to an erasure completion area that is the erasure unit area from which data has been erased in the first table, and sets the erasure completion area as an access area to which the host apparatus is configured to write data,
upon receiving a write command to perform a data write, output from the host apparatus, and a second logical address that is the logical address output from the host apparatus together with the write command, the controller writes the output data output from the host apparatus to the access area assigned with a physical address associated with the second logical address in the first table,
the controller erases data from the erasure waiting area and sets the erasure waiting area as the erasure completion area,
each of the plurality of erasure unit areas includes a host data area to which the output data is written and a management area for managing a state of the erasure unit area,
the management area includes a first management area storing status information indicating whether the erasure unit area including the management area is the access area, the erasure completion area, or the erasure waiting area, and a second management area indicating an updated state of the status information, the second management area includes first to third update management areas respectively corresponding to the erasure completion area, the access area, and the erasure waiting area, and the controller writes first predetermined information to the first update management area when rewriting the status information with first status information indicating that the erasure unit area is the erasure completion area, writes second predetermined information to the second update management area when rewriting the status information with second status information indicating that the erasure unit area is the access area, writes third predetermined information to the third update management area when rewriting the status information with third status information indicating that the erasure unit area is the erasure waiting area, and determines, on the basis of information in the first to third update management areas, whether the status information is correct or incorrect.

11. The memory device according to claim 10, wherein operation modes of the controller include first and second operation modes, upon receiving the erase command and the first logical address, the controller in the first mode sets the erasure unit area as the erasure waiting area without erasing data from the erasure unit area assigned with the first physical address associated with the first logical address in the first table without erasing data, replaces the first physical address with the respective physical address assigned to the erasure completion area in the first table, and sets the erasure completion area as the access area, upon receiving the write command and the second logical address, the controller in the first mode writes the output data output from the host apparatus to the access area assigned with the respective physical address associated with the second logical address in the first table, and the controller in the second mode erases data from the erasure waiting area set by the controller in the first mode and sets the erasure waiting area as the erasure completion area.

12. The memory device according to claim 11, wherein the controller operating in the first mode changes the operation mode to the second mode upon receiving an instruction command to operate in the second mode from the host apparatus.

13. The memory device according to claim 10, wherein the controller writes the first predetermined information again to the first update management area when the status information determines the correct or incorrect determination to be correct indicates the first status information, writes the second predetermined information again to the second update management area when the status information determines the correct or incorrect determination to be correct indicates the second status information, and writes the third predetermined information again to the third update management area when the status information determined in the correct/incorrect determination to be correct indicates the third status information.

14. The memory device according to claim 10, wherein upon receiving the erase command and the first logical address, when the plurality of erasure unit areas do not include the erasure completion area, the controller erases data from the erasure waiting area, sets the erasure waiting area as the erasure completion area, then replaces the first physical address with the respective physical address assigned to the erasure completion area in the first table, and sets the erasure completion area as the access area.

15. The memory device according to claim 10, wherein the first management area of the access area stores the logical address associated with the respective physical address assigned to the access area in the first table.

16. The memory device according to claim 10, wherein the controller changes the status information from the first status information to the second status information by writing data to one or more bits in the first management area storing the first status information.

17. The memory device according to claim 10, wherein the controller changes the status information from the second status information to the third status information by writing data to one or more bits in the first management area storing the second status information.

18. The memory device according to claim 10, wherein
at least one piece of the first predetermined information to the third predetermined information is constituted by values of a plurality of bit, and
each of values of the plurality of bits differs from a value indicated by each bit in the erasure unit area after data erasure.

19. The memory device according to claim 10, wherein the controller performs at least one of processes including a first process of writing a first error correction code obtained by error correction coding of data stored in the first management area, as the first predetermined information, to the first update management area after rewriting the status information with the first status information, a second process of writing a second error correction code obtained by error correction coding of data stored in the first management area, as the second predetermined information, to the second update management area after rewriting the status information with the second status information, and a third process of writing a third error correction code obtained by error correction coding of data stored in the first management area, as the third predetermined information, to the third update management area after rewriting the status information with the third status information.

20. The memory device according to claim 19, wherein
each bit in the erasure unit area after data erasure indicates a first value, and
the controller determines whether a value of a bit of the status information errs from a second value, which differs from the first value, to the first value, on the basis of at least one of results including a first result obtained by error correction decoding of data in the first update management area, a second result obtained by error correction decoding of data in the second update management area, and a third result obtained by error correction decoding of data in the third update management area, and
when a value of a bit of the status information errs from the second value to the first value, the controller corrects the status information by writing the second value to the bit.

21. The memory device according to claim 19, wherein
each bit in the erasure unit area after data erasure indicates a first value, and
the controller determines whether a value of a bit of the status information errs from the first value to a second value, which differs from the first value, on the basis of at least one of results including a first result obtained by error correction decoding of data in the first update management area, a second result obtained by error correction decoding of data in the second update management area, and a third result obtained by error correction decoding of data in the third update management area, and when a value of a bit of the status information errs from the first value to the second value, the controller erases data from the erasure unit area storing the status information and then writes the correct status information to the erasure unit area.

22. The memory device according to claim 19, wherein the controller erases data from the erasure unit area when decoding fails as a result of error correction decoding of data in the first update management area of the erasure unit area, erases data from the erasure unit area when decoding fails as a result of error correction decoding of data in the second update management area of the erasure unit area, erases data from the erasure unit area when decoding fails as a result of error correction decoding of data in the third update management area of the erasure unit area, and sets the erasure unit area from which data has been erased as the erasure completion area.

23. The memory device according to claim 19, wherein the controller performs estimation processing of estimating a cause of an error in the status information on the basis of the status information and at least one of a first result obtained by error correction decoding of data in the first update management area, a second result obtained by error correction decoding of data in the second update management area, and a third result obtained by error correction decoding of data in the third update management area.

24. The memory device according to claim 23, wherein when the status information indicates information other than the first status information to the third status information in the estimation processing, the controller estimates the cause of the error on the basis of the third result when the third error correction code is stored in the third update management area, estimates the cause of the error on the basis of the second result when the third error correction code is not stored in the third update management area and the second error correction code is stored in the second update management area, and estimates the cause of the error on the basis of the first result when the third error correction code is not stored in the third update management area, the second error correction code is not stored in the second update management area, and the first error correction code is stored in the first update management area.

25. The memory device according to claim 23, wherein the controller estimates, in the estimation processing, the cause of the error on the basis of the second result when the status information indicates the first status information, decoded data obtained by error correction decoding of data in the first update management area coincides with data in the first management area, and the second error correction code is stored in the second update management area, and estimates the cause of the error on the basis of the third result when the status information indicates the second status information, decoded data obtained by error correction decoding of data in the second update management area coincides with data in the first management area, and the third error correction code is stored in the third update management area.

26. The memory device according to claim 23, wherein the controller estimates, in the estimation processing, the cause of the error on the basis of the second result when the status information indicates the first status information, decoded data obtained by error correction decoding of data in the first update management area does not coincide with data in the first management area, and the second error correction code is stored in the second update management area, and estimates the cause of the error on the basis of the third result when the status information indicates the second status information, decoded data obtained by error correction decoding of data in the second update management area does not coincide with data in the first management area, and the third error correction code is stored in the third update management area.

27. The memory device according to claim 23, wherein the controller estimates, in the estimation processing, the cause of the error on the basis of the first result when the status information indicates the first status information, decoded data obtained by error correction decoding of data in the first update management area does not coincide with data in the first management area, and the second error correction code is not stored in the second update management area, estimates the cause of the error on the basis of the second result when the status information indicates the second status information, decoded data obtained by error correction decoding of data in the second update management area does not coincide with data in the first management area, and the third error correction code is not stored in the third update management area, and estimates the cause of the error on the basis of the third result when the status information indicates the third status information and decoded data obtained by error correction decoding of data in the third update management area does not coincide with data in the first management area.

28. The memory device according to claim 10, wherein the controller writes a fourth error correction code obtained by error correction coding of the output data stored in the host data area to an area other than the first and second management areas in the management area.

29. The memory device according to claim 10, wherein
a second period in which data is erased from the erasure waiting area occurs after a first period in which information is written to the management area, and a third period in which information is written to the management area occurs after the second period, and
a consumption current in the memory device in the second period is larger than the consumption current in the first period, and the consumption current in the third period is smaller than the consumption current in the second period.

30. The memory device according to claim 10, further comprising a second table in which a plurality of second physical addresses, each being a physical address other than the physical addresses registered in the first table, are registered,
wherein
numbers are assigned to the plurality of second physical addresses,
the controller cyclically moves a first pointer indicating one of the plurality of second physical addresses and a second pointer indicating one of the plurality of second physical addresses in order of the numbers,
when the plurality of second physical addresses are cyclically seen in order of the numbers, physical addresses ranging from the second physical address indicated by the first pointer to the second physical address immediately preceding the second physical address indicated by the second pointer are the physical addresses in the erasure completion area, and physical addresses ranging from the second physical address indicated by the second pointer to the second physical address immediately preceding the second physical address indicated by the first pointer are the physical addresses in the erasure waiting area, the controller in the first mode replaces, upon receiving the erase command, the first physical address with a third physical address that is the second physical address in the erasure completion area which is indicated by the first pointer in the first table, replaces the third physical address with the first physical address in the second table, and moves the first pointer to indicate the next second physical address, and the controller in the second mode erases data from the erasure waiting area at the second physical address indicated by the second pointer, sets the erasure waiting area as the erasure completion area, and moves the second pointer to indicate the next second physical address.

31. The memory device according to claim 10, wherein the host apparatus further being configured to output the instruction command.

32. A data processing system comprising:
the memory device according to claim 10; and
a host apparatus configured to control the memory device and outputs the erase command and the write command.

33. A controller comprising circuitry configured to control a memory device including a plurality of erasure unit areas:
the controller is coupled with a volatile memory storing a first table configured to indicate a correspondence relationship between each of some physical addresses of a plurality of physical addresses assigned to the respective plurality of erasure unit areas and a logical addresses,
wherein operation modes of the controller include first to third modes, upon receiving an erase command to perform data erasure, output from a host apparatus, and a first logical address that is the logical address output from the host apparatus together with the erase command, the controller in the first mode sets the erasure unit area as an erasure waiting area for data without erasing data from the erasure unit area assigned with a first physical address that is the physical address associated with the first logical address in the first table, replaces the first physical address with the physical address assigned to an erasure completion area that is the erasure unit area from which data has been erased in the first table, and sets the erasure completion area as an access area to which the host apparatus is configured to write data, and
upon receiving a write command to perform a data write, output from the host apparatus, and a second logical address that is the logical address output from the host apparatus together with the write command, the controller in the first mode writes the output data output from the host apparatus to the access area assigned with the physical address associated with the second logical address in the first table, the controller in the second mode erases data from the erasure waiting area and sets the erasure waiting area as the erasure completion area, the controller operating in the second mode changes the operation mode from the second mode to the third mode upon receiving, from the host apparatus, a release command to release the second mode at some point in time of data erasure from the erasure waiting area, and the controller operating in the third mode erases un-erased data from the erasure waiting area, sets the erasure waiting area as the erasure completion area, and changes the operation mode from the third mode to the first mode.

34. A controller comprising circuitry configured to control a memory device including a plurality of erasure unit areas:
the controller is coupled with a volatile memory storing a first table configured to indicate a correspondence relationship between each of some physical addresses of a plurality of physical addresses assigned to the respective plurality of erasure unit areas and a logical addresses,
wherein upon receiving an erase command to perform data erasure, output from a host apparatus, and a first logical address that is the logical address output from the host apparatus together with the erase command, the controller sets the erasure unit area as art erasure waiting area for data without erasing data from the erasure unit area assigned with a first physical address that is the physical address associated with the first logical address in the first table, replaces the first physical address with the physical address assigned to an erasure completion area that is the erasure unit area from which data has been erased in the first table, and sets the erasure completion area as an access area to which the host apparatus is configured to write data,
upon receiving a write command to perform a data write, output from the host apparatus, and a second logical address that is the logical address output from the host apparatus together with the write command, the controller writes the output data output from the host apparatus to the access area assigned with the physical address associated with the second logical address in the first table,
the controller erases data from the erasure waiting area and sets the erasure waiting area as the erasure completion area,
each of the plurality of erasure unit areas includes a host data area to which the output data is written and a management area for managing a state of the erasure unit area,
the management area includes a first management area storing status information indicating whether the erasure unit area including the management area is the access area, he erasure completion area, or the erasure waiting area, and a second management area indicating an updated state of the status information,
the second management area includes first to third update management areas respectively corresponding to the erasure completion area, the access area, and the erasure waiting area, and
the controller writes first predetermined information to the first update management area, when rewriting the status information with first status information indicating that the erasure unit area is the erasure completion area, writes second predetermined information to the second update management area when rewriting the status information with second status information indicating that the erasure unit area is the access area, writes third predetermined information to the third update management area when rewriting the status information with third status information indicating that the erasure unit area is the erasure waiting area, and performs correct/incorrect determination to determine, on the basis of information in the first to third update management areas, whether the status information is correct.

35. A computer-readable non-transitory recording medium storing a control program for controlling a memory device that comprises a memory core comprising a storage area including a plurality of erasure unit areas each serving as a data erasure unit, to which output data output from the host apparatus is written, and a table configured to indicate a correspondence relationship between physical addresses and logical addresses, a respective physical address being assigned to a corresponding erasure unit area from the plurality of erasure unit areas, and is controlled by the host apparatus, the control program causing the memory device to execute (a) a step of operating in a first mode,
(b) a step of operating in a second mode,
(c) a step of operating in a third mode,
the step (a) including
(a-1) a step of receiving an erase command to perform data erasure, output from the host apparatus, and a first logical address that is the logical address output from the host apparatus together with the erase command,
(a-2) a step of setting an erasure unit area that is waiting for data erasure as an erasure waiting area for data without erasing data from the erasure unit area assigned with a first physical address that is the respective physical address associated with the first logical address in the table after the step (a-1),
(a-3) a step of replacing a first physical address with the respective physical address assigned to an erasure completion area that is the erasure unit area, from which data has been erased, in the table after the step (a-1) and setting the erasure completion area as an access area to which the host apparatus is configured to write data, and
(a-4) a step of, upon receiving a write command to perform a data write, output from the host apparatus, and a second logical address that is the logical address output from the host apparatus together with the write command, writing the output data output from the host apparatus to the access area assigned with a physical address associated with the second logical address in the table, and
the step (b) including (b-1) a step of erasing data from the erasure waiting area set by the controller in the first mode and setting the erasure waiting area as the erasure completion area,
(d) a step of, upon receiving from the host apparatus a release command to release the second mode at some point in time of data erasure from the erasure waiting area set by the controller in the first mode while operating in the second mode, changing the operation mode from the second mode to the third mode, and
(e) a step of erasing un-erased data from the erasure waiting area set by the controller in the first mode, while operating in the third mode, setting the erasure waiting area as the erasure completion area and changing the operation mode from the third mode to the first mode.

36. A computer-readable non-transitory recording medium according to claim 35, the control program further being configured to cause the host apparatus to output the release command.

37. A computer-readable non-transitory recording medium storing a control program for controlling a memory device that comprises a memory core comprising a storage area including a plurality of erasure unit areas each serving as a data erasure unit, to which output data output from a host apparatus is written, and a table configured to indicate a correspondence relationship between physical addresses and logical addresses, a respective physical address being assigned to a corresponding erasure unit area from the plurality of erasure unit areas, and is controlled by the host apparatus, the control program causing the memory device to execute (a) a step of receiving an erase command to perform data erasure, output from the host apparatus, and a first logical address that is the logical address output from the host apparatus together with the erase command,
(b) a step of setting an erasure unit area that is waiting for data erasure as an erasure waiting area for data without erasing data from the erasure unit area assigned with a first physical address that is the respective physical address associated with the first logical address in the table after the step (a),
(c) a step of replacing the first physical address with the respective physical address assigned to an erasure completion area that is the erasure unit area, from which data has been erased, in the table after the step (a) and setting the erasure completion area as an access area to which the host apparatus is configured to write data,
(d) a step of, upon receiving a write command to perform a data write, output from the host apparatus, and a second logical address that is the logical address output from the host apparatus together with the write command, writing the output data output from the host apparatus to the access area assigned with a physical address associated with the second logical address in the first table,
(e) a step of erasing data from the erasure waiting area and setting the erasure waiting area as the erasure completion area,
each of the plurality of erasure unit areas including a host data area to which the output data is written and a management area for managing a state of the erasure unit area,
the management area including a first management area storing status information indicating whether the erasure unit area including the management area is the access area, the erasure completion area, or the erasure waiting area and a second management area indicating an updated state of the status information, and
the second management area including first to third update management areas respectively corresponding to the erasure completion area, the access area, and the erasure waiting area,
(f) a step of writing first predetermined information to the first update management area when rewriting the status information with first status information indicating that the erasure unit area is the erasure completion area,
(g) a step of writing second predetermined information to the second update management area when rewriting the status information with second status information indicating that the erasure unit area is the access area,
(h) a step of writing third predetermined information to the third update management area when rewriting the status information with third status information indicating that the erasure unit area is the erasure waiting area, and
(i) a step of determining, on the basis of information in the first to third update management areas, whether the status information is correct or incorrect.

38. A computer-readable non-transitory recording medium storing a control program for causing a host apparatus to control the memory device according to claim 37, the control program being further configured to cause the host apparatus to output the instruction command.

39. A computer-readable non-transitory recording medium according to claim 37, the control program further being configured to cause the host apparatus to output the instruction command.

40. An operation method of a memory device that comprises a memory core comprising a storage area including a plurality of erasure unit areas each serving as a data erasure unit, to which output data output from the host apparatus is written, and a table configured to indicate a correspondence relationship between physical addresses and logical addresses, a respective physical address being assigned to a corresponding erasure unit area from the plurality of erasure unit areas, and is controlled by the host apparatus, the method comprising:
- (a) a step of operating in a first mode;
- (b) a step of operating in a second mode;
- (c) a step of operating in a third mode,
the step (a) including
- (a-1) a step of receiving an erase command to perform data erasure, output from the host apparatus, and a first logical address that is the logical address output from the host apparatus together with the erase command,
- (a-2) a step of setting an erasure unit area that is waiting for data erasure as an erasure waiting area for data without erasing data from the erasure unit area assigned with a first physical address that is the respective physical address associated with the first logical address in the table after the step (a-1),
- (a-3) a step of replacing the first physical address with the respective physical address assigned to an erasure completion area that is the erasure unit area, from which data has been erased, in the table after the step (a-1) and setting the erasure completion area as an access area to which the host apparatus is configured to write data, and
- (a-4) a step of, upon receiving a write command to perform a data write, output from the host apparatus, and a second logical address that is the logical address output from the host apparatus together with the write command, writing output data output from the host apparatus to the access area assigned with a physical address associated with the second logical address in the table, and
the step (b) including (b-1) a step of erasing data from the erasure waiting area set by the controller in the first mode and setting the erasure waiting area as the erasure completion area;
- (d) a step of, upon receiving from the host apparatus a release command to release the second mode at some point in time of data erasure from the erasure waiting area set by the controller in the first mode while operating in the second mode, changing the operation mode from the second mode to the third mode; and
- (e) a step of erasing un-erased data from the erasure waiting area set by the controller in the first mode, while operating in the third mode, setting the erasure waiting area as the erasure completion area and changing the operation mode from the third mode to the first mode.

41. An operation method of a memory device that comprises a memory core comprising a storage area including a plurality of erasure unit areas each serving as a data erasure unit, to which output data output from a host apparatus is written, and a table configured to indicate a correspondence relationship between physical addresses and logical addresses, a respective physical addresses being assigned to a corresponding erasure unit area from the plurality of erasure unit areas, and is controlled by the host apparatus, the method comprising:
- (a) a step of receiving an erase command to perform data erasure, output from the host apparatus, and a first logical address that is the logical address output from the host apparatus together with the erase command;
- (b) a step of setting an erasure unit area that is waiting for data erasure as an erasure waiting area for data without erasing data from the erasure unit area assigned with a first physical address that is the respective physical address associated with the first logical address in the table after the step (a);
- (c) a step of replacing the first physical address assigned with the erasure unit area with the respective physical address assigned to an erasure completion area that is the erasure unit area, from which data has been erased, in the table after the step (a) and setting the erasure completion area as an access area to which the host apparatus is configured to write data;
- (d) a step of, upon receiving a write command to perform a data write, output from the host apparatus, and a second logical address that is the logical address output from the host apparatus together with the write command, writing the output data output from the host apparatus to the access area assigned with a physical address associated with the second logical address in the first table;
- (e) a step of erasing data from the erasure waiting area set in the step (b) and setting the erasure waiting area as the erasure completion area,
each of the plurality of erasure unit areas including a host data area to which the output data is written and a management area for managing a state of the erasure unit area,
the management area including a first management area storing status information indicating whether the erasure unit area including the management area is the access area, the erasure completion area, or the erasure waiting area and a second management area indicating an updated state of the status information, and
the second management area including first to third update management areas respectively corresponding to the erasure completion area, the access area, and the erasure waiting area;
- (f) a step of writing first predetermined information to the first update management area when rewriting the status information with first status information indicating that the erasure unit area is the erasure completion area;
- (g) a step of writing second predetermined information to the second update management area when rewriting the status information with second status information indicating that the erasure unit area is the access area,
- (h) a step of writing third predetermined information to the third update management area when rewriting the status information with third status information indicating that the erasure unit area is the erasure waiting area; and
- (i) a step of determining, on the basis of information in the first to third update management areas, whether the status information is correct or incorrect.

42. An operation method of a host apparatus configured to control the memory device according to claim 41, the method comprising a step of outputting the release command.

43. An operation method of a host apparatus configured to control the memory device according to claim 41, the method further comprising a step of outputting the instruction command.

44. An operation method of a host apparatus configured to control the memory device according to claim 41, the method further comprising a step of outputting the instruction command.

* * * * *